United States Patent
Iwanaga et al.

(10) Patent No.: US 6,979,970 B2
(45) Date of Patent: Dec. 27, 2005

(54) SENSORLESS MOTOR DRIVING DEVICE AND ITS DRIVING METHOD

(75) Inventors: Taishi Iwanaga, Nagaokakyo (JP); Yasunori Yamamoto, Hirakata (JP); Hideki Nishino, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/878,442

(22) Filed: Jun. 29, 2004

(65) Prior Publication Data

US 2004/0263104 A1 Dec. 30, 2004

(30) Foreign Application Priority Data

Jun. 30, 2003 (JP) .............................. 2003-186826

(51) Int. Cl.⁷ .............................. H02P 3/08; H02P 5/00; H02P 7/00
(52) U.S. Cl. ...................... 318/599; 318/138; 318/439; 318/254
(58) Field of Search .................. 318/599, 811, 632, 318/268, 430–434, 720–724

(56) References Cited

U.S. PATENT DOCUMENTS

| | | | | |
|---|---|---|---|---|
| 5,446,647 A | * | 8/1995 | Ikeda et al. .................... | 363/89 |
| 5,929,577 A | * | 7/1999 | Neidorff et al. ............ | 318/254 |
| 6,064,175 A | * | 5/2000 | Lee ............................. | 318/254 |
| 6,479,956 B1 | * | 11/2002 | Kawabata et al. .......... | 318/254 |
| 6,570,351 B2 | * | 5/2003 | Miyazaki et al. ........... | 318/138 |
| 6,771,033 B2 | * | 8/2004 | Kokami et al. ............. | 318/254 |
| 6,900,604 B2 | * | 5/2005 | Kokami et al. ............. | 318/254 |
| 2003/0102832 A1 | * | 6/2003 | Iwanaga et al. ............ | 318/268 |
| 2004/0027084 A1 | * | 2/2004 | Berroth et al. .............. | 318/439 |
| 2004/0251860 A1 | * | 12/2004 | Ehsani et al. ............... | 318/254 |
| 2005/0029976 A1 | * | 2/2005 | Terry et al. ................. | 318/439 |

OTHER PUBLICATIONS

Satoru Kusaka., "Feature Story, Design of Motor Control Circuit to Learn in Experiments, Chapter 4, Method for Driving Sensorless DC Motor," in "Transistor Gijutsu" (written in Japanese) CQ Publishing, Feb. 2000 Issue, vol. 37, No. 425, pp. 221-228. English summary enclosed.

* cited by examiner

Primary Examiner—Marlon T. Fletcher
Assistant Examiner—Eduardo Colon Santana
(74) Attorney, Agent, or Firm—McDermott Will & Emery LLP

(57) ABSTRACT

A PWM control section (1) gently changes phase currents (Iu, Iv, and Iw) under a current driving control over a pre-drive circuit (2) and an output circuit (3). The pre-drive circuit (2) suspends energizing of the specific motor coil (Mu, Mv, and Mw) according to a PWM disable signal (NPWM) at PWM disable periods. A self-commutation circuit (5) performs zero crossing detection according to a BEMF detection signal (DZC) during BEMF detection periods. A count section (7) selects either a self-commutation signal (SC) or a forced commutation signal (FC) as a commutation signal (CS), whichever enters earlier, and, based on its intervals, generates the PWM disable signal (NPWM) and the BEMF detection signal (DZC). The BEMF detection period starts after the start of the PWM disable period, and finishes together with the PWM disable period at the switching of the energization phases.

28 Claims, 28 Drawing Sheets

FIG.4

|  | I | II | III | IV | V | VI |
|---|---|---|---|---|---|---|
| Iu | SOURCE RISING | SOURCE CONSTANT | SOURCE FALLING | SINK RISING | SINK CONSTANT | SINK FALLING |
| Iv | SINK CONSTANT | SINK FALLING | SOURCE RISING | SOURCE CONSTANT | SOURCE FALLING | SINK RISING |
| Iw | SOURCE FALLING | SINK RISING | SINK CONSTANT | SINK FALLING | SOURCE RISING | SOURCE CONSTANT |
| ZCP | W ↓ | V ↑ | U ↓ | W ↑ | V ↓ | U ↑ |

SENSORLESS MOTOR DRIVING DEVICE AND ITS DRIVING METHOD

BACKGROUND OF THE INVENTION

The present invention relates to a device and a method for driving a sensorless motor, and, in particular, those for controlling the start of a sensorless motor under a forced commutation control.

In brushless motors, electric commutation is performed instead of mechanical commutation with brushes. Electric commutation requires a rotor position, in other words, a rotation angle of a rotor. Position sensors such as Hall devices are provided for conventional brushless motors, and are used to detect rotor positions. See, for example, Published Japanese patent application 2003-174789 and 2003-244983 gazettes.

In a sensorless motor, a voltage is detected, which is induced in a motor coil during the rotor rotation. The voltage is hereafter referred to as a BEMF (back electromotive force). Using the BEMF, the detection of the rotor position is performed without a position sensor. Since the sensorless motor has no position sensor, its component count is small and its wiring is comparatively simple. Accordingly, its miniaturization is easy, and hence, it is extensively used as, for example, a spindle motor of a FDD, a HDD, a MD/CD/DVD drive, and the like, and a cylinder motor of a VTR, a video camcorder, and the like.

FIG. 27 is a block diagram showing a conventional sensorless motor driving device. See, for example, Kusaka Satoru, "Feature Story, Design of Motor Control Circuit to Learn in Experiments, Chapter 4, Method for Driving Sensorless DC Motor," in "Transistor Gijutsu" (written in Japanese), CQ Publishing, the February 2000 issue, Vol.37, No.425, pp.221–228. This sensorless motor driving device drives, for example, a three-phase sensorless motor M. A PWM control section 10 generates a PWM control signal P and a PWM mask signal MPWM based on a position signal PS. Here, the position signal PS shows an estimated position of the rotor (not shown) of the sensorless motor M. The PWM control signal P shows the timing of energizing of the motor coils Mu, Mv, and Mw of the sensorless motor M. The PWM mask signal MPWM stays active for a predetermined time from each of the rising and falling edges of the PWM control signal P.

According to an energization phase switching signal CP, a pre-drive circuit 20 selects, for example, one of three high side power transistors 31U, 31V, and 31W of an output circuit 3, and maintains it in the ON state. The pre-drive circuit 20 further selects one of three low side power transistors 32U, 32V, and 32W, and quickly turns it on and off according to the PWM control signal P. Thereby, two of three motor coils Mu, Mv, and Mw are energized. Here, there are six types of energization pattern, which correspond to separate energization phases. The motor coils energized generate magnetic fields and then produce a torque at the rotor.

A BEMF comparing section 4 includes three comparators 4U, 4V, and 4W, and compares each potential of three driving terminals U0, V0, and W0 of the sensorless motor M with the potential of the center point C of the three motor coils Mu, Mv, and Mw, which is hereafter referred to as a center tap voltage. A self-commutation circuit 50 detects agreement between each potential of the driving terminals U0, V0, and W0, and the center tap voltage of the motor coils, based on three output signals BCU, BCV, and BCW of the BEMF comparing section 4. Here, the output signals BCU, BCV, and BCW of the BEMF comparing section 4 are masked according to two types of mask signal, MZC and MPWM. Thereby, the agreement between the BEMF in the non-energized motor coil and the center tap voltage of the motor coils, which is hereafter referred to as a zero crossing, is precisely detected in each of the energization phases. When detecting the zero crossing, the self-commutation circuit 50 generates a self-commutation signal SC.

A forced commutation circuit 60 generates a fixed pulse signal, that is, a forced commutation signal FC at predetermined intervals. A count section 70 selects either the self-commutation signal SC or the forced commutation signal FC, and sends it as a commutation signal CS to an energization phase switching circuit 80. On the other hand, the count section 70 measures the intervals of the commutation signal CS and generates a position signal PS based on the intervals. Here, a commutation signal CS is adjusted to lag, for example, about 30 degrees behind either the self-commutation signal SC or the forced commutation signal FC, whichever is selected. The energization phase switching circuit 80 generates an energization phase switching signal CP at every entry of the commutation signal CS. The energization phase switching circuit 80 further maintains a position detection mask signal MZC active for a predetermined time from the entry of the commutation signal CS.

FIG. 28 is a waveform diagram showing, for the sensorless motor M during stable rotor rotation, three electric currents, or phase currents Iu, Iv, and Iw, and three BEMF Vu, Vv, and Vw of the respective motor coils Mu, Mv, and Mw; three potential VU0, VV0, and VW0 of the respective driving terminals U0, V0 and W0; and a position-detection mask signal MZC. In FIG. 28, the horizontal axis represents phases, which correspond to the rotor positions expressed in electrical angles.

The pre-drive circuit 20 turns on and off six power transistors of the output circuit 3 at every energization phase. Here, there are six types I–VI of pattern of the turning on/off and the following energization of the motor coils, shown in FIG. 28. In other words, the energization phases divide one period of the phase current into 60 degrees each. In each energization phase, among the three motor coils Mu, Mv, and Mw, the one allows a source current, that is, a current flowing in the direction from one driving terminal to the center point C (the direction of the arrow shown in FIG. 27) to flow, the other allows a sink current, that is, a current flowing in the reverse direction of the source current to flow, and the rest stays in the non-energized state. In FIG. 28, the sink currents are shown with hatched areas.

In the conventional sensorless motor driving device in each energization phase, the pre-drive circuit 20, for example, maintains the ON states of the high side power transistors 31U, 31V, and 31W in which the source currents flow, and performs a PWM control over the turning on and off of the low side power transistors 32U, 32V, and 32W, in which the sink currents flow. The pre-drive circuit 20 further performs a hard switching for the turning on and off of the power transistors involved in the switching between the energization phases. Thereby, the phase currents Iu, Iv, and Iw take rectangular waveforms. In particular, each of the motor coils Mu, Mv, and Mw repeats to alternately experience the energization period of 120 degrees and the non-energization period of 60 degrees. Furthermore, a phase difference between the phase currents Iu, Iv, and Iw is maintained at 120 degrees.

The rotor rotation induces the BEMF Vu, Vv, and Vw in the motor coils Mu, Mv, and Mw, respectively. The BEMF Vu, Vv, and Vw have a near-sinusoidal waveform. The potentials VU0, VV0, and VW0 of the three driving terminals U0, V0, and W0 of the sensorless motor M are equal to the driving voltages applied by the output circuit 3 with the BEMF Vu, Vv, and Vw overlaid, respectively. Here, fine ripples of the output voltages VU0, VV0, and VW0 caused by the PWM control are omitted in FIG. 28. In each energization phase, the BEMF Vu, Vv, or Vw causes a zero crossing at the non-energized motor coil, that is, the motor coil to which the output circuit 3 does not apply the driving voltage. See white circles ZC shown in FIG. 28. Accordingly, the instant when each of the potentials VU0, VV0, and VW0 of the driving terminals U0, V0, and W0 agrees with the center tap voltage of the motor coils corresponds to the zero crossing ZC of the BEMF Vu, Vv, and Vw. See the black circles ZC0 shown in FIG. 28.

Each level of the BEMF Vu, Vv, and Vw correspond to the angle between the magnetic pole center of the rotor and the magnetic pole center of the stator, that is, a part where each of the magnetic fields generated by the phase currents Iu, Iv, and Iw flowing through the motor coils Mu, Mv, and Mw, are especially concentrated. Especially at the zero crossing, the rotor position agrees with either of six positions predetermined at intervals of 60 degrees in electrical angles; 0, 60, 120, 180, 240, and 300 degrees in FIG. 28. Accordingly, the rotor position is estimated through the detection of the zero crossing ZC0 by each of the potentials VU0, VV0, and VW0 of the driving terminals U0, V0, and W0. Based on the rotor position estimated, the energization of the motor coils is controlled, and then, for example, the angle between the magnetic pole center of the stator and the magnetic pole center of the rotor is maintained within an appropriate range. Thereby, a torque is efficiently produced at the rotor, and maintained at a sufficiently high level. In FIG. 28, the energization phase is changed with a lag of about 30 degrees behind the zero crossing detected, since the commutation signal CS lags about 30 degrees behind the zero crossing detected. Thereby, the torque produced at the rotor is maintained at the maximum, since the angle between the magnetic pole center of the stator and the magnetic pole center of the rotor is maintained substantially equal to 90 degrees in electrical angles Accordingly, the stable rotor rotation is efficiently maintained and resistant to changes of load.

Changes of the potentials VU0, VV0, and VW0 of the driving terminals U0, V0, and W0, respectively, actually include noises caused by turning on and off of the power transistors. The noises are mainly the noises N (cf. FIG. 28) caused by the switching between the energization phases and fine ripples (not shown) caused by the PWM control. The noises provide errors for the zero-crossing detection by the BEMF comparing section 4. In the conventional sensorless motor driving device, the position-detection mask signal MZC is maintained active for the predetermined time at every switching between the energization phases, that is, every generation of the commutation signal CS. See FIG. 28. In that period, the output signals BCU, BCV, and BCW of the BEMF comparing section 4 are masked, and therefore, false detection of the zero crossing due to the noises N caused by the switching between the energization phases is avoided. Furthermore, the PWM mask signal MPWM is maintained active for a predetermined time at every rising/falling edge of the PWM control signal P. In that period, the output signals BCU, BCV, and BCW of the BEMF comparing section 4 are masked, and therefore, false detection of the zero crossing due to the ripples caused by the PWM control is avoided. Thus, the accurate detection of the zero crossing is realized.

The detection of the rotor position in the sensorless motor is based on the detection of the zero crossing through the BEMF in the motor coils, as described above. The above-described detection of the rotor position cannot be used for the start of the sensorless motor since the BEMF is detected only during when the rotor rotates at a speed more than a certain extent. At the start of the sensorless motor, the conventional sensorless motor driving device, for example, uses the forced commutation signal FC from the forced commutation circuit 60 instead of the self-commutation signal SC from the self-commutation circuit 50. See FIG. 27. Thereby, the conventional sensorless motor driving device changes the energization of the motor coils at a constant period, regardless of the actual position of the rotor. The energization control based on the forced commutation signal FC, which is hereafter referred to as a forced commutation control, continues from the start of the sensorless motor for a predetermined time or until the instant when the revolving speed of the rotor attains a fixed value. After that, the forced commutation control is changed into the energization control based on the self-commutation signal SC, which is hereafter referred to as a self-commutation control. Thus, the conventional sensorless motor driving device realizes the start of the sensorless motor, regardless of the detection of the rotor position.

Generally in the brushless motor, the switching between the energization phases periodically changes suction/repulsion forces between the magnetic pole of the stator and the magnetic pole of the rotor, and stress distributions inside both of the stator and the rotor. Thereby, the brushless motor generally causes noises, which are hereafter referred to as motor echo noises. In particular, the motor echo noises easily become excessive when the phase currents Iu, Iv, and Iw show abrupt changes as shown in FIG. 28. Accordingly, gentle changes of the phase currents are desirable for the suppression of the motor echo noises.

In brushless motors provided with position sensors, the detection of the rotor position does not require the non-energization period of the motor coils, in contrast to the sensorless motors. Accordingly, the suppression of the motor echo noises is comparatively easy since gentle changes of the phase currents can be easily realized. See, for example, Published Japanese patent application 2003-174789 and 2003-244983 gazettes. In particular, when the energization control of the motor coils is performed under a PWM control, the detection with the position sensor is maintained with high accuracy, regardless of the ripples caused by the PWM control.

In the sensorless motor, on the other hand, the detection of the zero crossing of the BEMF requires the non-energization period of the motor coils, as described above. However, gentle changes of the phase currents reduce the non-energization periods of the motor coils. In particular, the non-energization periods of the motor coils cannot be secured under the energization control similar to that of the brushless motor provided with position sensor. Furthermore, ripples caused by the PWM control have to be reliably masked since they reduce the accuracy of the zero crossing detection. However, gentle changes of the phase currents require the extension of the PWM control period. Then, the period required for the above-described mask is extended, and thereby, the detection period of the zero crossing is reduced. Thus, the suppression of the motor echo noises obstructs the accurate detection of the zero crossing in the sensorless motor.

The obstruction to the accurate detection of the zero crossing obstructs improvement in the reliability of the self-commutation control, and, in particular, obstructs an increase in the torque produced in the sensorless motor. In other words, the suppression of the motor echo noise is difficult to be compatible with the increase in the torque produced under the self-commutation control.

The obstruction to the accurate detection of the zero crossing, in addition, causes a difficulty of the prompt and reliable start of the sensorless motor as follows. The forced commutation control changes the energization of the motor coils, regardless of the actual rotor position. Accordingly, the angle between the magnetic pole center of the stator and the magnetic pole center of the rotor generally falls outside the optimum range, and thereby, the increase in the torque produced is generally difficult. As a result, the start of the sensorless motor under the forced commutation control has the difficulty of increasing the starting torque, and therefore, the reduction of the starting time is difficult. Furthermore, the starting control is susceptible to changes of load. For example, in the case of a sensorless motor used as a spindle motor of a CD/DVD combination drive, the moment of inertia varies between a CD and a DVD. Furthermore, in the case of a sensorless motor used as a spindle motor of a HDD, the number of the magnetic disks varies with capacities, and further, the disk radius varies with sizes. Stabilization of the start of the sensorless motor for any of such various loads is difficult under the forced commutation control. Resolution of these difficulties requires as prompt and reliable the switching from the forced commutation control to the self-commutation control as possible, at the start of the sensorless motor.

However, the conventional sensorless motor driving device continues the forced commutation control at the start of the sensorless motor, for example, for a predetermined time from the start or until the instant when the revolving speed of the rotor attains a constant value. In other words, the forced commutation control is not changed into the self-commutation control until a state is attained, in which the accurate detection of the zero crossing is considered to be possible. Reduction of the above-described predetermined time is difficult since it impairs the reliability of the start when the accurate detection of the zero crossing is obstructed. On the other hand, the forced commutation control has a difficulty of reducing the time required from the start of the sensorless motor until the instant when the revolving speed of the rotor attains the constant value. Thus, the conventional sensorless motor driving device has the difficulty of a prompt and reliable switching from the forced commutation control to the self-commutation control at the start of the sensorless motor. Therefore, a prompt and reliable start of the sensorless motor is difficult.

SUMMARY OF THE INVENTION

An object of the present invention is to provide a sensorless motor driving device and its driving method detecting the zero crossing of BEMF with high accuracy and motor echo noises suppressed, thereby realizing the prompt and reliable start of the sensorless motor.

A sensorless motor driving device according to a first aspect of the present invention comprises:

an output circuit energizing a motor coil of a sensorless motor;

a PWM control section generating a PWM control signal showing a timing of the energization of the motor coil, based on a position signal showing an estimated rotor position of the sensorless motor;

an energization phase switching circuit switching between energization phases in synchronization with a commutation signal;

a pre-drive circuit selecting the motor coil corresponding to the energization phase, changing the energization of the selected motor coil through the output circuit according to the PWM control signal, and, in particular, disabling the energization of the specific motor coil by the output circuit in a PWM disable period;

a BEMF comparing section detecting a BEMF induced in the motor coil and comparing the BEMF with a center tap voltage of the motor coil;

a self-commutation circuit detecting agreement between the BEMF and the center tap voltage, that is, a zero crossing during a BEMF detection period, and generating a self-commutation signal when detecting the zero crossing; and a count section generating the commutation signal based on the self-commutation signal, measuring an interval of the commutation signal, generating the position signal based on the interval, establishing the PWM disable period and the BEMF detection period based on the position signal, in particular, starting the PWM disable period earlier than the start of the BEMF detection period and finishing both of the PWM disable period and the BEMF detection period in synchronization with the commutation signal.

This sensorless motor driving device first establishes the PWM disable period and disables the energizing of the specific motor coil in that period. Thus, the non-energization period of motor coil is secured. Next, the BEMF detection period starts with a time lag behind the start of the PWM disable period. Thereby, the PWM control of the energization of one motor coil has already stopped at the start of the BEMF detection period for the motor coil. Accordingly, the accurate detection of the zero crossing is possible. Furthermore, the PWM disable period and the BEMF detection period are both finished in synchronization with the commutation signal, in other words, at the detection of the zero crossing, along with the switching between the energization phases. Thereby, the energizing of the motor coil and the PWM control over it can be promptly resumed upon the detection of the zero crossing. In the case of an energization control of motor coils for gentle changes of phase currents, for example, the phase current is allowed to start rising upon the detection of the zero crossing. Accordingly, in a period during the rotor is positioned within the range suitable for the producing of torque, the phase current is large enough, and therefore, the torque produced is high enough. Thus, the sensorless motor driving device according to the first aspect of the present invention suppresses motor echo noises by the gentle changes of the phase currents, and can fully increase the torque produced.

In the sensorless motor driving device according to the first aspect of the present invention, preferably, the PWM control section comprises:

an instruction circuit setting a desired current based on an original instruction and the position signal;

a current comparing section detecting a current of the motor coil and comparing the detected current with the desired current; and a PWM control circuit generating the PWM control signal with reference to the difference between the detected current and the desired current.

In other words, the PWM control section performs a feedback control of the phase currents. More preferably, the instruction circuit stepwise increases and degreases the desired current. Thereby, the motor echo noises are suppressed since the phase currents are controlled to be shaped into a gentle waveform.

In the sensorless motor driving device according to the first aspect of the present invention, preferably, the count section starts the BEMF detection period at one of the instant when a constant time elapses from the start of the PWM disable period and the instant when the estimated rotor position changes by a constant amount from the value at the start of the PWM disable period, whichever comes first. Thereby, in the case of the rotor rotation at low speed, the BEMF detection period starts at the instant when the constant time elapses from the start of the PWM disable period. On the other hand, in the case of the rotor rotation at high speed, the BEMF detection period starts at the instant when the estimated position of the rotor changes by the constant amount from the value at the start of the PWM disable period. As a result, the BEMF detection period is secured long enough, regardless of the actual revolving speed of the rotor, and therefore, the accurate detection of the zero crossing is possible.

A sensorless motor driving device according to a second aspect of the present invention comprises:

an output circuit energizing a motor coil of a sensorless motor;

a PWM control section generating a PWM control signal showing a timing of the energization of the motor coil, based on a position signal showing an estimated rotor position of the sensorless motor;

an energization phase switching circuit switching between energization phases in synchronization with a commutation signal;

a pre-drive circuit selecting the motor coil corresponding to the energization phase and changing the energization of the selected motor coil through the output circuit according to the PWM control signal;

a BEMF comparing section detecting a BEMF induced in the motor coil and comparing the BEMF with a center tap voltage of the motor coil;

a self-commutation circuit detecting agreement between the BEMF and the center tap voltage, that is, a zero crossing during a BEMF detection period, and generating a self-commutation signal when detecting the zero crossing;

a forced commutation circuit generating a forced commutation signal in a predetermined period;

a selection circuit selecting, as the commutation signal, one of the self-commutation signal and the forced commutation signal, whichever enters first during the BEMF detection period; and a count circuit measuring an interval of the commutation signal, generating the position signal based on the interval, establishing the BEMF detection period based on the position signal, and, in particular, finishing the BEMF detection period in synchronization with the commutation signal.

This sensorless motor driving device secures the BEMF detection period during the forced commutation control, and thereby, performs the operation of the zero crossing detection in parallel with the forced commutation control. The commutation signal is either the self-commutation signal or the forced commutation signal, whichever is first generated, and the BEMF detection period is finished due to the generation of the commutation signal. The self-commutation signal is surely selected as the commutation signal at the generation of the self-commutation signal, or at the zero crossing detection, since the self-commutation signal is only generated during the BEMF detection period. Thus, the forced commutation control is promptly changed into the self-commutation control by the zero crossing detection. When the sensorless motor starts under the forced commutation control, in particular, the forced commutation control is promptly and securely switched to the self-commutation control. Accordingly, the prompt and reliable start of the sensorless motor is possible.

In the sensorless motor driving device according to the second aspect of the present invention, preferably, the PWM control section comprises:

an instruction circuit setting a desired current based on an original instruction and the position signal;

a current comparing section detecting a current of the motor coil and comparing the detected current with the desired current; and a PWM control circuit generating the PWM control signal with reference to the difference between the detected current and the desired current.

In other words, the PWM control section performs the feedback control over the phase currents. More preferably, the instruction circuit stepwise increases and decreases the desired currents. Thereby, the motor echo noises are suppressed since the phase currents are controlled to be shaped into a gentle waveform.

In the sensorless motor driving device according to the second aspect of the present invention, preferably, the count circuit establishes the PWM disable period based on the position signal, and, in particular, starts the PWM disable period earlier than the BEMF detection period and finishes the PWM disable period in synchronization with the commutation signal; and the pre-drive circuit disables the energization of the specific motor coil by the output circuit in the PWM disable period.

This sensorless motor driving device first establishes the PWM disable period, and disables the energizing of the specific motor coil in that period. Thus, the non-energization period of the motor coil is secured. Next, the BEMF detection period starts with a time lag behind the start of the PWM disable period. Thereby, the PWM control of the energization of one motor coil has already stopped at the start of the BEMF detection period for the motor coil. Accordingly, the accurate detection of the zero crossing is possible. Furthermore, the PWM disable period and the BEMF detection period are both finished in synchronization with the commutation signal, in other words, at the zero crossing detection, along with the switching between the energization phases. Thereby, the energizing of the motor coil and the PWM control over it can be promptly resumed upon the zero crossing detection. In the case of an energization control of motor coils for gentle changes of phase currents, for example, the phase current is allowed to start rising upon the zero crossing detection. Accordingly, in a period during the rotor is positioned within the range suitable for the producing of torque, the phase current is large enough, and therefore, the torque produced is high enough. Thus, the sensorless motor driving device according to the second aspect of the present invention suppresses motor echo noises by the gentle changes of the phase currents, and can fully increase the torque produced. Especially at the start of the sensorless motor, the starting torque can be fully increased, and therefore, reduction of the starting time is easy, and furthermore the starting control is resistant to changes of load.

In the sensorless motor driving device according to the second aspect of the present invention, preferably, the count circuit starts the BEMF detection period at one of the instant when a constant time elapses from the start of the PWM disable period and the instant when the estimated rotor position changes by a constant amount from the value at the start of the PWM disable period, whichever comes first. Thereby, in the case of the rotor rotation at low speed, the BEMF detection period starts at the instant when the constant time elapses from the start of the PWM disable period. On the other hand, in the case of the rotor rotation at high speed, the BEMF detection period starts at the instant when the estimated position of the rotor changes by the constant amount from the value at the start of the PWM disable period. As a result, the BEMF detection period is secured long enough, regardless of the actual revolving speed of the rotor, and therefore, the accurate detection of the zero crossing is possible. Especially at the start of the sensorless motor, the switching from the forced commutation control to the self-commutation control can be promptly and reliably performed, and therefore, the prompt and reliable start of the sensorless motor is possible.

In the sensorless motor driving device according to the second aspect of the present invention, preferably, the forced commutation circuit constantly generates the forced commutation signal. When an abrupt vibration/shock from the outside obstructs the stable rotor rotation, and thereby the generation of the self-commutation signal is suddenly interrupted, for example, the forced commutation signal is promptly selected as the commutation signal. In other words, the self-commutation control is promptly changed into the forced commutation control. Accordingly, the sensorless motor can be smoothly restarted.

In the sensorless motor driving device according to the second aspect of the present invention, preferably, the forced commutation circuit extends the period of the forced commutation signal at the BEMF detection period, when the self-commutation signal enters earlier than the forced commutation signal enters during the previous BEMF detection period. Once the zero crossing is detected and the self-commutation signal is generated, the zero crossing will be probably detected and the self-commutation signal will be probably generated also in the next BEMF detection period. Accordingly, the above-described extension of the period of the forced commutation signal further raises the probability of the zero crossing detection in the next BEMF detection period. Thereby, once the zero crossing is detected, the forced commutation control is promptly and reliably changed into the self-commutation control. Thus, the prompt and reliable start of the sensorless motor is possible.

In the sensorless motor driving device according to the second aspect of the present invention, preferably, the forced commutation circuit extends the period of the forced commutation signal at the BEMF detection period, when the forced commutation signal repeats to enter earlier than the self-commutation signal enters during the previous BEMF detection periods a predetermined number of times in succession. More preferably, the energization phases of the above-described predetermined number of times are equivalent of a period of 360 degrees in electrical angles. When the selection of the forced commutation signal continues as described above, the forced commutation signal fails to synchronize to the rotor rotation. Especially at the start of the sensorless motor, there is a high probability that the period of the forced commutation signal is much shorter than the actual rotation period of the rotor. Such a phenomenon tends to occur under heavy load conditions, for example. Accordingly, the extended period of the forced commutation signal as described above may be close to the actual rotation period of the rotor. Thereby, the possibility of the zero crossing detection is enhanced. As a result, the prompt and reliable switching from the forced commutation control to the self-commutation control can be achieved. Thus, the prompt and reliable start of the sensorless motor is possible.

In the sensorless motor driving device according to the second aspect of the present invention, preferably, the forced commutation circuit generates at least two types of pulse signal with various periods and selects one of the pulse signals as the forced commutation signal. More preferably, the pulse signals include a first signal having a fixed period and a second signal having double the period of the first signal. In the case of the start of the sensorless motor by the forced commutation control based on the first signal, for example, if the self-commutation signal is difficult to be generated, the first signal is not synchronized with the rotor rotation. In particular, there is a high possibility that the period of the first signal is much shorter than the actual period of the rotor rotation. Such a phenomenon tends to occur under heavy load conditions, for example. At that time, the first signal is changed into the second signal. There is a high possibility that the period of the second signal is close to the actual period of the rotor rotation, and therefore, the possibility of the zero crossing detection is enhanced. As a result, the prompt and reliable switching from the forced commutation control to the self-commutation control can be achieved. Accordingly, the prompt and reliable start of the sensorless motor is possible.

A sensorless motor driving method according to a first aspect of the present invention comprises the steps of:

generating a PWM control signal showing a timing of the energization of a motor coil of a sensorless motor, based on a position signal showing an estimated rotor position of the sensorless motor;

selecting the motor coil corresponding to an energization phase, and energizing the selected motor coil according to the PWM control signal;

starting a PWM disable period based on the position signal;

disabling the energization of the specific motor coil during the PWM disable period;

detecting a BEMF induced in the motor coil and comparing the BEMF with a center tap voltage of the motor coil;

starting the BEMF detection period after the start of the PWM disable period;

detecting agreement between the BEMF and the center tap voltage, that is, a zero crossing during a BEMF detection period, and generating a self-commutation signal when detecting the zero crossing;

generating a commutation signal based on the self-commutation signal;

finishing both of the PWM disable period and the BEMF detection period in synchronization with the commutation signal;

switching between energization phases in synchronization with the commutation signal;

measuring an interval of the commutation signal; and generating the position signal based on the interval.

This sensorless motor driving method first establishes the PWM disable period, and disables the energization of the specific motor coil in that period. Thus, the non-energizing period of the motor coil is secured. Next, the BEMF detection period starts with a time lag behind the start of the PWM disable period. Thereby, the PWM control of the energization of one motor coil has already stopped at the start of the BEMF detection period for the motor coil. Accordingly, the accurate detection of the zero crossing is possible. Furthermore, the PWM disable period and the BEMF detection period are both finished in synchronization with the commutation signal, in other words, at the detection of the zero crossing, along with the switching between the energization phases. Thereby, the energizing of the motor coil and the PWM control over it can be promptly resumed upon the detection of the zero crossing. In the case of an energization control of motor coils for gentle changes of phase currents, for example, the phase current is allowed to start rising upon the detection of the zero crossing. Accordingly, in a period during the rotor is positioned within the range suitable for the producing of torque, the phase current is large enough, and therefore, the torque produced is high enough. Thus, the sensorless motor driving method according to the first aspect of the present invention suppresses motor echo noises by the gentle changes of the phase currents, and can fully increase the torque produced.

In the sensorless motor driving method according to the first aspect of the present invention, preferably, the step of generating the PWM control signal includes the substeps of:

setting a desired current based on an original instruction and the position signal;

detecting a current of the motor coil and comparing the detected current with the desired current; and generating the PWM control signal with reference to the difference between the detected current and the desired current.

In other words, the PWM control corresponds to a feedback control of the phase currents. More preferably, the desired current is stepwise increased and degreased in every substep of setting the desired current. Thereby, the motor echo noises are suppressed since the phase currents are controlled to be shaped into a gentle waveform.

The sensorless motor driving method according to the first aspect of the present invention, preferably, comprises the step of measuring an elapsed time and an amount of change of the estimated rotor position from the start of the PWM disable period. Then, the step of starting the BEMF detection period is performed at one of the instant when a constant time elapses from the start of the PWM disable period and the instant when the estimated rotor position changes by a constant amount from the value at the start of the PWM disable period, whichever comes first. Thereby, in the case of the rotor rotation at low speed, the BEMF detection period starts at the instant when the constant time elapses from the start of the PWM disable period. On the other hand, in the case of the rotor rotation at high speed, the BEMF detection period starts at the instant when the estimated position of the rotor changes by the constant amount from the value at the start of the PWM disable period. As a result, the BEMF detection period is secured long enough, regardless of the actual revolving speed of the rotor, and therefore, the accurate detection of the zero crossing is possible.

A sensorless motor driving method according to a second aspect of the present invention comprises the steps of:

generating a PWM control signal showing a timing of the energization of a motor coil, based on a position signal showing an estimated rotor position of a sensorless motor;

selecting the motor coil corresponding to an energization phase and energizing the selected motor coil according to the PWM control signal;

detecting a BEMF induced in the motor coil and comparing the BEMF with a center tap voltage of the motor coil;

starting a BEMF detection period based on the position signal;

detecting agreement between the BEMF and the center tap voltage, that is, a zero crossing during the BEMF detection period, and generating a self-commutation signal when detecting the zero crossing;

generating a forced commutation signal in a predetermined period;

selecting, as a commutation signal, one of the self-commutation signal and the forced commutation signal, whichever enters first during the BEMF detection period;

finishing the BEMF detection period in synchronization with the commutation signal;

changing the energization phases in synchronization with the commutation signal;

measuring an interval of the commutation signal; and generating the position signal based on the interval of the commutation signal.

This sensorless motor driving method secures the BEMF detection period during the forced commutation control, and thereby, performs the operation of the zero crossing detection in parallel with the forced commutation control. The commutation signal is either the self-commutation signal or the forced commutation signal, whichever is first generated, and the BEMF detection period is finished due to the generation of the commutation signal. The self-commutation signal is surely selected as the commutation signal at the generation of the self-commutation signal, or at the zero crossing detection, since the self-commutation signal is only generated during the BEMF detection period. Thus, the forced commutation control is promptly changed into the self-commutation control by the zero crossing detection. When the sensorless motor starts under the forced commutation control, in particular, the forced commutation control is promptly and securely switched to the self-commutation control. Accordingly, the prompt and reliable start of the sensorless motor is possible.

In the sensorless motor driving method according to the second aspect of the present invention, preferably, the step of generating the PWM control signal includes the substeps of:

setting a desired current based on an original instruction and the position signal;

detecting a current of the motor coil and comparing the detected current with the desired current; and generating the PWM control signal with reference to the difference between the detected current and the desired current.

In other words, the PWM control corresponds to the feedback control over the phase currents. More preferably, the desired current is stepwise increased and decreased in every substep of setting said desired current. Thereby, the motor echo noises are suppressed since the phase currents are controlled to be shaped into a gentle waveform.

The sensorless motor driving method according to the second aspect of the present invention, preferably, comprises the steps of:

starting a PWM disable period earlier than the BEMF detection period based on the position signal;

disabling the energization of the specific motor coil during the PWM disable period; and finishing the PWM disable period in synchronization with the commutation signal.

This sensorless motor driving method first establishes the PWM disable period, and disables the energizing of the specific motor coil in that period. Thus, the non-energization period of the motor coil is secured. Next, the BEMF detection period starts with a time lag behind the start of the PWM disable period. Thereby, the PWM control of the energization of one motor coil has already stopped at the start of the BEMF detection period for the motor coil. Accordingly, the accurate detection of the zero crossing is possible. Furthermore, the PWM disable period and the BEMF detection period are both finished in synchronization with the commutation signal, in other words, at the zero crossing detection, along with the switching between the energization phases. Thereby, the energizing of the motor coil and the PWM control over it can be promptly resumed upon the zero crossing detection. In the case of an energization control of motor coils for gentle changes of phase currents, for example, the phase current is allowed to start rising upon the zero crossing detection. Accordingly, in a period during the rotor is positioned within the range suitable for the producing of torque, the phase current is large enough, and therefore, the torque produced is high enough. Thus, the sensorless motor driving method according to the second aspect of the present invention suppresses motor echo noises by the gentle changes of the phase currents, and can fully increase the torque produced. Especially at the start of the sensorless motor, the starting torque can be fully increased, and therefore, reduction of the starting time is easy, and furthermore the starting control is resistant to changes of load.

The sensorless motor driving method according to the second aspect of the present invention, preferably, comprises the step of measuring an elapsed time and an amount of change of the estimated rotor position from the start of the PWM disable period. Then, the step of starting the BEMF detection period is performed at one of the instant when a constant time elapses from the start of the PWM disable period and the instant when the estimated rotor position changes by a constant amount from the value at the start of the PWM disable period, whichever comes first. Thereby, in the case of the rotor rotation at low speed, the BEMF detection period starts at the instant when the constant time elapses from the start of the PWM disable period. On the other hand, in the case of the rotor rotation at high speed, the BEMF detection period starts at the instant when the estimated position of the rotor changes by the constant amount from the value at the start of the PWM disable period. As a result, the BEMF detection period is secured long enough, regardless of the actual revolving speed of the rotor, and therefore, the accurate detection of the zero crossing is possible. Especially at the start of the sensorless motor, the switching from the forced commutation control to the self-commutation control can be promptly and reliably performed, and therefore, the prompt and reliable start of the sensorless motor is possible.

In the sensorless motor driving method according to the second aspect of the present invention, preferably, the step of generating the forced commutation signal is constantly performed. When an abrupt vibration/shock from the outside obstructs the stable rotor rotation, and thereby the generation of the self-commutation signal is suddenly interrupted, for example, the forced commutation signal is promptly selected as the commutation signal. In other words, the self-commutation control is promptly changed into the forced commutation control. Accordingly, the sensorless motor can be smoothly restarted.

The sensorless motor driving method according to the second aspect of the present invention, preferably, comprises the step of extending the period of the forced commutation signal at the BEMF detection period, when the self-commutation signal enters earlier than the forced commutation signal enters during the previous BEMF detection period. Once the zero crossing is detected and the self-commutation signal is generated, the zero crossing will be probably detected and the self-commutation signal will be probably generated also in the next BEMF detection period. Accordingly, the above-described extension of the period of the forced commutation signal further raises the probability of the zero crossing detection in the next BEMF detection period. Thereby, once the zero crossing is detected, the forced commutation control is promptly and reliably changed into the self-commutation control. Thus, the prompt and reliable start of the sensorless motor is possible.

The sensorless motor driving method according to the second aspect of the present invention, preferably, comprises the step of extending the period of the forced commutation signal at the BEMF detection period, when the forced commutation signal repeats to enter earlier than the self-commutation signal enters during the previous BEMF detection periods a predetermined number of times in succession. More preferably, the energization phases of the above-described predetermined number of times are equivalent of a period of 360 degrees in electrical angles. When the selection of the forced commutation signal continues as described above, the forced commutation signal fails to synchronize to the rotor rotation. Especially at the start of the sensorless motor, there is a high probability that the period of the forced commutation signal is much shorter than the actual rotation period of the rotor. Such a phenomenon tends to occur under heavy load conditions, for example. Accordingly, the extended period of the forced commutation signal as described above may be close to the actual rotation period of the rotor. Thereby, the possibility of the zero crossing detection is enhanced. As a result, the prompt and reliable switching from the forced commutation control to the self-commutation control can be achieved. Thus, the prompt and reliable start of the sensorless motor is possible.

In the sensorless motor driving device according to the second aspect of the present invention, preferably, the step of generating the forced commutation signal includes the substeps of generating at least two types of pulse signal with various periods and selecting one of the pulse signals as the forced commutation signal. More preferably, the pulse signals include a first signal having a fixed period and a second signal having double the period of the first signal. In the case of the start of the sensorless motor by the forced commutation control based on the first signal, for example, if the self-commutation signal is difficult to be generated, the first signal is not synchronized with the rotor rotation. In particular, there is a high possibility that the period of the first signal is much shorter than the actual period of the rotor rotation. Such a phenomenon tends to occur under heavy load conditions, for example. At that time, the first signal is changed into the second signal. There is a high possibility that the period of the second signal is close to the actual period of the rotor rotation, and therefore, the possibility of the zero crossing detection is enhanced. As a result, the prompt and reliable switching from the forced commutation control to the self-commutation control can be achieved. Accordingly, the prompt and reliable start of the sensorless motor is possible.

The sensorless motor driving device and method according to the first aspect of the present invention cause the PWM disable period to start earlier than the BEMF detection period. Furthermore, at the detection of the zero crossing, they cause the PWM disable period and the BEMF detection period to finish upon the switching between the energization phases. Accordingly, the accurate detection of the zero crossing is possible since the non-energization period of the motor coil is secured when motor echo noises are suppressed, for example, by the gentle changes of the phase currents. Furthermore, the torque produced may be fully increased since the phase currents promptly rise upon the detection of the zero crossing. Thereby, the driving control of the sensorless motor is resistant especially to the changes of load. Therefore, the sensorless motor driving device and method according to the first aspect of the present invention have an advantage in the driving of the sensorless motors used, for example, as the spindle motors of CD/DVD combination drives, and the spindle motors for general-purpose use in HDDs of various capacities/sizes.

The sensorless motor driving device and method according to the second aspect of the present invention secures the BEMF detection period during the forced commutation control, and thereby, operates in parallel the zero crossing detection. Furthermore, they realize the prompt and reliable switching from the forced commutation control to the self-commutation control at the zero crossing detection, by selecting as the commutation signal either the self-commutation signal or the forced commutation signal, whichever is first generated. Accordingly, in the case of the start of the sensorless motor under the forced commutation control, in particular, the prompt and reliable start of the sensorless motor is possible. Therefore, the sensorless motor driving device and method according to the second aspect of the present invention have an advantage in the driving of the sensorless motors used, for example, as the spindle motors of CD/DVD drives in the improvement in quality of reproduction. In addition, they have an advantage in the driving of the sensorless motors used as the spindle motors of HDDs in the enhancement of operating speed.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 4 is a table showing each state of phase currents Iu, Iv, and Iw in each energization phase I–VI for the sensorless motor driving device according to Embodiment 1 of the present invention;

Figure 1:
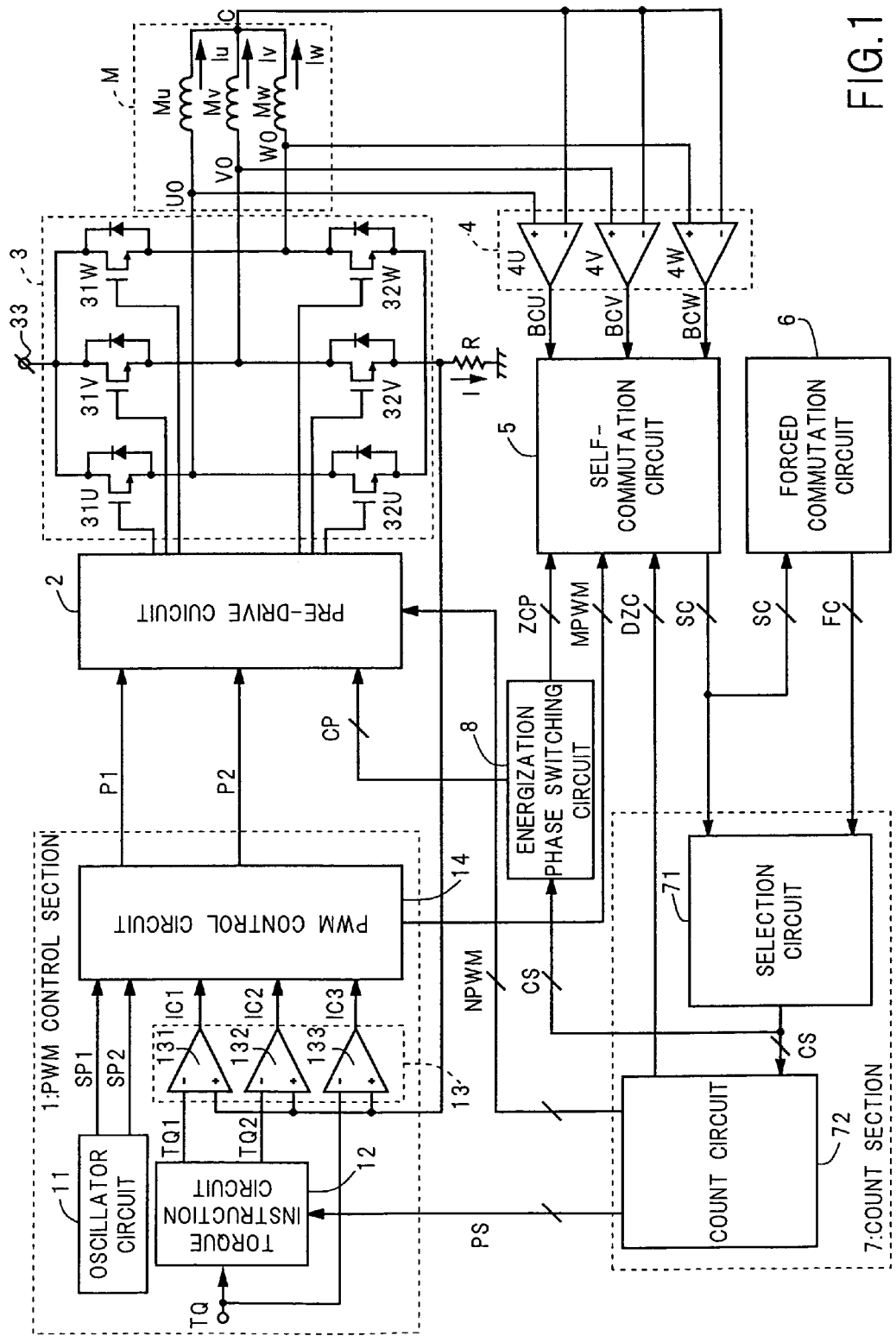
FIG. 1 is a block diagram showing a sensorless motor driving device according to Embodiment 1 of the present invention.

It will be recognized that some or all of the Figures are schematic representations for purposes of illustration and do not necessarily depict the actual relative sizes or locations of the elements shown.

DETAILED DESCRIPTION OF THE INVENTION

The following explains the best embodiments of the present invention, referring to the drawings.

<<Embodiment 1>>

FIG. 1 is the block diagram showing a sensorless motor driving device according to Embodiment 1 of the present invention. This sensorless motor driving device is aimed at driving a sensorless motor M with three phases (U, V, and W phases), for example. The sensorless motor M comprises, for example, three Y-connected motor coils Mu, Mv, and Mw, three driving terminals U0, V0, and W0, and a center tap C of the motor coils. The sensorless motor driving device according to Embodiment 1 of the present invention comprises a PWM control section 1, a pre-drive circuit 2, an output circuit 3, a BEMF comparing section 4, a self-commutation circuit 5, a forced commutation circuit 6, a count section 7, and an energization phase switching circuit 8.

The output circuit 3 connects in parallel three series connections of two power transistors between a power supply terminal 33 maintained at a constant, high potential and a ground terminal. The six power transistors are preferably MOSFETs, or alternatively, may be IGBTs or bipolar transistors. A freewheel diode is connected to each of the power transistors. The freewheel diode is preferably the body diode of the corresponding power transistor, or alternatively, may be a diode separated from the power transistor. The nodes between the high side power transistors 31U, 31V, and 31W and the low side power transistors 32U, 32V, and 32W are connected to the three driving terminals U0, V0, and W0 of the sensorless motor M, respectively. Furthermore, a current detection resistor R is connected between the low side power transistors 32U, 32V, and 32W and the ground terminal.

The PWM control section 1 includes an oscillator circuit 11, a torque instruction circuit 12, a current comparing section 13, and a PWM control circuit 14. The oscillator circuit 11 generates two set pulse signals SP1 and SP2. The two set pulse signals SP1 and SP2 preferably have the same frequency, which is the career frequency of the PWM control. Furthermore, the phase difference between the two signals is maintained at a constant value, preferably 180 degrees.

The torque instruction circuit 12 receives an original torque instruction TQ from an external microprocessor, for example. The original torque instruction TQ is preferably an analog signal, and its level shows a desired value of a torque to be produced in the sensorless motor M, that is, a desired value of an output current I from the output circuit 3 to the sensorless motor M. The torque instruction circuit 12 further generates an increasing torque instruction TQ1 and a decreasing torque instruction TQ2 based on the original torque instruction TQ as follows. Here, the increasing torque instruction TQ1 and the decreasing torque instruction TQ2 are preferably analog signals similar to the original torque instruction TQ, and those levels show desired values of two of the three phase currents Iu, Iv, and Iw, which flow in the same direction. Then, the level of the original torque instruction TQ shows a desired value of the rest of the phase currents. The pre-drive circuit 2 determines, in every energization phase, the actual correspondences among the original torque instruction TQ, the increasing torque instruction TQ1, the decreasing torque instruction TQ2, and the desired values of the three phase currents Iu, Iv, and Iw. The details will be described later.

Figure 2:
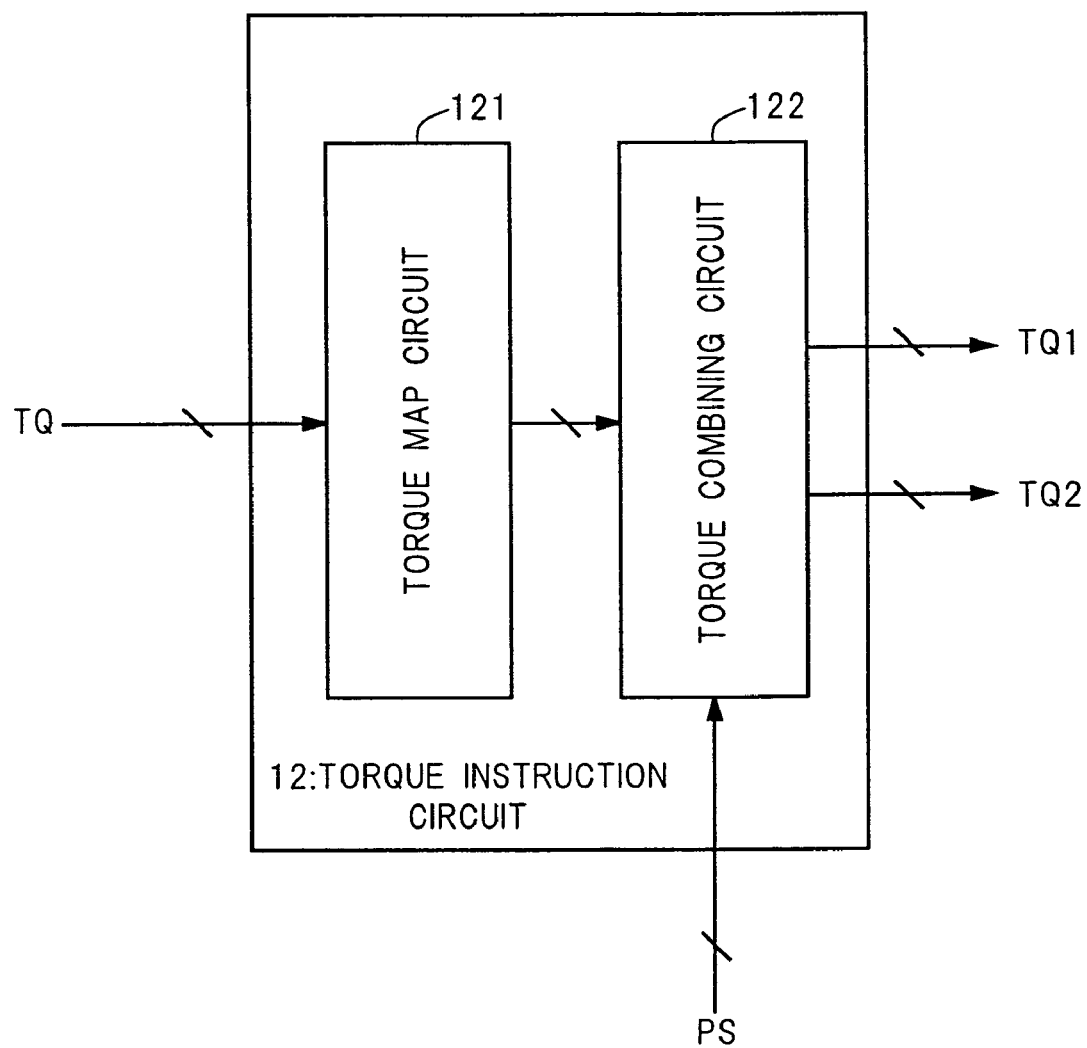
FIG. 2 is a block diagram showing the configuration inside a torque instruction circuit 12 in the sensorless motor driving device according to Embodiment 1 of the present invention.

FIG. 2 is the block diagram showing the configuration inside the torque instruction circuit 12. The torque instruction circuit 12 includes a torque map circuit 121 and a torque combining circuit 122.

The torque map circuit 121 stores a data map predetermined. The data map shows patterns of changes in level of the increasing torque instruction TQ1 and the decreasing torque instruction TQ2. Preferably, the patterns of the increasing torque instruction TQ1 and the decreasing torque instruction TQ2 are expressed as sequences of increasing and degreasing ratios in level to the original torque instruction TQ, respectively. Here, the sum of the levels of the increasing torque instruction TQ1 and the decreasing torque instruction TQ2 is equal to the level of the original torque instruction TQ. The torque map circuit 121 further receives the original torque instruction TQ and determines the levels of the increasing torque instruction TQ1 and the decreasing torque instruction TQ2 from the patterns expressed in the data map and the level of the original torque instruction TQ. The torque map circuit 121 preferably multiplies the level of the original torque instruction TQ by two series of ratios read from the data map, and sets the thereby produced series of the multiplication values as the respective series of the levels of the increasing torque instruction TQ1 and the decreasing torque instruction TQ2.

The torque combining circuit 122 actually generates the increasing torque instruction TQ1 and the decreasing torque instruction TQ2. The torque combining circuit 122, in particular, synchronizes the changes in level of the instructions to the position signal PS, according to the pattern determined by the torque map circuit 121.

Figure 3:
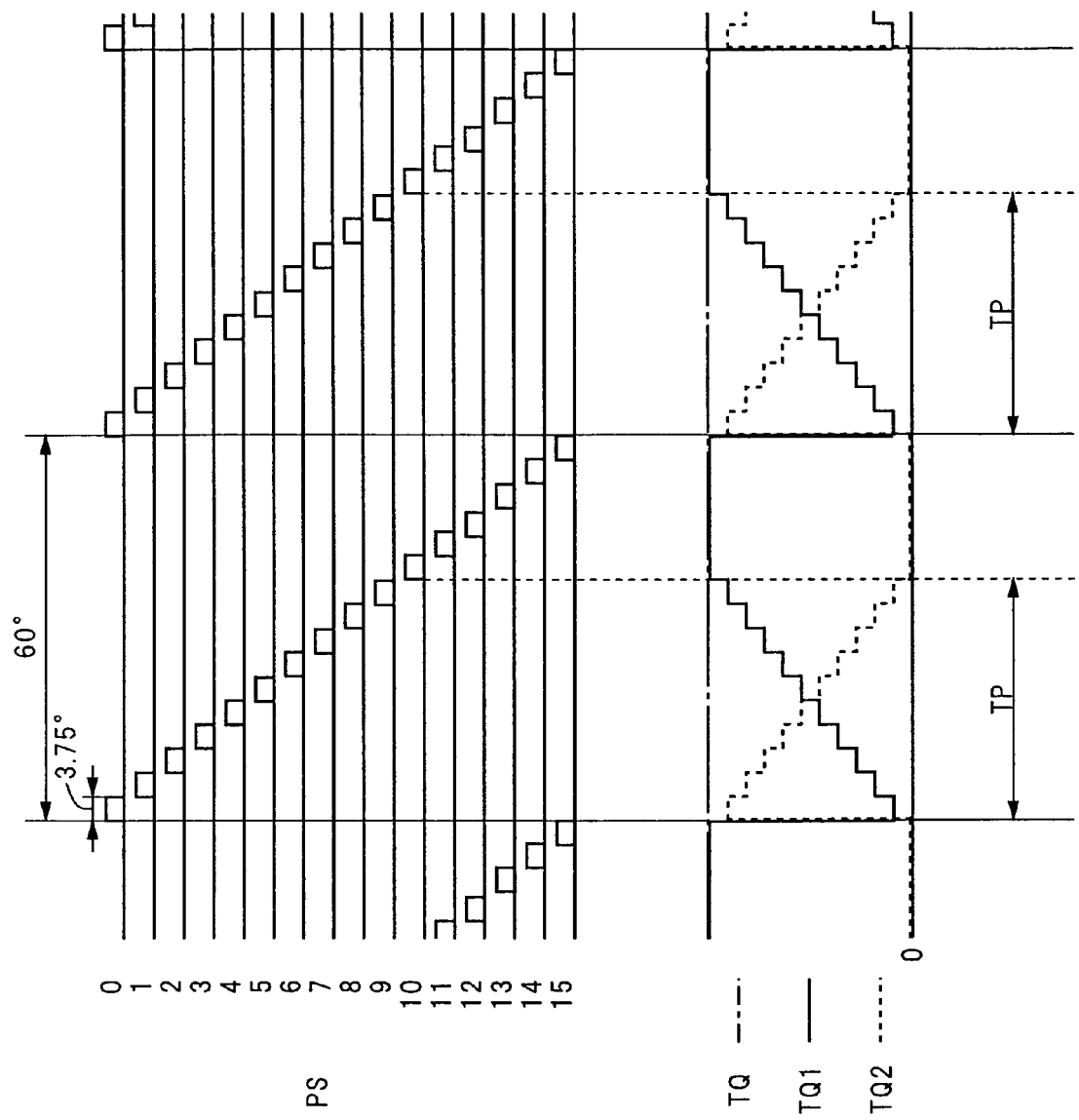
FIG. 3 is a waveform diagram of a position signal PS, an original torque instruction TQ, an increasing torque instruction TQ1, and a decreasing torque instruction TQ2 for the sensorless motor driving device according to Embodiment 1 of the present invention.

FIG. 3 is the waveform diagram of the position signal PS, the original torque instruction TQ, the increasing torque instruction TQ1, and the decreasing torque instruction TQ2. The position signal PS is preferably a parallel signal of 16 lines. The number of the signal lines may be other number, for example, 8 or 32. The position signal PS includes 16 rectangular pulses. In FIG. 3, the pulses are numbered 0, 1, 2, . . . , and 15. The pulses have a pulse interval and a pulse width substantially equal to 60° and 60°/16=3.75° in electrical angles, respectively. Furthermore, the phases of the pulses lag in order of the numbers 0–15 by substantially 3.75° each in electrical angles. The top pulse No. 0 is synchronized to the switching between the energization phases. The details will be described later. Hence, the series of the pulses numbered 0–15 divides the period of one energization phase into 16 segments of 3.75° each in electrical angles. In other words, the pulses numbered 0–15 indicate the estimated rotor positions of the sensorless motor M in steps of 3.75° in electrical angles.

On the data map of the torque map circuit 121, preferably, the increasing torque instruction TQ1 is expressed as the sequence of 10 increasing ratios that consist of 1/11, 2/11, 3/11, . . . , and 10/11; and the decreasing torque instruction TQ2 is expressed as the sequence of 10 decreasing ratios that consist of 10/11, 9/11, 8/11, . . . , and 1/11. The torque map circuit 121 then sets a series of the levels of the increasing torque instruction TQ1 at 1/11, 2/11, . . . , and 10/11 times of the level of the original torque instruction TQ, and sets a series of the levels of the decreasing torque instruction TQ2 at 10/11, 9/11, . . . , and 1/11 times of the level of the original torque instruction TQ.

The torque combining circuit 122 first brings 10 levels of the increasing torque instruction TQ1 and the decreasing torque instruction TQ2 into correspondence with the pulses numbered 0–9 of the position signal PS, respectively. Next, the torque combining circuit 122 cuts from the original torque instruction TQ, pieces of 3.75° each in electrical angles, which is a pulse width of the position signal PS, in synchronization with the rising edges of the pulses numbered 0–9 of the position signal PS. Furthermore, the torque combining circuit 122 converts the levels of the pieces cut from the original torque instruction TQ into the levels corresponding to the pulses numbered 0–9, respectively, and sends the pieces in sequence to the current comparing section 13 (cf. FIG. 1) as the increasing torque instruction TQ1 and the decreasing torque instruction TQ2. Thus, the level of the increasing torque instruction TQ1, as shown by the solid line in FIG. 3, rises from 1/11 to 11/11=1 times of the level of the original torque instruction TQ shown by the alternate long and short dash line in FIG. 3, in steps of 1/11 times of the level of the original torque instruction TQ, during the period TP of 37.5° in electrical angles from the switching between the energization phases. On the other hand, the level of the decreasing torque instruction TQ2, as shown by the broken line in FIG. 3, falls from 10/11 times of the level of the original torque instruction TQ to 0 in steps of 1/11 times of the original torque instruction TQ during the same period TP. Except during the above-described period TP, the levels of the increasing torque instruction TQ1 and the decreasing torque instruction TQ2 are further maintained at the level of the original torque instruction TQ and 0, respectively.

The duration TP of the rising of the increasing torque instruction TQ1 and the falling of the decreasing torque instruction TQ2, the increment in level of the increasing torque instruction TQ1, and the decrement in level of the decreasing torque instruction TQ2 may be set at other values. In particular, the increment and decrement in level may be changed for the duration TP. The changes can be easily realized by the change of the data map stored in the torque map circuit 121. Furthermore, the levels of the increasing torque instruction TQ1 and the decreasing torque instruction TQ2 may be continuously changed. However, the sum of the levels of the increasing torque instruction TQ1 and the decreasing torque instruction TQ2 should be maintained to be equal to the level of the original torque instruction TQ in any of the above-described cases.

The current comparing section 13 includes three comparators 131, 132, and 133. The three comparators 131, 132, and 133 compare the levels of the increasing torque instruction TQ1, the decreasing torque instruction TQ2, and the original torque instruction TQ, respectively, with the amount of the voltage drop across the current detection resistor R. The current detection resistor R allows the output current I of the output circuit 3 to flow, and thereby, the amount of the voltage drop across the current detection resistor R corresponds to the level of the output current I. On the other hand, the levels of the increasing torque instruction TQ1, the decreasing torque instruction TQ2, and the original torque instruction TQ indicate the desired values of the three phase currents Iu, Iv, and Iw, respectively. Accordingly, three output signals IC1, IC2, and IC3 of the current comparing section 13 indicate the differences between the output current I of the output circuit 3 and the desired values of the three phase currents Iu, Iv, and Iw, respectively.

The PWM control circuit 14 first raises the level of a first PWM control signal P1 in synchronization with the rising edge of the first set pulse signal SP1. After that, the PWM control circuit 14 lowers the level of the first PWM control signal P1 when the first output signal IC1 of the current comparing section 13 indicates the agreement in level between the increasing torque instruction TQ1 and the voltage drop of the current detection resistor R. The PWM control circuit 14 next raises a second PWM control signal P2 in synchronization with the rising edge of the second set pulse signal SP2. After that, the PWM control circuit 14 lowers the level of the second PWM control signal P2 when the second output signal IC2 of the current comparing section 13 indicates the agreement in level between the decreasing torque instruction TQ2 and the voltage drop of the current detection resistor R. When the one of the first PWM control signal P1 and the second PWM control signal P2 rises before the other falls, the PWM control circuit 14 masks both the first output signal IC1 and the second output signal IC2 of the current comparing section 13. After that, the PWM control circuit 14 only lowers the level of the second PWM control signal P2 when the third output signal IC3 of the current comparing section 13 indicates the agreement in level between the original torque instruction TQ and the voltage drop of the current detection resistor R. The PWM control circuit 14 next cancels the masking of the first output signal IC1 and the second output signal IC2. Here, the PWM control circuit 14 may lower the level of the first PWM control signal P1 only, instead of the second PWM control signal P2, or alternatively, may select the PWM control signal to be lowered at intervals of predetermined electrical angles, for example 30°.

The PWM control circuit 14 further maintains a PWM mask signal MPWM active for a constant time from each of the rising and falling edges of the first PWM control signal P1. The two PWM control signals P1 and P2 are sent to the pre-drive circuit 2, and the PWM mask signal MPWM is sent to the self-commutation circuit 5.

The pre-drive circuit 2 performs the on-off control of the six power transistors of the output circuit 3 according to the energization phase switching signal CP in every energization phase, and thereby controls the energization of the motor coils Mu, Mv, and Mw, as follows. Here, there are six types of energization pattern of the motor coils Mu, Mv, and Mw. The types of energization pattern correspond to the different states of the phase currents Iu, Iv, and Iw, that is, the different energization phases. FIG. 4 is the table showing the states of the phase currents Iu, Iv, and Iw in the respective energization phases I–VI.

Each of the phase currents Iu, Iv, and Iw has six states. First, there are two states of "source" and "sink" corresponding to the directions of current. The direction of the phase current depends on which is turned on between the two power transistors directly connected to the corresponding motor coil. For example, the U-phase current Iu flows through the U-phase motor coil Mu in the direction of the arrow shown in FIG. 1, when the U-phase high side power transistor 31U is turned on. The current flows in the reverse direction when the U-phase low side power transistor 32U is turned on. In FIG. 4, the direction when a high side power transistor is turned on is referred to as "a source", and the direction when a low side power transistor is turned on is referred to as "a sink". Next, there are three states of "rising", "falling", and "constant" depending on the modes of change in current level. The change in level of the phase current depends on whether one of the two power transistors directly connected to the corresponding motor coil is maintained in the ON state, or turned on and off according to either of the PWM control signals P1 and P2, during the energization phase. For example, the U-phase current Iu rises when the U-phase power transistor 31U or 32U is turned on and off according to the first PWM control signal P1. The U-phase current Iu falls when the U-phase power transistor 31U or 32U is turned on and off according to the second PWM control signal P2. The U-phase current Iu is maintained constant when the U-phase power transistor 31U or 32U is maintained in the ON state.

The pre-drive circuit 2 changes the power transistor under the on-off control at every reception of the energization phase switching signal CP, and thereby, changes the states of the phase currents Iu, Iv, and Iw in order of I–VI shown in FIG. 4. In other words the phase currents Iu, Iv, and Iw repeat the changes in level; rising, falling, and being constant in the source direction, and rising, falling, and being constant in the sink direction. There are the phase differences of 120° in electrical angles between the state changes of the three phase currents.

Figure 5:
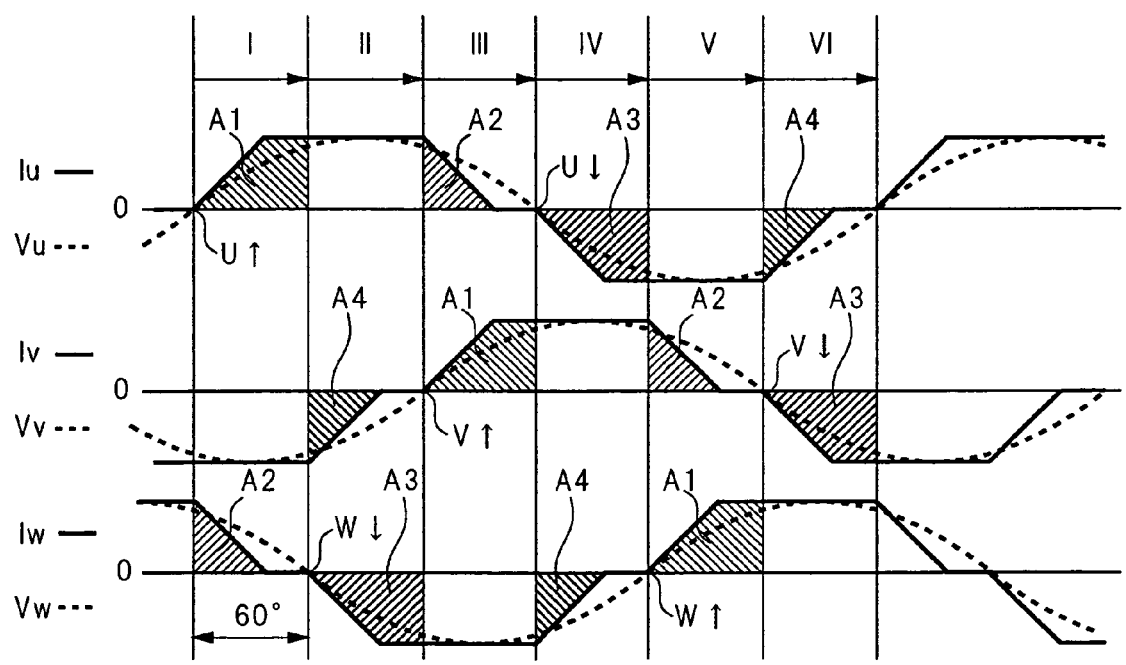
FIG. 5 is a waveform diagram of phase currents Iu, Iv, and Iw, and BEMF Vu, Vv, and Vw about the sensorless motor driving device according to Embodiment 1 of the present invention.
Figure 6:
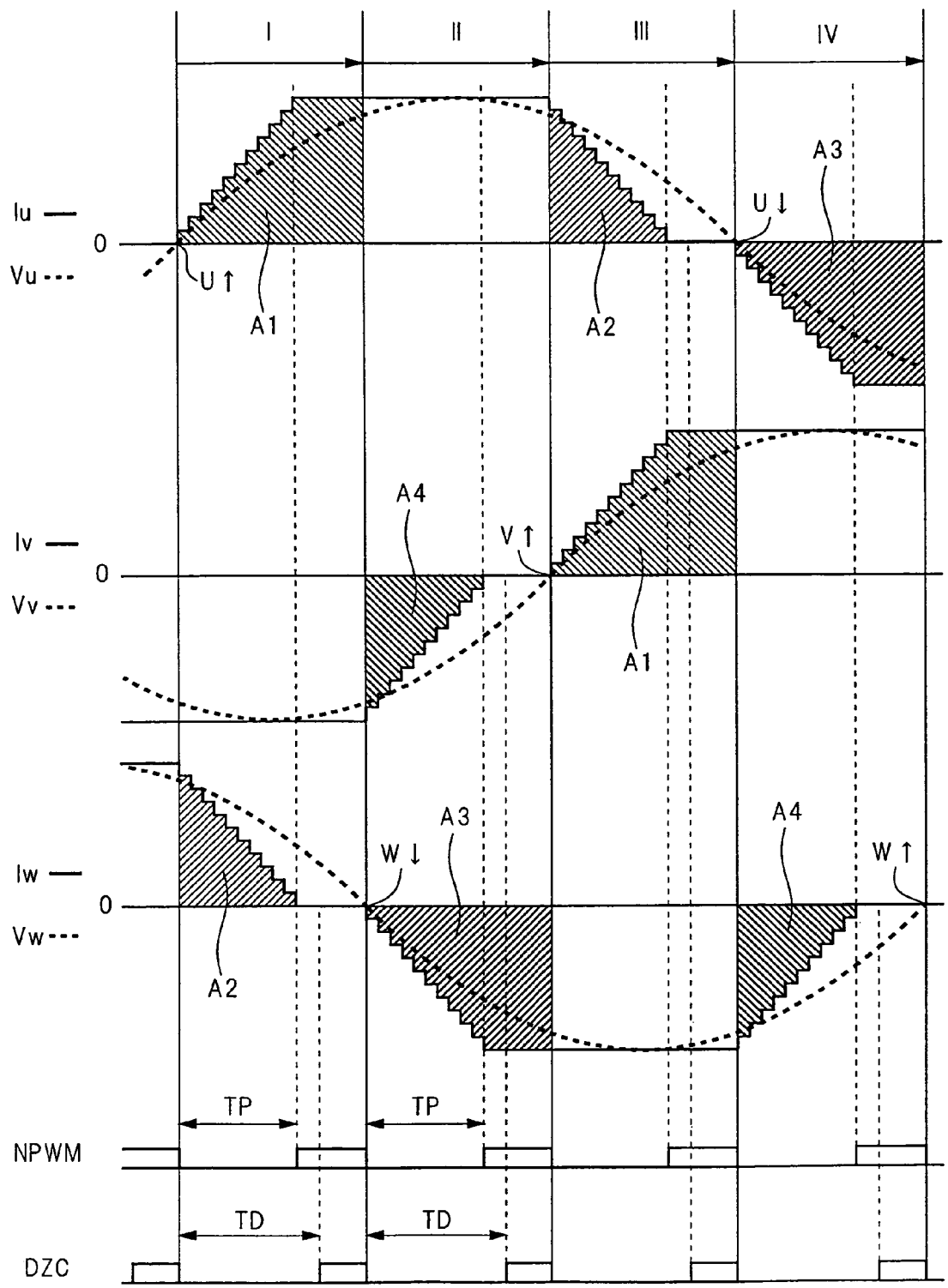
FIG. 6 is an enlarged waveform diagram of the phase currents Iu, Iv; and Iw, and the BEMF Vu, Vv, and Vw in the energization phases I–IV shown in FIG. 5, and a waveform diagram of a PWM disable signal NPWM and a BEMF detection signal DZC, for the sensorless motor driving device according to Embodiment 1 of the present invention.

FIG. 5 is the waveform diagram of the phase currents Iu, Iv, and Iw, and the BEMF Vu, Vv, and Vw. FIG. 6 shows the enlarged view of the waveform in the energization phases I–IV shown in FIG. 5. The solid lines show the phase currents, and the broken lines show the BEMF.

The pre-drive circuit 2 turns on and off the high side power transistor corresponding to the first hatched area A1, according to the first PWM control signal P1. See FIGS. 5 and 6. Thereby, the phase current is finely and stepwise increased in the source direction and then maintained at the highest, 11th step, as shown in the first hatched area A1. See FIG. 6.

The pre-drive circuit 2 turns on and off the high side power transistor corresponding to the second hatched area A2, according to the second PWM control signal P2. See FIGS. 5 and 6. Thereby, the phase current is decreased in the source direction in a finely stepwise manner as shown in the second hatched area A2 in FIG. 6. When the phase current reaches the zero, or the PWM disable signal NPWM rises, the pre-drive circuit 2 maintains the corresponding high side power transistor in the OFF state. Thereby, the phase current is cut off.

Here, the PWM disable signal NPWM rises at the switching between the energization phases, that is, at the instant when the period TP of a constant electrical angle, for example, 37.5°, has elapsed from the instant of the reception of the energization phase switching signal CP, and is maintained active until the instant of the next switching between the energization phases. See FIG. 6. The details will be described later. During the period when the PWM disable signal NPWM is maintained active, which is hereafter referred to as the PWM disable period, the pre-drive circuit 2 maintains the corresponding power transistor in the OFF state, regardless of the second PWM control signal P2, and thereby cuts off the corresponding phase current.

The first hatched area A1 and the second hatched area A2 are included in the same energization phase. See FIGS. 5 and 6. In the energization phase I, for example, the U-phase high side power transistor 31U is turned on and off according to the first PWM control signal P1, the V-phase low side power transistor 32V is maintained in the ON state, and the W-phase high side power transistor 31W is turned on and off according to the second PWM control signal P2. Here, the phase difference between the two set pulse signals SP1 and SP2, that is, the phase difference between the first PWM control signal P1 and the second PWM control signal P2 is maintained substantially equal to 180°. Accordingly, there is, in general, no overlap between the ON period of the U-phase high side power transistor 31U in the first hatched area A1 and the ON period of the W-phase high side power transistor 31W in the second hatched area A2.

During the period of activation of the first PWM control signal P1, the W-phase current Iw circulates through the V-phase motor coil Mv, the V-phase low side power transistor 32V, and the freewheel diode connected in parallel to the W-phase low side power transistor 32W. Accordingly, the current. I flowing through the current detection resistor R is substantially equal to the U-phase current Iu. See FIG. 1. In other words, the first output signal IC1 of the current comparing section 13 (cf. FIG. 1) indicates the difference between the U-phase current Iu and its desired value indicated by the increasing torque instruction TQ1 (cf. FIG. 3). Therefore, the on-off control according to the first PWM control signal P1 increases the U-phase current Iu to be equal to the desired value indicated by the increasing torque instruction TQ1. As a result, the U-phase current Iu in the source direction is increased at a constant rate. See FIGS. 5 and 6.

Similarly, during the period of activation of the second PWM control signal P2, the U-phase current Iu circulates through the V-phase motor coil Mv, the V-phase low side power transistor 32V, and the freewheel diode connected in parallel to the U-phase low side power transistor 32U. Accordingly, the current I flowing through the current detection resistor R is substantially equal to the W-phase current Iw. See FIG. 1. In other words, the second output signal IC2 of the current comparing section 13 (cf. FIG. 1) indicates the difference between the W-phase current Iw and its desired value indicated by the decreasing torque instruction TQ2 (cf. FIG. 3). Therefore, the on-off control according to the second PWM control signal P2 reduces the W-phase current Iw to be equal to the desired value indicated by the decreasing torque instruction TQ2. As a result, the W-phase current Iw in the source direction is reduced at the same rate as the rate of change of the U-phase current Iu. See FIGS. 5 and 6.

A constant amount of the V-phase current Iv flows in the sink direction. See FIGS. 5 and 6. At that time, the amount of the V-phase current Iv is equal to the sum in magnitude between the U-phase current Iu and the W-phase current Iw, and, in particular, equal to the desired value indicated by the original torque instruction TQ. See FIG. 3. When the constant duration TP has elapsed from the start of the energization phase I, the U-phase current Iu reaches the peak value, which is the desired value indicated by the original torque instruction TQ, and the W-phase current Iw is cut off. Thus, the commutation from the W-phase to the-U phase is completed. The energization control and the following changes of energization state in the energization phases III and V are similar to the above-described energization control and changes of energization state in the energization phase I.

The pre-drive circuit 2 turns on and off the low side power transistor corresponding to the third hatched area A3 according to the first PWM control signal P1. See FIGS. 5 and 6. Thereby, the phase current is finely and stepwise increased in the sink direction and then maintained at the highest, 11th step, as shown in the third hatched area A3. See FIG. 6.

The pre-drive circuit 2 turns on and off the low side power transistor corresponding to the fourth hatched area A4 according to the second PWM control signal P2. See FIGS. 5 and 6. Thereby, the phase current is decreased in the sink direction in a finely stepwise manner as shown in the fourth hatched area A4 in FIG. 6. When the phase current reaches the zero, or the PWM disable signal NPWM rises, the pre-drive circuit 2 maintains the corresponding low side power transistor in the OFF state. Thereby, the phase current is cut off.

The third hatched area A3 and the fourth hatched area A4 are included in the same energization phase. See FIGS. 5 and 6. In the energization phase II, for example, the U-phase high side power transistor 31U is maintained in the ON state, the V-phase low side power transistor 32V is turned on and off according to the second PWM control signal P2, and the W-phase low side power transistor 32W is turned on and off according to the first PWM control signal P1. Here, there is, in general, no overlap between the ON period of the V-phase low side power transistor 32V in the fourth hatched area A4 and the ON period of the W-phase low side power transistor 32W in the third hatched area A3.

During the period of activation of the first PWM control signal P1, the V-phase current Iv circulates through the freewheel diode connected in parallel to the V-phase high side power transistor 31V, the U-phase high side power transistor 31U, and the U-phase motor coil Mu. Accordingly, the current I flowing through the current detection resistor R is substantially equal to the W-phase current Iw. See FIG. 1. In other words, the first output signal IC1 of the current comparing section 13 (cf. FIG. 1) indicates the difference between the W-phase current Iw and its desired value indicated by the increasing torque instruction TQ1 (cf. FIG. 3). Therefore, the on-off control according to the first PWM control signal P1 increases the W-phase current Iw to be equal to the desired value indicated by the increasing torque instruction TQ1. As a result, the W-phase current Iw in the sink direction is increased at a constant rate. See FIGS. 5 and 6.

Similarly, during the period of activation of the second PWM control signal P2, the W-phase current Iw circulates through the freewheel diode connected in parallel to the W-phase high side power transistor 31W, the U-phase high side power transistor 31U, and the U-phase motor coil Mu. Accordingly, the current I flowing through the current detection resistor R is substantially equal to the V-phase current Iv. See FIG. 1. In other words, the second output signal IC2 of the current comparing section 13 (cf. FIG. 1) indicates the difference between the V-phase current Iv and its desired value indicated by the decreasing torque instruction TQ2 (cf. FIG. 3). Therefore, the on-off control according to the second PWM control signal P2 reduces the V-phase current Iv to be equal to the desired value indicated by the decreasing torque instruction TQ2. As a result, the V-phase current Iv in the sink direction is reduced at the same rate as the rate of change of the W-phase current Iw. See FIGS. 5 and 6.

A constant amount of the U-phase current Iu flows in the source direction. See FIGS. 5 and 6. At that time, the amount of the U-phase current Iu is equal to the sum in magnitude between the V-phase current Iv and the W-phase current Iw, and, in particular, equal to the desired value indicated by the original torque instruction TQ. See FIG. 3. When the constant duration TP has elapsed from the start of the energization phase II, the V-phase current Iv is cut off, and the W-phase current Iw reaches the peak value, which is the desired value indicated by the original torque instruction TQ. Thus, the commutation from the V-phase to the-W phase is completed. The energization control and the following changes of energization state in the energization phases IV and VI are similar to the above-described energization control and changes of energization state in the energization phase II.

In the above-described example, using the phase difference between the two set pulse signals SP1 and SP2, the current comparing section 13 detects the three phase currents Iu, Iv, and Iw through the current detection resistor R in common. Alternatively, the current comparing section 13 may detect in parallel at least two of the phase currents, for example, using at least two current detection resistors. At that time, the two set pulse signals SP1 and SP2 may be in phase, or combined into one set pulse signal.

The switching of energization of the motor coils changes the magnetic fields through the rotor, and thereby changes the torque produced in the sensorless motor M. The change of any of the phase currents Iu, Iv, and Iw takes the shape of a trapezoid with gentle sides in the sensorless motor driving device according to Embodiment 1 of the present invention, as shown in FIG. 5. Accordingly, the changes in torque produced are gentle, and thereby the vibrations and motor echo noises of the sensorless motor M are suppressed enough.

The BEMF comparing section 4 includes three comparators 4U, 4V, and 4W. See FIG. 1. The output signals BCU, BCV, and BCW of the comparators 4U, 4V, and 4W indicate the differences between the potentials of the three driving terminals U0, V0, and W0 of the sensorless motor M and the potential of the center tap C, which is hereafter referred to as a center tap voltage of motor coils.

The BEMF comparing section 4 may detect the following potential difference aside from the above-described. For example, one end each of three resistors of high resistance values is connected to one node, and then the Y-connection of the resistors is constructed. Furthermore, the other ends of the resistors are connected to the three driving terminals U0, V0, and W0 of the sensorless motor M, respectively. The BEMF comparing section 4 may consider the potential of the node among the three resistors as a virtual center tap voltage, and detect the difference between the potential of the node and each potential of the three driving terminals U0, V0, and W0.

The self-commutation circuit 5 detects agreement between each potential of the driving terminals U0, V0, and W0 and the center tap voltage of the motor coils, based on the three output signals BCU, BCV, and BCW of the BEMF comparing section 4. See FIG. 1. The potentials of the driving terminals U0, V0, and W0 are equal to the driving voltages applied by the output circuit 3 with the BEMF Vu, Vv, and Vw overlaid, respectively. See FIG. 1. On the other hand, in each energization phase during stable rotation of the rotor, one of the BEMF Vu, Vv, and Vw in the non-energized motor coil, that is, the motor coil where the phase current is cut off, agrees with the center tap voltage of the motor coils. In other words, the zero crossing occurs. Accordingly, the zero crossings of the BEMF Vu, Vv, and Vw are detected from the agreements between the potentials of the driving terminals U0, V0, and W0, and the center tap voltage of the motor coils, respectively.

In each energization phase, the potential of the different driving terminal is to be detected to agree with the center tap voltage of the motor coils. The self-commutation circuit 5 determines the mode of the zero crossing to be next detected, according to the zero crossing point information ZCP received from the outside. Here, the zero crossings are separated into six modes by the difference of the motor coils where the zero crossing occurs, that is, the three variations of Mu, Mv, and Mw; and the difference of the change in direction of the phase current before and after the zero crossing, that is, the two variations of the changes, from "source" to "sink" and vice versa. The table shown in FIG. 4 provides in the bottom row, the correspondence between the modes of the zero crossings shown by the zero crossing point information ZCP and the respective energization phases I–VI. Here, U, V, and W each represent the motor coil where the next zero crossing occurs, corresponding to Mu, Mv, and Mw, respectively. Furthermore, the upward arrow ↑ and the downward arrow ↓ each represent the change in direction of the phase current before and after the next zero crossing, corresponding to the change from "source" to "sink" and the reverse, respectively. In FIGS. 5 and 6, the broken lines show the BEMF Vu, Vv and Vw induced in the motor coils Mu, Mv, and Mw, respectively, during the stable rotation of the rotor. Furthermore, the points where the zero crossings of the BEMF Vu, Vv, and Vw occur, which are hereafter referred to as the zero crossing points, are represented by the reference symbols U↑, U↓, V↑, V↓, W↑, and W↓ that represent the modes of the zero crossing shown in FIG. 4.

The self-commutation circuit 5 selects one of the three output signals BCU, BCV, and BCW of the BEMF comparing section 4 based on the mode of the zero crossing determined by the zero crossing point information ZCP, and aims, as its detection target, at either of the rising or falling edge of the selected output signal. Thus, the zero crossing detection is maintained with high accuracy.

The self-commutation circuit 5 further masks the output signals BCU, BCV, and BCW of the BEMF comparing section 4 according to the two types of mask signal, MPWM and DZC. Thereby, the accuracy of the zero crossing detection further improves as follows. The PWM control circuit 14 maintains the PWM mask signal MPWM active for a constant time from the rising/falling edge of the first PWM control signal P1. The self-commutation circuit 5 maintains all the output signals BCU, BCV, and BCW of the BEMF comparing section 4 disable in that activated period. Thereby, the zero crossing detection by the self-commutation circuit 5 is resistant to the ripples caused by the turning on and off of the power transistors according to the first PWM control signal P1.

FIG. 6 shows the waveforms of the PWM disable signal NPWM and the BEMF detection signal DZC. The BEMF detection signal DZC rises at the instant when the period TD of a constant electrical angle, for example, 45° has elapsed from the switching between the energization phases, and is maintained active until the next switching between the energization phases. The details will be described later. Here, the rising edge of the BEMF detection signal DZC lags behind the rising edge of the PWM disable signal NPWM by the duration of a constant electrical angle, for example, 45°−37.5°=7.5°. The self-commutation circuit 5 performs the zero crossing detection during the period when the BEMF detection signal DZC is maintained active, which is hereafter referred to as a BEMF detection period. The BEMF detection period is included in the PWM disable period. Accordingly, in the BEMF detection period, the power transistors are prohibited from turning on and off regardless of the second PWM control signal P2, and thereby, the phase current is securely cut off in the motor coil of the target of the zero crossing detection. Thus, a non-energization period of a constant width, for example, an approximately 15°-wide period from 45° through the neighborhood of 60° in electrical angles, is reliably allocated to the motor coil of the target of the zero crossing detection. Therefore, the zero crossing detection is maintained with high accuracy. In particular, the start of the BEMF detection period lags behind the start of the PWM disable period, and thereby, surge voltages/currents such as fly-back voltages caused by the cut-off of the phase currents fail to obstruct the zero crossing detection.

Figure 7:
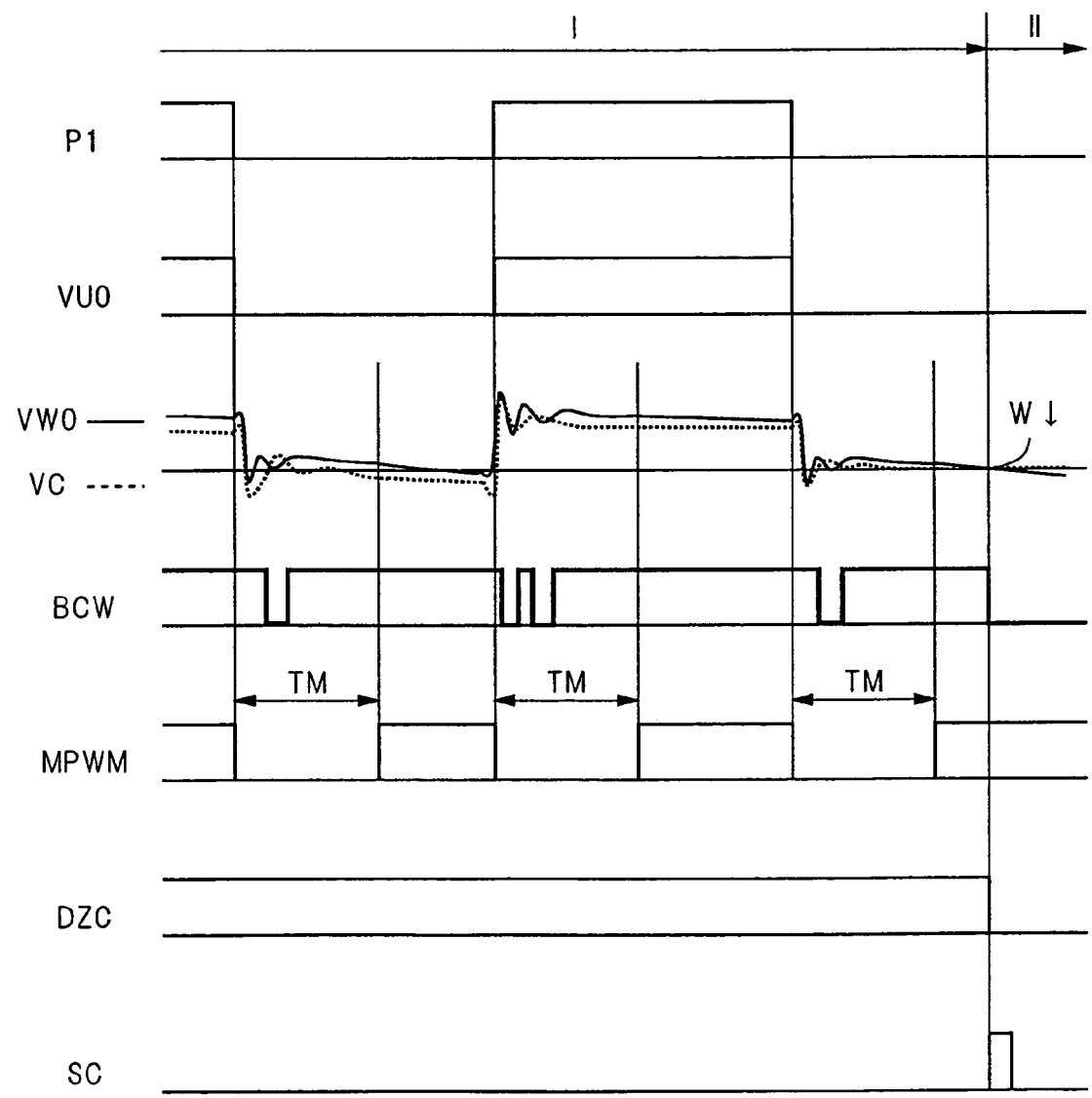
FIG. 7 is a waveform diagram showing the case of the edge detection of a zero crossing, that is, the case where the zero crossing in the W phase occurs during the BEMF detection period, for the sensorless motor driving device according to Embodiment 1 of the present invention.
Figure 8:
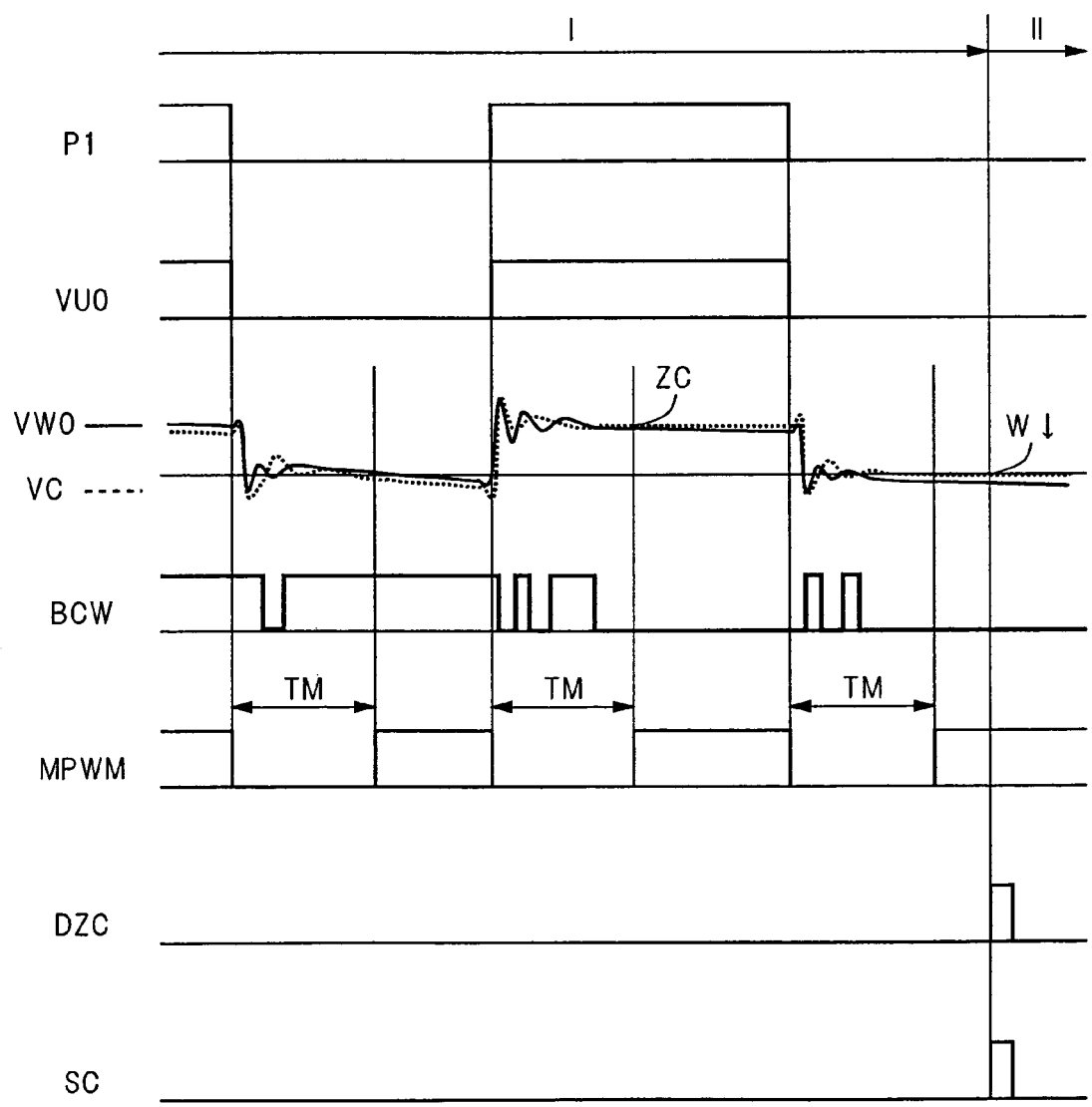
FIG. 8 is a waveform diagram showing the case of the state detection of a zero crossing, that is, the case where the zero crossing in the W phase occurs before the BEMF detection period, for the sensorless motor driving device according to Embodiment 1 of the present invention.

The self-commutation circuit 5 further generates the self-commutation signal SC at the detection of the zero crossing. However, the self-commutation circuit 5 does not generate the self-commutation signal SC when detecting no zero crossing during the BEMF detection period. FIGS. 7 and 8 are the waveform diagrams of the first PWM control signal P1, the potential VU0 of the U-phase driving terminal U0, the potential VW0 of the W-phase driving terminal W0, the center tap voltage VC of the motor coils, the W-phase output signal BCW of the BEMF comparing section 4, the PWM mask signal MPWM, the BEMF detection signal DZC, and the self-commutation signal SC, in the neighborhood of the instant of the switching from the first energization phase I to the second energization phase II. FIG. 7 shows the case of the edge detection of the zero crossing, that is, the case where the zero crossing in the W-phase occurs during the BEMF detection period. FIG. 8 shows the case of the state detection of the zero crossing, that is, the case where the zero crossing in the W-phase occurs before the BEMF detection period.

During the PWM disable period in the first energization phase I, the on-off control of the U-phase high side power transistor 31U according to the first PWM control signal P1 is continued, and the U-phase current Iu is maintained. Accordingly, the potential VU0 of the U-phase driving terminal U0 changes, according to the first PWM control signal P1, between the two values; the high potential of the power supply terminal 33 (cf. FIG. 1) and the ground potential. With the change, the potential VW0 of the W-phase driving terminal W0 and the center tap voltage VC change in similar manner, and in particular, include noises at the rising and falling edges. See the solid and broken lines shown in FIGS. 7 and 8. Thereby, the W-phase output signal BCW of the BEMF comparing section 4 frequently repeats rising and falling for a while after every rising/falling edges of the first PWM control signal P1. Generally, these fluctuations do not correspond to the actual zero crossings.

The PWM mask signal MPWM is maintained active for a constant duration TM from every rising/falling edge of the first PWM control signal P1. In FIGS. 7 and 8, the PWM mask signal MPWM is established to be active low. The self-commutation circuit 5 maintains the W-phase output signal BCW of the BEMF comparing section 4 disable during the activated period TM. Thereby, noises caused by the rising/falling of the first PWM control signal P1 fail to obstruct the zero crossing detections.

In FIG. 7, the zero crossing occurs in the W phase during the BEMF detection period. See the zero crossing point W↓ shown in FIG. 7. The self-commutation circuit 5 precisely detects the Zero crossing point W↓, and generates the self-commutation signal SC at the detection. Here, the self-commutation signal SC is a rectangular pulse with a constant, short pulse width. Upon the rising edge of the self-commutation signal SC, the BEMF detection signal DZC falls, and thereby the BEMF detection period are finished. On the other hand, the energization phases are switched from I to II. The details will be described later.

In FIG. 8, the zero crossing occurs in the W phase before the start the BEMF detection period, that is, the rising edge of the BEMF detection signal DZC. See the zero crossing point ZC shown in FIG. 7. The self-commutation circuit 5 detects that the potential VW0 of the W-phase driving terminal W0 is lower than the center tap voltage VC, at the rising edge of the BEMF detection signal DZC. See the point W↓ shown in FIG. 7. Furthermore, the self-commutation circuit 5 generates the self-commutation signal SC at the detection. Upon the rising of the self-commutation signal SC, the BEMF detection signal DZC falls at once, and thereby, the BEMF detection period is promptly finished upon its start. On the other hand, the energization phases are switched from I to II. The details will be described later.

Figure 9:
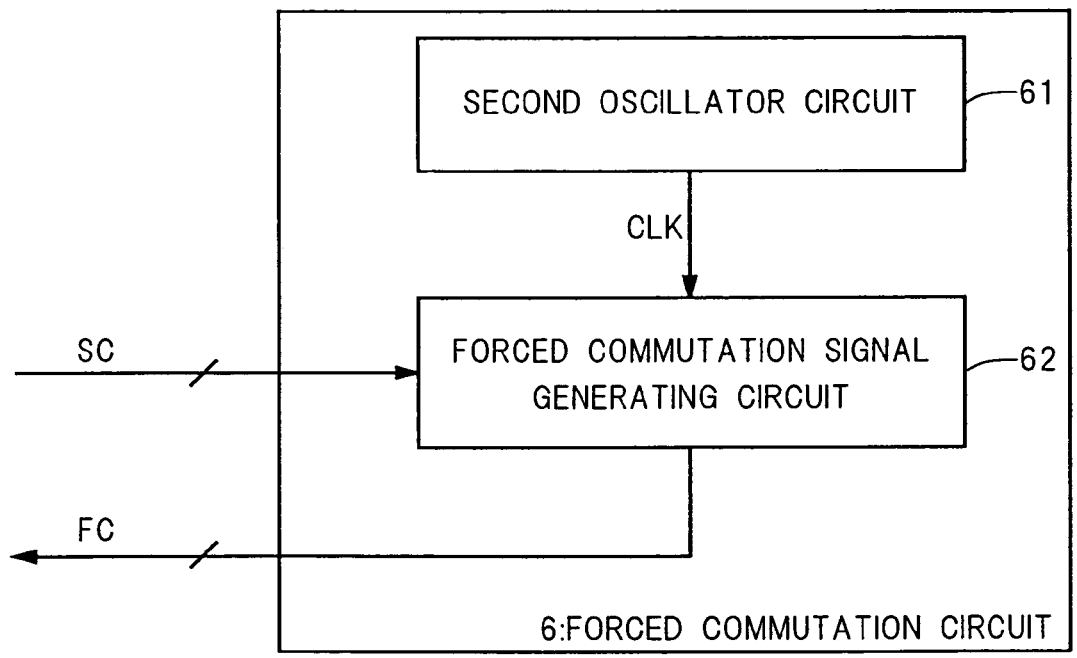
FIG. 9 is a block diagram showing the configuration inside a forced commutation circuit 6 in the sensorless motor driving device according to Embodiment 1 of the present invention.

The forced commutation circuit 6 (cf. FIG. 1) generates a fixed pulse signal with a predetermined period, that is, a forced commutation signal FC. FIG. 9 is the block diagram showing the configuration inside the forced commutation circuit 6. The forced commutation circuit 6 includes a second oscillator circuit 61 and a forced commutation signal generating circuit 62. The second oscillator circuit 61 generates a clock signal CLK with a constant period. The forced commutation signal generating circuit 62 generates the forced commutation signal FC based on the clock signal CLK and the self-commutation signal SC as follows.

Figure 10:
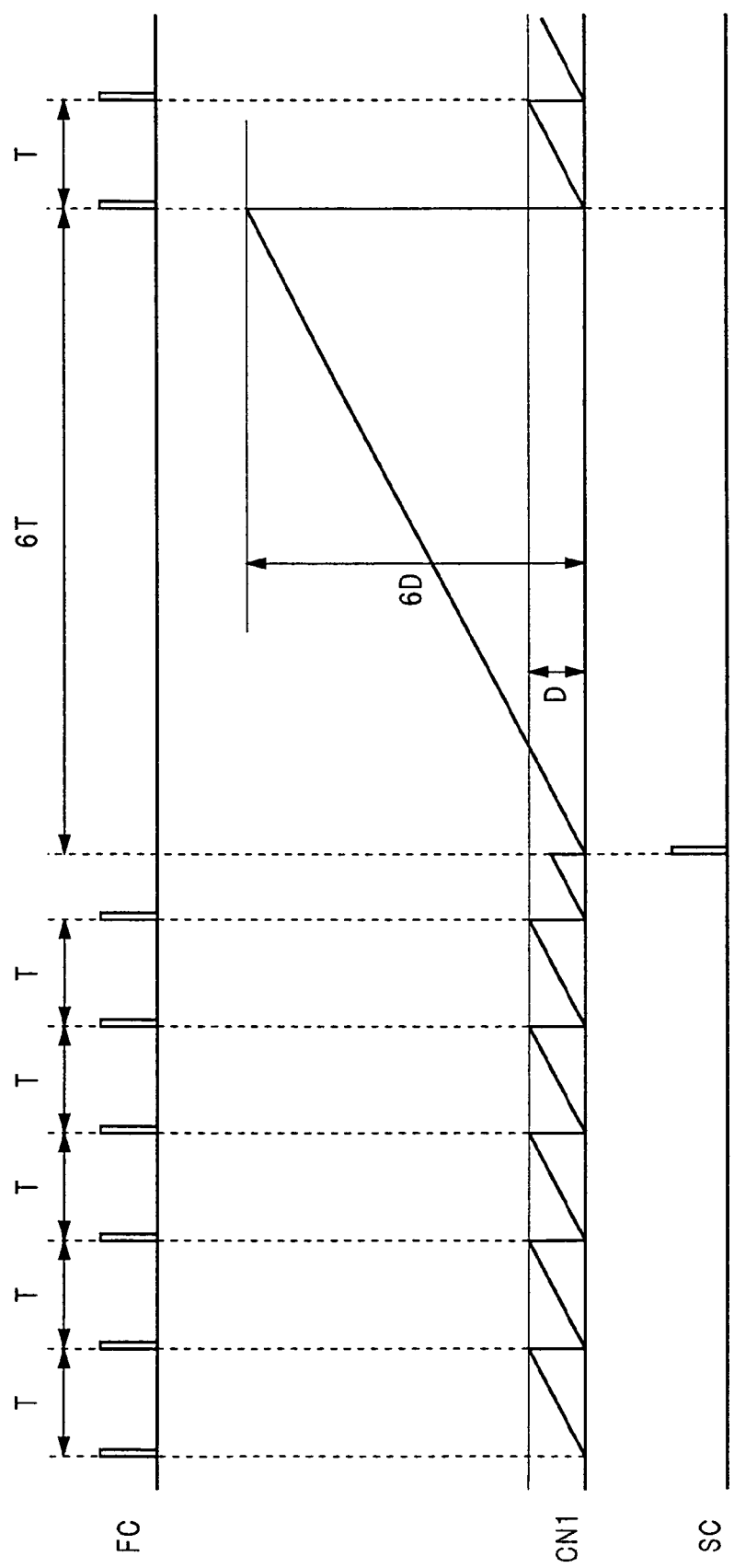
FIG. 10 is a timing chart showing a forced commutation signal FC, a count CN1 of the pulses of a clock signal CLK, and a self-commutation signal SC, for the sensorless motor driving device according to Embodiment 1 of the present invention.
Figure 11:
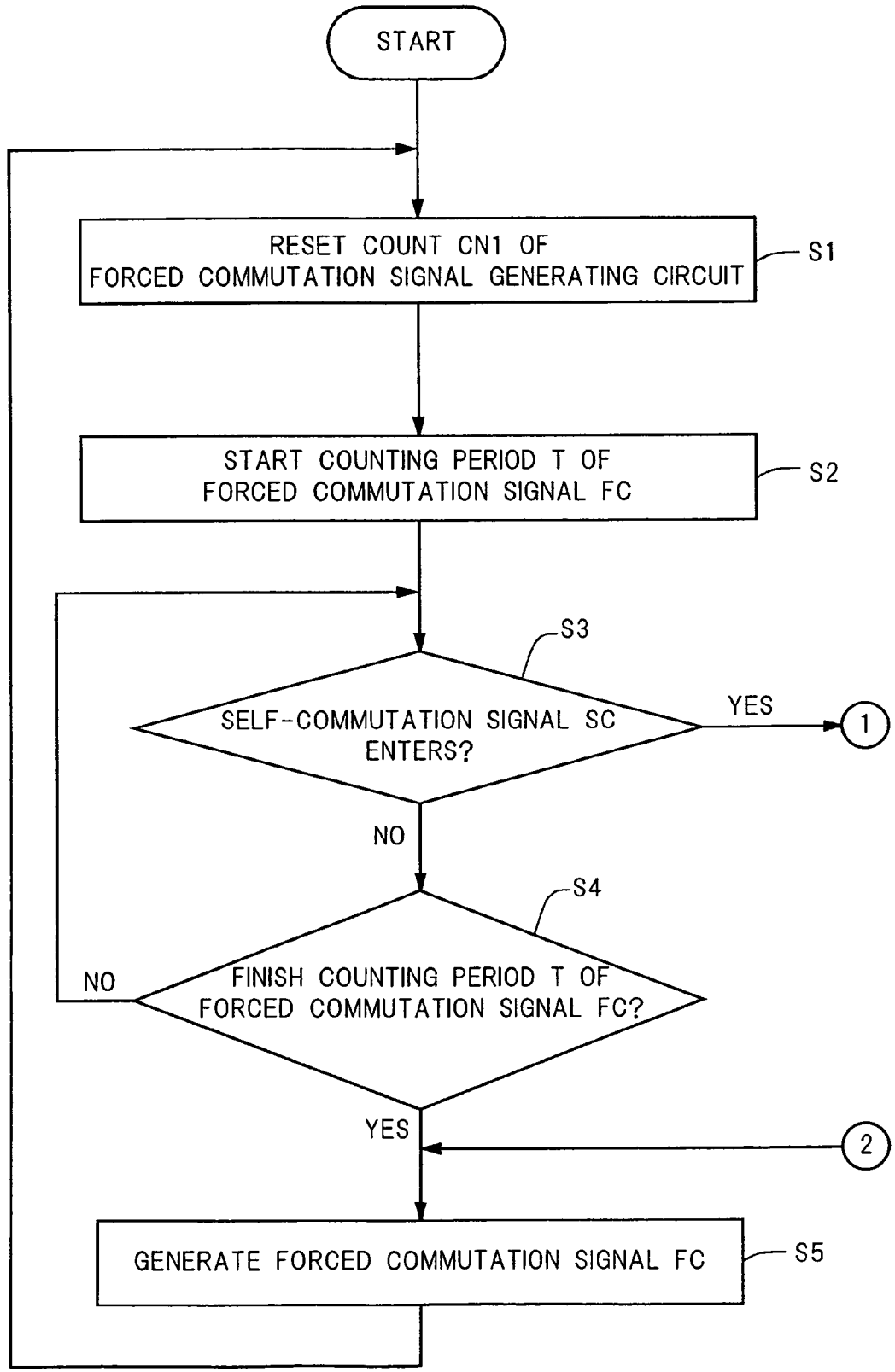
FIG. 11 is the first half of a flow chart showing the operation of a forced commutation signal generating circuit 62 generating the forced commutation signal FC, for the sensorless motor driving device according to Embodiment 1 of the present invention.
Figure 12:
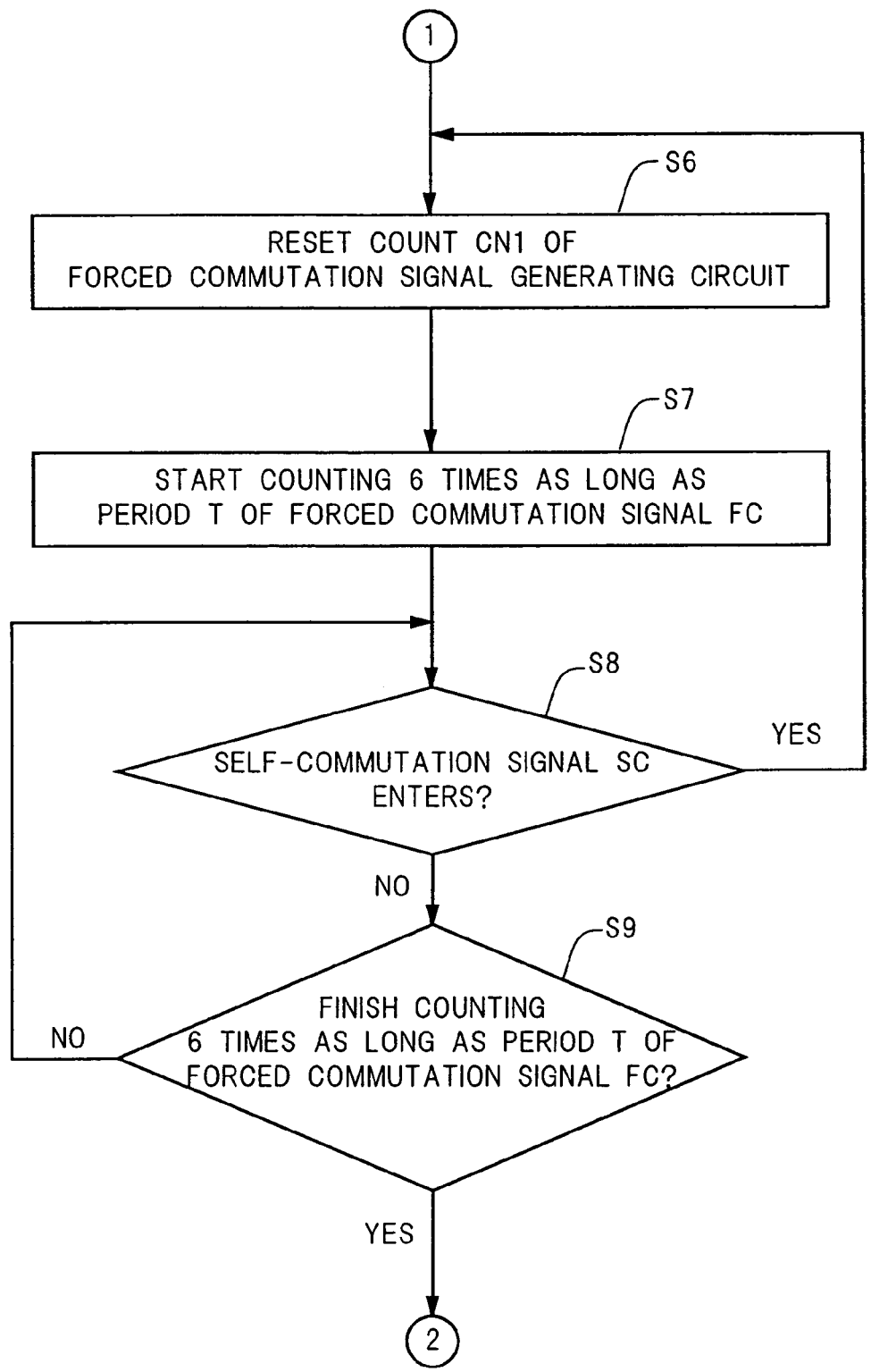
FIG. 12 is the latter half of the flow chart showing the operation of the forced commutation signal generating circuit 62 generating the forced commutation signal FC, for the sensorless motor driving device according to Embodiment 1 of the present invention.

FIG. 10 is the timing chart of the forced commutation signal FC, a count CN1 of the pulses of the clock signal CLK, and the self-commutation signal SC. FIGS. 11 and 12 are the flow charts showing the operation of the forced commutation signal generating circuit 62 generating the forced commutation signal FC. At the start of control, the forced commutation signal generating circuit 62 resets an internal counter (cf. S1 shown in FIG. 11), and then counts the pulses of the clock signal CLK. See S2 shown in FIG. 11. During the period of no entry of the self-commutation signal SC as shown in FIG. 10, the forced commutation signal generating circuit 62 generates the forced commutation signal FC (cf. S3, S4, and S5 shown in FIG. 11), and resets the count CN1 (cf. S1 shown in FIG. 11), every time when the count CN1 reaches a first threshold value D. Here, the forced commutation signal FC is a pulse identical in shape with the self-commutation signal SC. Furthermore, during the period of no entry of the self-commutation signal SC, the period of the forced commutation signal FC, or its pulse interval is equal to the duration T required to generate the same number of pulses of the clock signal CLK as the first threshold value D.

At the entry of the self-commutation signal SC, the forced commutation signal generating circuit 62 resets the count CN1 about the pulses of the clock signal CLK even before reaching the first threshold value D. See FIG. 10, S3 shown in FIG. 11, and S6 shown in FIG. 12. After that, the forced commutation signal generating circuit 62 replaces the first threshold value D with a second threshold value 6D, and counts the pulses of the clock signal CLK again. See S7 shown in FIG. 12. Here, the second threshold value 6D is larger than the first threshold value D, and preferably, six times as large as the first threshold value D. Alternatively, the second threshold value 6D may be, for example, two or twenty times as large as the first threshold value D.

When the next self-commutation signal SC enters before the count CN1 reaches the second threshold value 6D, the forced commutation signal generating circuit 62 resets the count CN1, and then counts the pulses of the clock signal CLK from 0 again. See S6, S7, and S8 shown in FIG. 12. At that time, the threshold value of the count CN1 is maintained at the second threshold value 6D. Thus, no forced commutation signal FC is generated when the generation of the self-commutation signal SC is repeated and its pulse intervals are shorter than the duration 6T required to generate the same number of pulses of the clock signal CLK as the second threshold value 6D.

When the count CN1 reaches the second threshold value 6D before the next self-commutation signal SC enters as shown in FIG. 10, the forced commutation signal generating circuit 62 generates the forced commutation signal FC. See S8 and S9 shown in FIG. 12, and S5 shown in FIG. 11. Furthermore, the loop S1–S5 shown in FIG. 11 is repeated until the self-commutation signal SC enters again. In particular, the pulse interval of the forced commutation signal FC is set again at the duration T required to generate the same number of pulses of the clock signal CLK as the first threshold value D. See FIG. 10.

A count section 7 (cf. FIG. 1) includes a selection circuit 71 and a count circuit 72. The selection circuit 71 selects either the self-commutation signal SC or the forced commutation signal FC, whichever enters first, as a commutation signal CS, and sends it to the count circuit 72 and an energization phase switching circuit 8. The energization phase switching circuit 8 (cf. FIG. 1), in synchronization with the commutation signal CS, sends the energization phase switching signal CP to the pre-drive circuit 2, and further sends the zero crossing point information ZCP to the self-commutation circuit 5. Thereby, the energization phases are switched in synchronization with the commutation signal CS.

Figure 13:
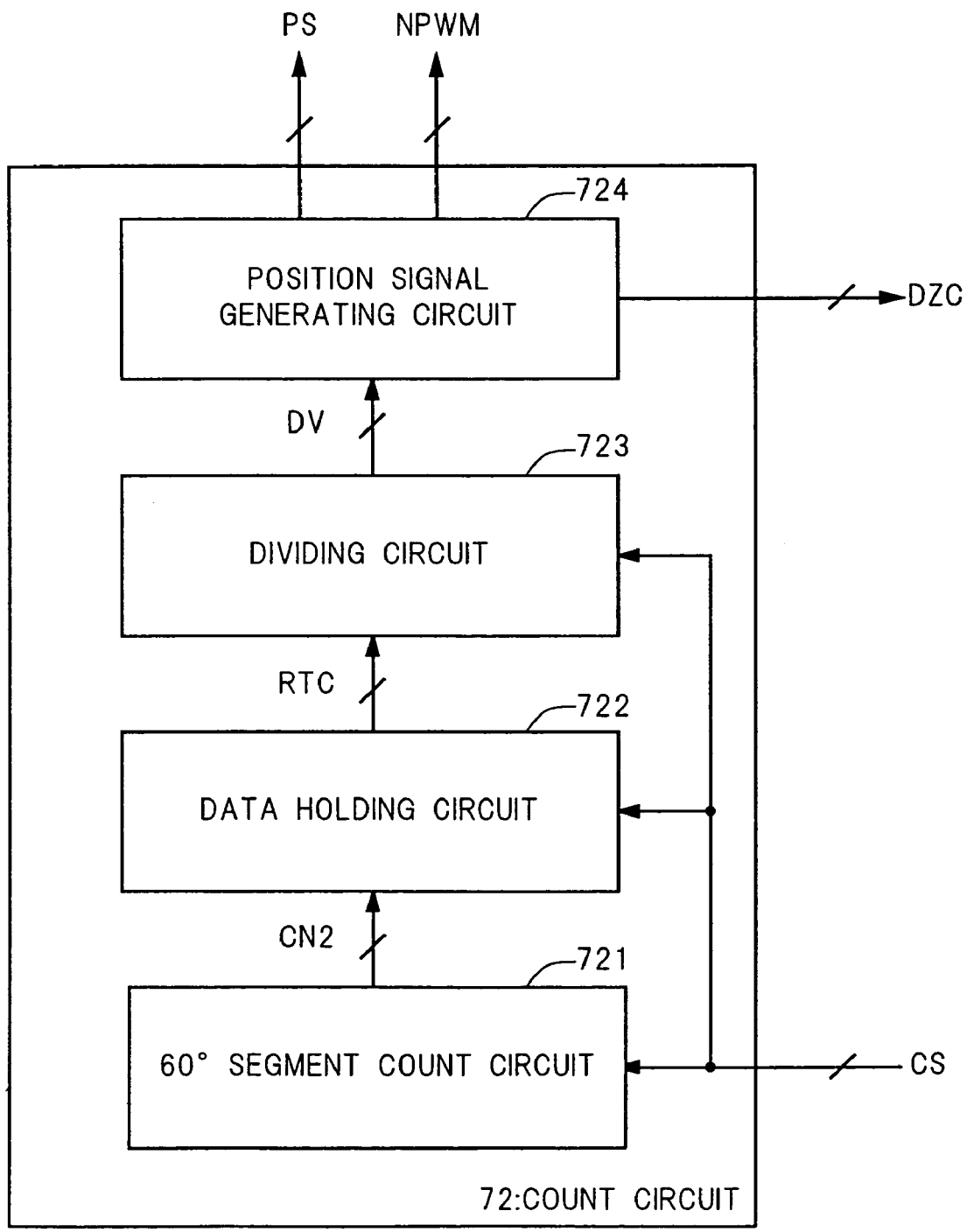
FIG. 13 is a block diagram showing the configuration inside a count circuit 72 in the sensorless motor driving device according to Embodiment 1 of the present invention.
Figure 14:
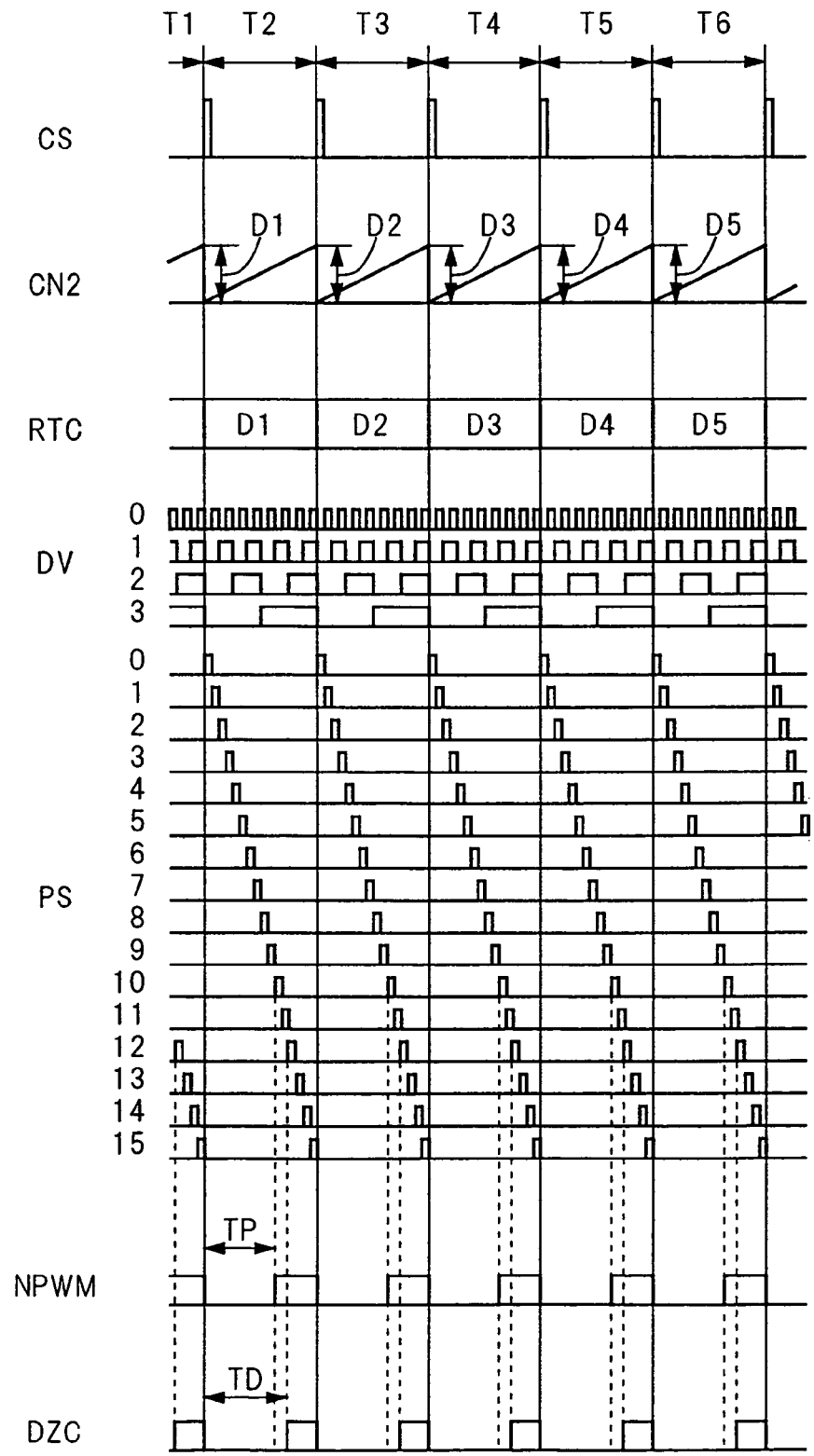
FIG. 14 is a timing chart of a commutation signal CS, internal signals CN2, RTC, and DV of a count circuit 72, and three signals PS, NPWM, and DZC sent from the count circuit 72, for the sensorless motor driving device according to Embodiment 1 of the present invention.

The count circuit 72 measures the interval of the commutation signal CS, and then generates a position signal PS based on the interval. Furthermore, the count circuit 72 generates the PWM disable signal NPWM and the BEMF detection signal DZC based on the position signal PS. FIG. 13 is the block diagram showing the configuration inside the count circuit 72. FIG. 14 is the timing chart of the commutation signal CS, the internal signals CN2, RTC, and DV of the count circuit 72, and three signals PS, NPWM, and DZC sent from the count circuit 72.

The count circuit 72 includes a 60°-segment count circuit 721, a data holding circuit 722, a dividing circuit 723, and a position signal generating circuit 724.

The 60°-segment count circuit 721 resets the count CN2 of an internal counter at the entry of the commutation signal CS, and then counts the pulses of an internal clock until the entry of the next commutation signal CS.

The data holding circuit 722 reads the count CN2 of the internal counter from the 60°-segment count circuit 721 in synchronization with the commutation signal CS. Furthermore, the data holding circuit 722 compares the read count CN2 with the number of pulses equivalent to the pulse interval T of the forced commutation signal FC. Thereby, the data holding circuit 722 holds either the former or the latter, whichever is smaller, as a held data item RTC until the entry of the next commutation signal CS. Assume, as shown in FIG. 14, for example, that the pulse intervals of the commutation signal CS varies in order of T1, T2, T3, T4, T5, and T6, and any of them is shorter in time than the pulse interval T of the forced commutation signal FC. Then, at the period of the pulse interval T2, the held data item RTC in the data holding circuit 722 is equal to the count D1 corresponding to the pulse interval T1. Similarly, at the periods of the pulse intervals T3, T4, T5, and T6, the held data item RTC is equal to the counts D2, D3, D4, and D5 corresponding to the pulse intervals T2, T3, T4, and T5, respectively. When the pulse interval T1 of the commutation signal CS is longer than the pulse interval T of the forced commutation signal FC, for example, the held data item RTC in the data holding circuit 722 is equal to the number of pulses equivalent to the pulse interval T of the forced commutation signal FC at the period of the pulse interval T2.

The dividing circuit 723 divides by 16, for example, the held data item RTC in the data holding circuit 722 at the entry of the commutation signal CS. Here, the number of division may be the other number, for example, 8 or 32. The dividing circuit 723 includes, for example, an internal 4-bit counter. In that case, the dividing circuit 723 increments the count of the 4-bit counter by one each at every counting internal clock pulses of $1/16$ of the held data item RTC. Here, the internal clock has the same period as that of the internal clock of the 60°-segment count circuit 721. That count is generated as a parallel signal DV of 4 bits. See FIG. 14. With reference to the state of 4 bits of the parallel signal DV, the pulse interval of the commutation signal CS is divided into 16 segments each having $1/16$ of the previous pulse interval. For example, the pulse interval T2 of the commutation signal CS is divided by $1/16$ of the pulse interval T1. Similarly, the pulse intervals T3, T4, T5, and T6 are divided by $1/16$ of the pulse intervals T2, T3, T4, and T5, respectively. At the start of the sensorless motor M, however, the dividing circuit 723 increments the count of the 4-bit counter by one each at every counting the internal clock pulses of $1/16$ of the number of pulses equivalent to the pulse interval T of the forced commutation signal FC, instead of $1/16$ of the held data item RTC. Thereby, the duration before the entry of the next commutation signal CS is divided by $1/16$ of the pulse interval T of the forced commutation signal FC.

The position signal generation circuit 724 reads the parallel signal DV of 4 bits from the dividing circuit 723, and raises the level of the pulse assigned the same number as that expressed by the 4 bits of the parallel signal DV among the 16 pulses Nos. 0–15 of the position signal PS. See FIG. 14. In particular, the top pulse No. 0 is synchronized to the commutation signal CS, and accordingly, the series of the pulses Nos. 0 . 15 divides the pulse interval of the commutation signal CS into 16 segments. The pulse interval of the commutation signal CS determines the duration of one energization phase, that is, the duration of 60° in electrical angles, and then, the segment of each pulse of the position signal PS is equivalent to 3.75° in electrical angles. Thus, the pulses Nos. 0–15 each represent the estimated rotor position of the sensorless motor M at intervals of 3.75° each in electrical angles. See FIGS. 3 and 14.

The position signal generation circuit 724 further raises the level of the PWM disable signal NPWM in synchronization with the rising edge of the pulse having a fixed number of the position signal PS, for example, the pulse No. 10. See FIG. 14. Thereby, the duration TP from the generation of the commutation signal CS or the switching between the energization phases until the start of the PWM disable period is established at the duration of constant electrical angles, for example, 37.5°. Here, the duration TP may has a length different from 37.5°, for example, 30°. Furthermore, the duration TP may be set to be longer than, in particular, the duration of the level changes of the decreasing torque instruction TQ2. See FIG. 3.

The position signal generation circuit 724 activates the BEMF detection signal DZC in synchronization with the rising edge of the pulse having a fixed number of the position signal PS, for example, the pulse No. 12, after the activation of the PWM disable signal NPWM. See FIG. 14. Thereby, the duration TD from the generation of the commutation signal CS or the switching between the energization phases until the start of the BEMF detection period is established at the duration of constant electrical angles, for example, 45°. In particular, the start of the BEMF detection period lags behind the start of the PWM disable period by constant electrical angles, for example, 7.5°. Here, the duration TD may has a length different from 45°, for example, 40°. In other words, the duration from the start of the PWM disable period until the start of the BEMF detection period may be set at a value different from 7.5°, for example, 10°.

When the rotor of the sensorless motor M rotates with stability, the self-commutation circuit 5 can repeat the accurate detection of the zero crossing with stability, as described above. Here, the extended pulse interval 6T of the forced commutation signal FC is set to be enough longer than the pulse interval of the self-commutation signal SC. Accordingly, the count section 7 keeps sending the self-commutation signals SC as the commutation signals CS. Therefore, the switching between the energization phases precisely synchronizes to the rotor rotation. Thus, the rotor rotation is maintained with high stability.

Figure 15:
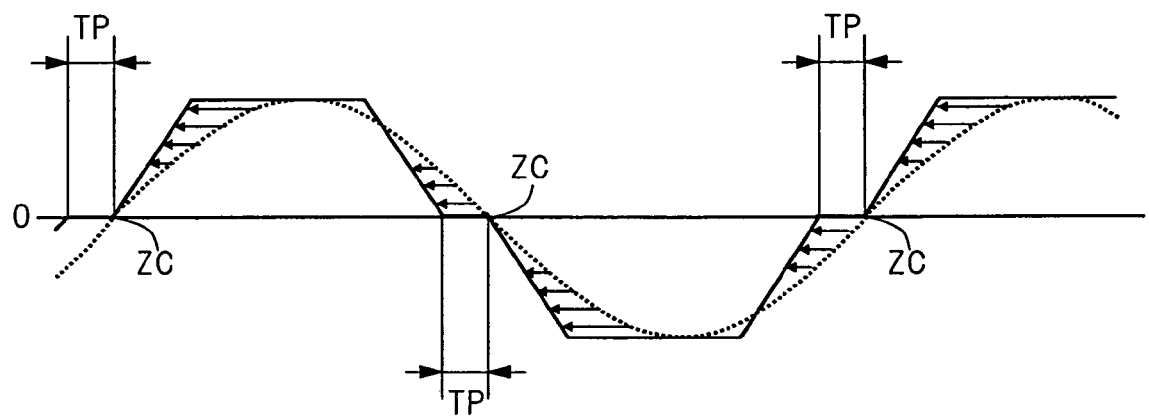
FIG. 15 is a waveform diagram of the phase current and BEMF in the same motor coil during the stable rotor rotation of the sensorless motor M, for the sensorless motor driving device according to Embodiment 1 of the present invention.

The PWM disable period is established at the constant period immediately before the zero crossing point as described above, in the sensorless motor driving device according to Embodiment 1 of the present invention. Thereby, the phase current reaches the zero earlier than the BEMF in each of the motor coils. Furthermore, in synchronization with the commutation signal, the energization phase is switched and, in particular, the PWM disable period and the BEMF detection period are both finished at the same time. Thereby, upon the detection of the zero crossing, the non-energization state of the motor coil is promptly canceled, and the phase current promptly rises. FIG. 15 is the waveform diagram of the phase current and the BEMF in the same motor coil of the sensorless motor M during the stable rotation of the rotor. The solid lines represent the phase currents, and the broken lines represent the BEMF in FIG. 15. As shown in FIG. 15, the phase current reaches the zero earlier than the BEMF due to the setting of the PWM disable period TP. On the other hand, at the zero crossing point ZC of the BEMF, the source or sink current promptly rises upon the zero crossing detection. As a result, a false phase lead is introduced in the waveform of the phase current as compared with the waveform of the BEMF. See arrows shown in FIG. 15. The prompt rising of the phase current represents the prompt increase of the torque produced.

Thus, the sensorless motor driving device according to Embodiment 1 of the present invention can achieve the accurate detection of the zero crossing, since the PWM disable period, that is, the non-energization period of the motor coils is secured when the motor echo noise is suppressed due to the gentle changes of the phase currents. Furthermore, the torque produced can be fully increased since the phase current promptly rises upon the detection of the zero crossing, that is, the switching between the energization phases. Thereby, the driving control of the sensorless motor is, in particular, resistance to changes of load.

Figure 16:
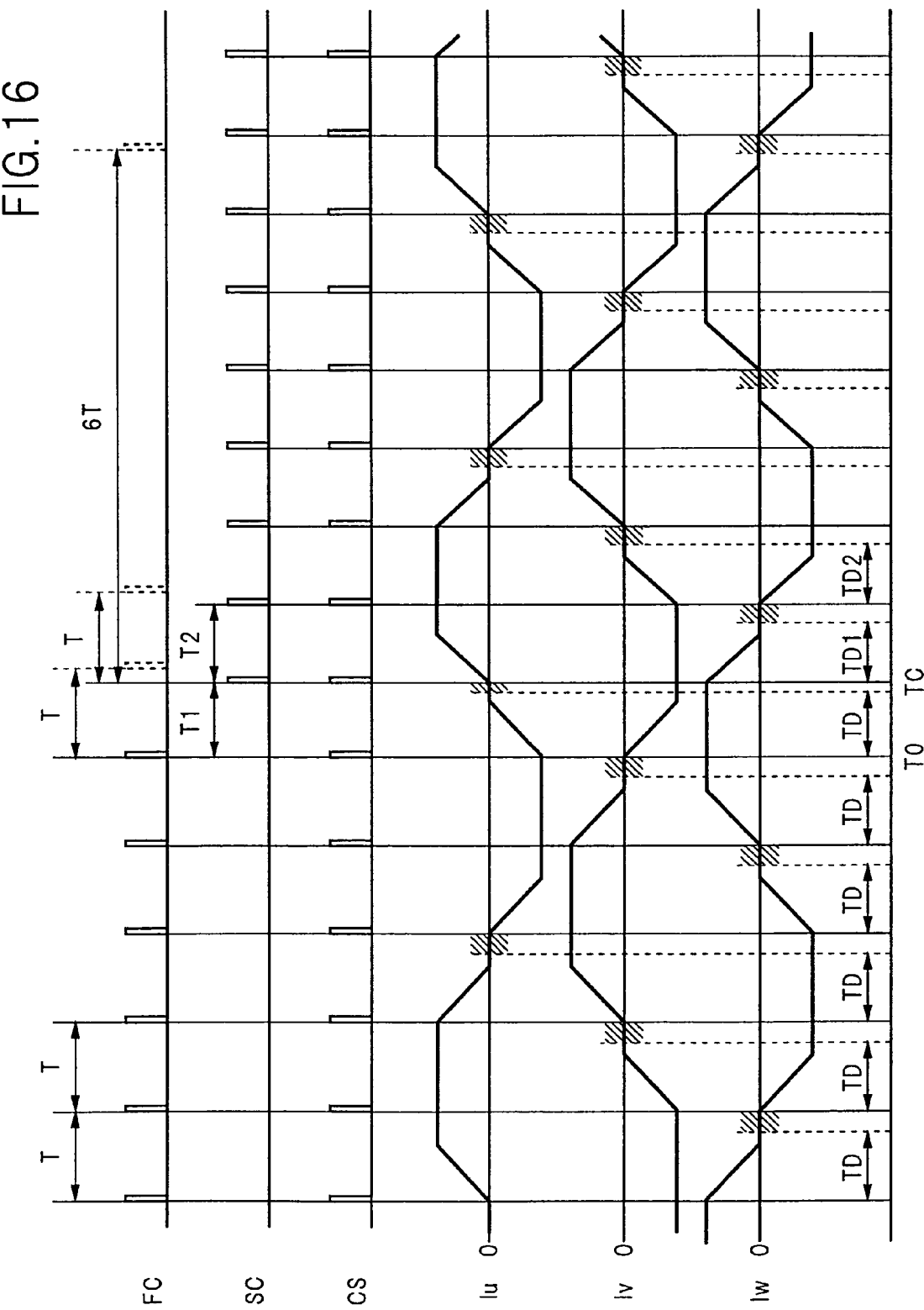
FIG. 16 is a timing chart showing the forced commutation signal FC, the self-commutation signal SC, the commutation signal CS, and the phase currents Iu, Iv, and Iw, at the start of the sensorless motor M, for the sensorless motor driving device according to Embodiment 1 of the present invention, in particular, showing the case where the pulse separation T2 of the self-commutation signal SC is shorter than the original pulse separation T of the forced commutation signal FC, i.e., T2<T.
Figure 17:
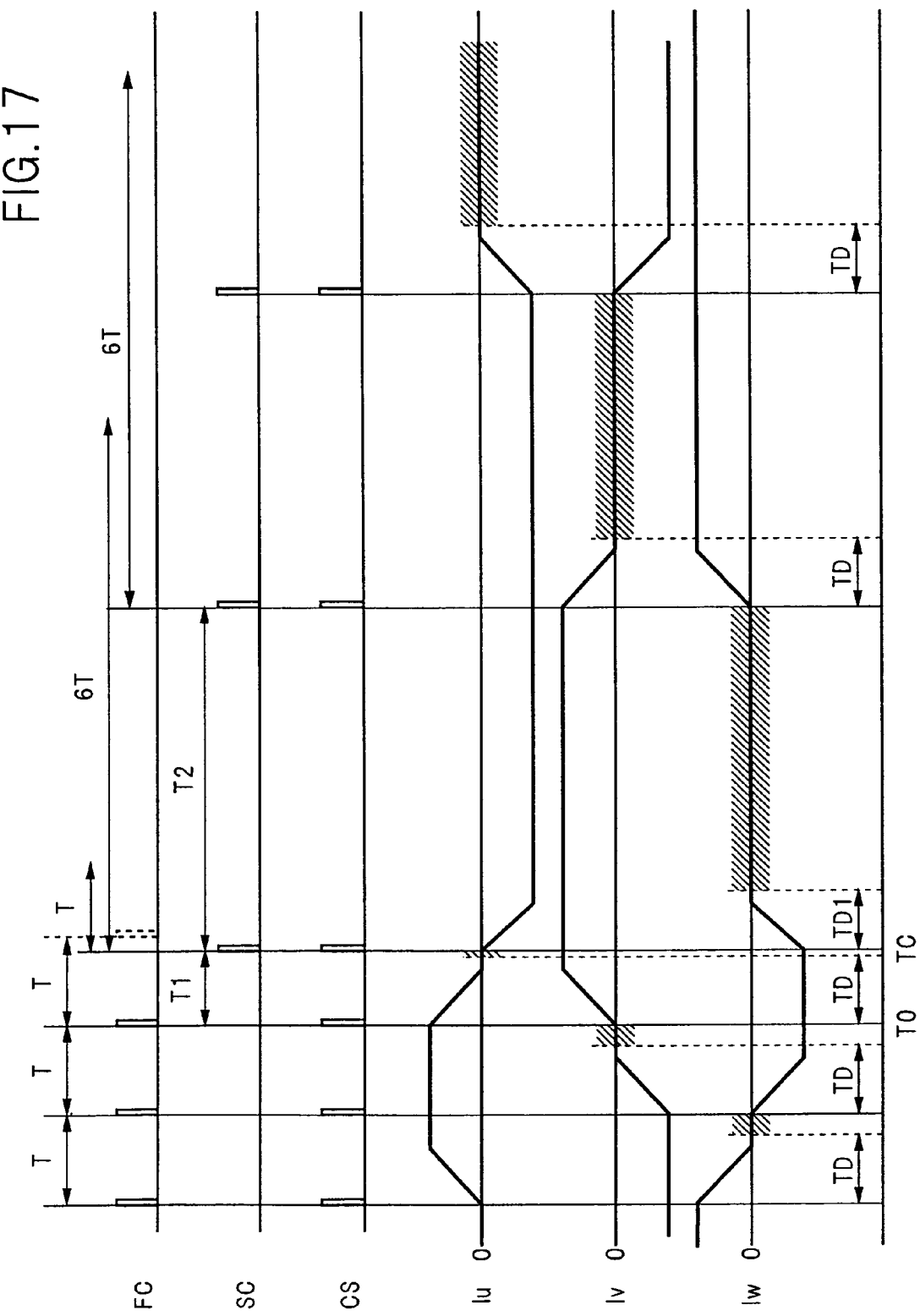
FIG. 17 is a timing chart showing the forced commutation signal FC, the self-commutation signal SC, the commutation signal CS, and the phase currents Iu, Iv, and Iw, at the start of the sensorless motor M, for the sensorless motor driving device according to Embodiment 1 of the present invention, in particular, showing the case where the pulse separation T2 of the self-commutation signal SC is longer than the original pulse separation T of the forced commutation signal FC and shorter than the extended pulse separation 6T of the forced commutation signal FC, i.e., T<T2<6T.
Figure 18:
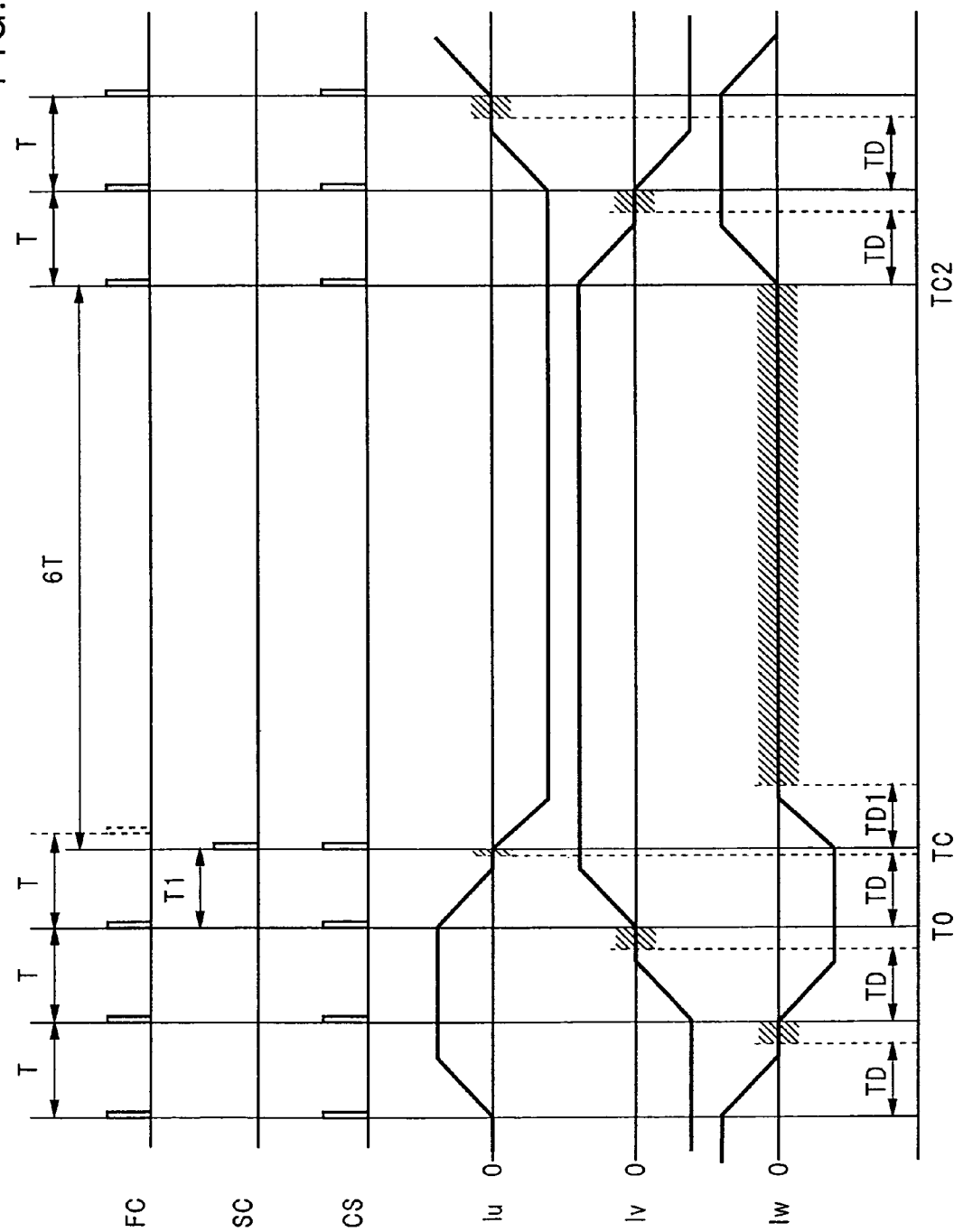
FIG. 18 is a timing chart showing the forced commutation signal FC, the self-commutation signal SC, the commutation signal CS, and the phase currents Iu, Iv, and Iw, at the start of the sensorless motor M, for the sensorless motor driving device according to Embodiment 1 of the present invention, in particular, showing the case where no new self-commutation signal SC is generated until the instant when the extended period 6T of the forced commutation signal FC has elapsed from the time TC.

The sensorless motor driving device according to Embodiment 1 of the present invention further starts the sensorless motor M under the following forced commutation control. In particular, using the above-described configuration, the sensorless motor driving device realizes prompt and reliable switching from the forced commutation control to the self-commutation control as follows. FIGS. 16, 17, and 18 are the timing charts showing the forced commutation signal FC, the self-commutation signal SC, the commutation signal CS, and the phase currents Iu, Iv, and Iw, at the start of the sensorless motor M. The BEMF detection periods are shown as the hatched areas in FIGS. 16–18.

The selection circuit 71 selects the forced commutation signal FC as the commutation signal CS from the start of the sensorless motor M until the first detection of the zero crossing, that is, the first generation of the self-commutation signal SC. See the time TC shown in FIGS. 16–18. Thereby, the switching period of the energization phases is equal to the period T of the forced commutation signal FC. Furthermore, the pulse width of the position signal PS is equal to $\frac{1}{16}$ of the period T of the forced commutation signal FC. See FIG. 14. Accordingly, the waveforms of the phase currents Iu, Iv, and Iw are established, based on the period T of the forced commutation signal FC. For example, the period of the phase currents is equal to six times of the period T of the forced commutation signal FC, and the duration of increase or decrease of the phase current is equal to $37.5°/60°\times T$. In addition, the duration TD from the generation of the forced commutation signal FC until the start of the BEMF detection period (cf. the hatched areas shown in FIGS. 16–18) is determined at a constant value, based on the period T of the forced commutation signal FC, for example, $TD=45°/60°\times T$. Similarly, the PWM disable period is established.

The first self-commutation signal SC is generated at the time TC in FIGS. 16–18. The self-commutation signal SC is always generated during the BEMF detection period. Hence, the pulse interval T1 between the self-commutation signal SC and the previous forced commutation signal FC, which is the forced commutation signal FC at the time T0 shown in FIGS. 16–18, is always shorter than the pulse interval T of the forced commutation signal FC. Accordingly, whenever the self-commutation signal SC is generated, the self-commutation signal SC always enters into the selection circuit 71 first, and selected as the commutation signal CS. Thereby, the energization phase is switched according to the self-commutation signal SC instead of the forced commutation signal FC. Thus, the forced commutation control is promptly and reliably changed into the self-commutation control.

The forced commutation circuit 6 extends the period or pulse interval of the forced commutation signal FC by six times at the instant TC of the generation of the self-commutation signal SC. See FIGS. 10 and 12. Furthermore, the pulse width of the position signal PS is equal to $\frac{1}{16}$ of the duration T1 of the previous energization phase at the energization phase immediately after the time TC. See FIG. 14. Accordingly, the waveform of the phase currents Iu, Iv, and Iw are established, based on the duration T1 of the previous energization phase. For example, the duration of increase or decrease of the phase current is equal to $37.5°/60°\times T1$. In addition, the duration TD1 from the time TC until the start of the BEMF detection period is established, based on the duration T1 of the previous energization phase, for example, $TD1=45°/60°\times T1$. Similarly, the PWM disable period is established.

When the generation of the self-commutation signal SC is repeated after the time TC and its pulse intervals are shorter than the extended pulse intervals 6T of the forced commutation signal FC, the commutation signal CS is synchronized to the self-commutation signal SC. See FIGS. 16 and 17. When the pulse interval T2 of the self-commutation signal SC is shorter than the original pulse interval T of the forced commutation signal FC: T2<T, for example, as shown in FIG. 16, the pulse width of the position signal PS is equal to $\frac{1}{16}$ of the pulse interval T2 of the self-commutation signal SC at the next energization phase. See FIG. 14. Accordingly, the waveform of the phase currents Iu, Iv, and Iw are established, based on the pulse interval T2 of the self-commutation signal SC. For example, the duration of increase or decrease of the phase current is equal to $37.5°/60°\times T2$. Furthermore, the duration TD2 from the switching between the energization phases until the start of the BEMF detection period is established, based on the pulse interval T2 of the self-commutation signal SC, for example, $TD2=45°/60°\times T2$. Similarly, the PWM disable period is established.

When the pulse interval T2 of the self-commutation signal SC is longer than the original pulse interval T of the forced commutation signal FC, and shorter than the extended pulse interval 6T of the forced commutation signal FC: T<T2<6T, for example, as shown in FIG. 17, the pulse width of the position signal PS is established to be equal to $\frac{1}{16}$ of the original pulse interval T of the forced commutation signal FC at the next energization phase. See FIG. 14. Accordingly, the waveforms of the phase currents Iu, Iv, and Iw are established, based on the original pulse interval T of the forced commutation signal FC. For example, the duration of increase or decrease of the phase currents is equal to $37.5°/60°\times T$. Furthermore, the duration TD from the switching of the energization phase until the start of the BEMF detection period is established, based on the pulse interval T of the forced commutation signal FC, for example, $TD=45°/60°\times T$. Similarly, the PWM disable period is established.

When no new self-commutation signal SC is generated from the time TC until the instant when the extended period 6T of the forced commutation signal FC has elapsed, for example, as shown in FIG. 18, the forced commutation signal FC is selected as the next commutation signal CS. In other words, the next switching between the energization phases is performed at the generation of the forced commutation signal FC. See the time TC2 shown in FIG. 18. At the energization phase, the pulse width of the position signal PS is established to be equal to 1/16 of the original pulse interval T of the forced commutation signal FC. See FIG. 14. Accordingly, the waveforms of the phase currents Iu, Iv, and Iw are established, based on the original pulse interval T of the forced commutation signal FC. For example, the duration of increase or decrease of the phase current is equal to 37.5°/60°×T. Furthermore, the duration TD from the switching between the energization phases until the start of the BEMF detection period is established, based on the pulse interval T of the forced commutation signal FC, for example, TD=45°/60°×T. Similarly, the PWM disable period is established. In addition, the forced commutation circuit 6 reset the period of the forced commutation signal FC to the original period T, at the time TC2. After that, the forced commutation control is continued until the self-commutation signal SC is generated again.

The conditions shown in FIGS. 17 and 18 tend to appear in the period when the revolving speed of the rotor is low, for example, at the start of the sensorless motor M. Under such conditions, in general, the low levels of the BEMF reduce the accuracy of the zero crossing detection. The extension of the BEMF detection period is desirable to maintain the zero crossing detection with high accuracy. As shown in FIGS. 17 and 18, the long BEMF detection period is secured in the sensorless motor driving device according to Embodiment 1 of the present invention. Accordingly, the zero crossing detection is maintained with high accuracy, and therefore, the smooth and reliable start of the sensorless motor can be achieved, in particular. Furthermore, the pulse width of the position signal PS never exceed 1/16 of the original pulse interval T of the forced commutation signal FC, regardless of the duration of the previous energization phase. Thereby, the rising rate of the phase current is maintained more than a constant rate at the switching between the energization phases. Accordingly, the torque produced is high enough. In particular, the starting torque is high at the start of the sensorless motor M, and therefore, the starting time can be reduced, and the starting control is resistant to changes of load.

Furthermore, the sensorless motor driving device according to Embodiment 1 of the present invention promptly resumes the forced commutation control similar to that performed upon the start of the sensorless motor M, as shown in FIG. 18, when the device fails to change from the forced commutation control into the self-commutation control owing to the lack of repetition of the zero crossing detection. In other words, the device is required to, for example, neither judge the revolving speed of the rotor, nor wait for a retry command from the external microprocessor, in contrast to the retry of a conventional sensorless motor driving device. Thus, the further smooth start of the sensorless motor can be achieved.

The sensorless motor M under the operating conditions tends to undergo excessive vibrations/shocks from the outside, when the sensorless motor M is used as, for example, a spindle motor of the CD/DVD drive or HDD of the mobile information apparatus. Accordingly, it is assumed that an abrupt torque is produced at the rotor owing to the excessive vibration/shock, and then causes an abrupt and large shift of the zero crossing point of the BEMF and a sudden interruption of the generation of the self-commutation signal SC. Preferably, the forced commutation circuit 6 constantly continues the generation of the forced commutation signal FC throughout the driving period of the sensorless motor M, in the sensorless motor driving device according to Embodiment 1 of the present invention. Thereby, the selection circuit 71 can promptly select the forced commutation signal FC as the commutation signal CS, even when the generation of the self-commutation signal SC suddenly stops as described above. In other words, the self-commutation control is promptly changed into the forced commutation control. The forced commutation control is further changed into the self-commutation control promptly and reliably as described above. Thus, the control by the sensorless motor driving device according to Embodiment 1 of the present invention is resistant to vibrations/shocks from the outside.

The PWM control section 1 directly adjusts the phase currents Iu, Iv, and Iw, using the above-described current driving control, in the sensorless motor driving device according to Embodiment 1 of the present invention. Alternatively, the PWM control section 1 may indirectly adjust the phase currents Iu, Iv, and Iw, using the voltage driving control, that is, the control of the driving voltages applied from the output circuit 3 to the three driving terminals U0, V0, and W0 of the sensorless motor M.

Figure 28:
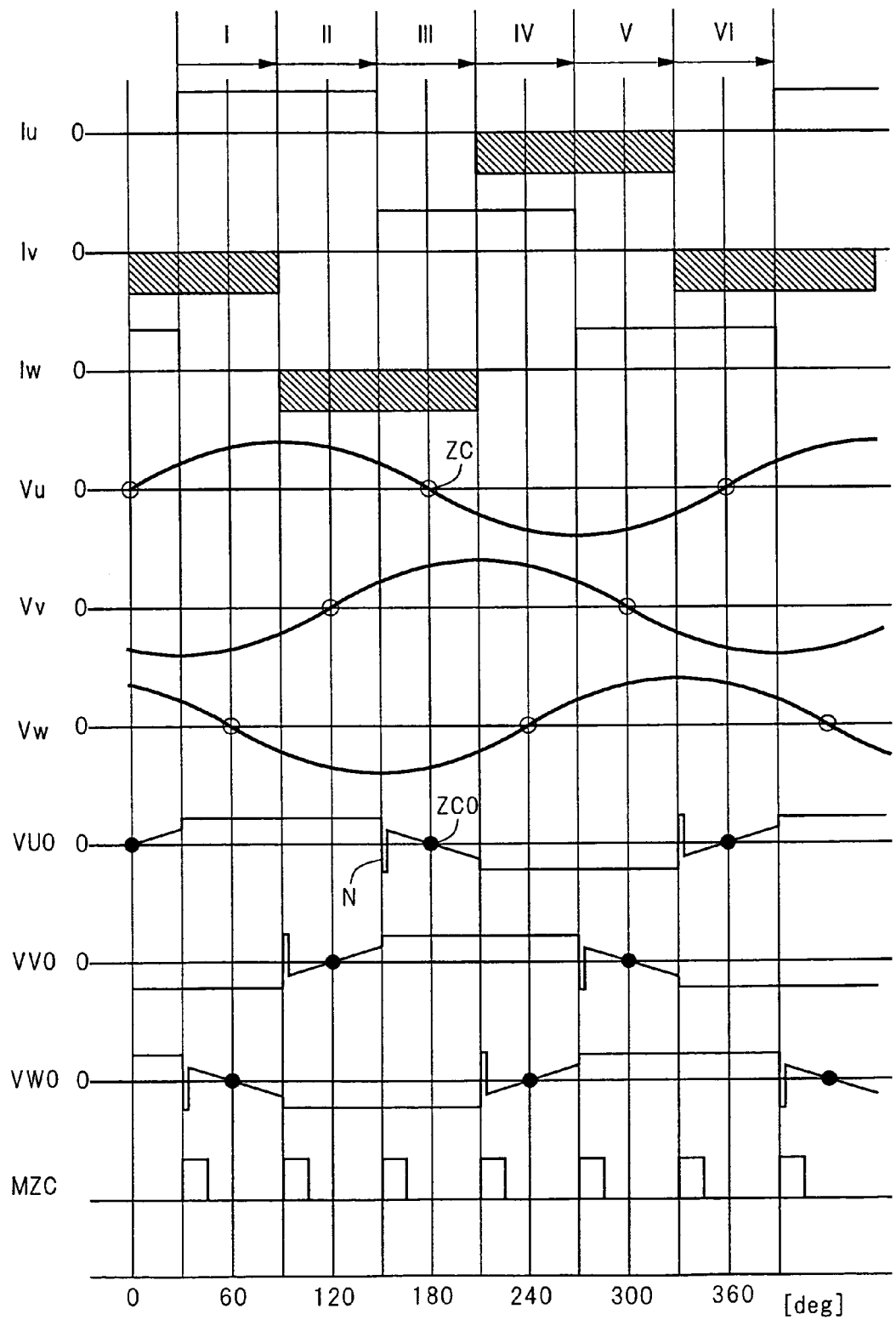
FIG. 28 is a waveform diagram showing the BEMF Vu, Vv, and Vw, and the phase currents Iu, Iv, and Iw of the three motor coils Mu, Mv, and Mw, respectively, the position-detection mask signal MZC, and the potentials VU0, VV0, and VW0 of the three driving terminals U0, V0, and W0, respectively, during the stable rotor rotation in the conventional sensorless motor driving device.

The PWM control section 1 maintains the phase currents Iu, Iv, and Iw gentle in waveform as described above, in the sensorless motor driving device according to Embodiment 1 of the present invention. The PWM control section 1 may alternatively maintain the phase currents Iu, Iv, and Iw rectangular in waveform, in the similar manner to that of the conventional sensorless motor driving device. See FIG. 28, for example. Even in that case, the rapidity and reliability of the switching from the forced commutation control to the self-commutation control are never lost, and therefore, the prompt and reliable start of the sensorless motor can be realized.

<<Embodiment 2>>

A sensorless motor driving device according to Embodiment 2 of the present invention is aimed at a sensorless motor with three phases (U, V, and W phases), for example, in a manner similar to that of the driving device according to the above-described Embodiment 1. The components of that sensorless motor driving device are similar to the components of the driving device according to the above-described Embodiment 1 except the count circuit 72. See FIG. 1. For the similar components, the descriptions and drawings referred to for the above-described Embodiment 1 are cited.

Figure 19:
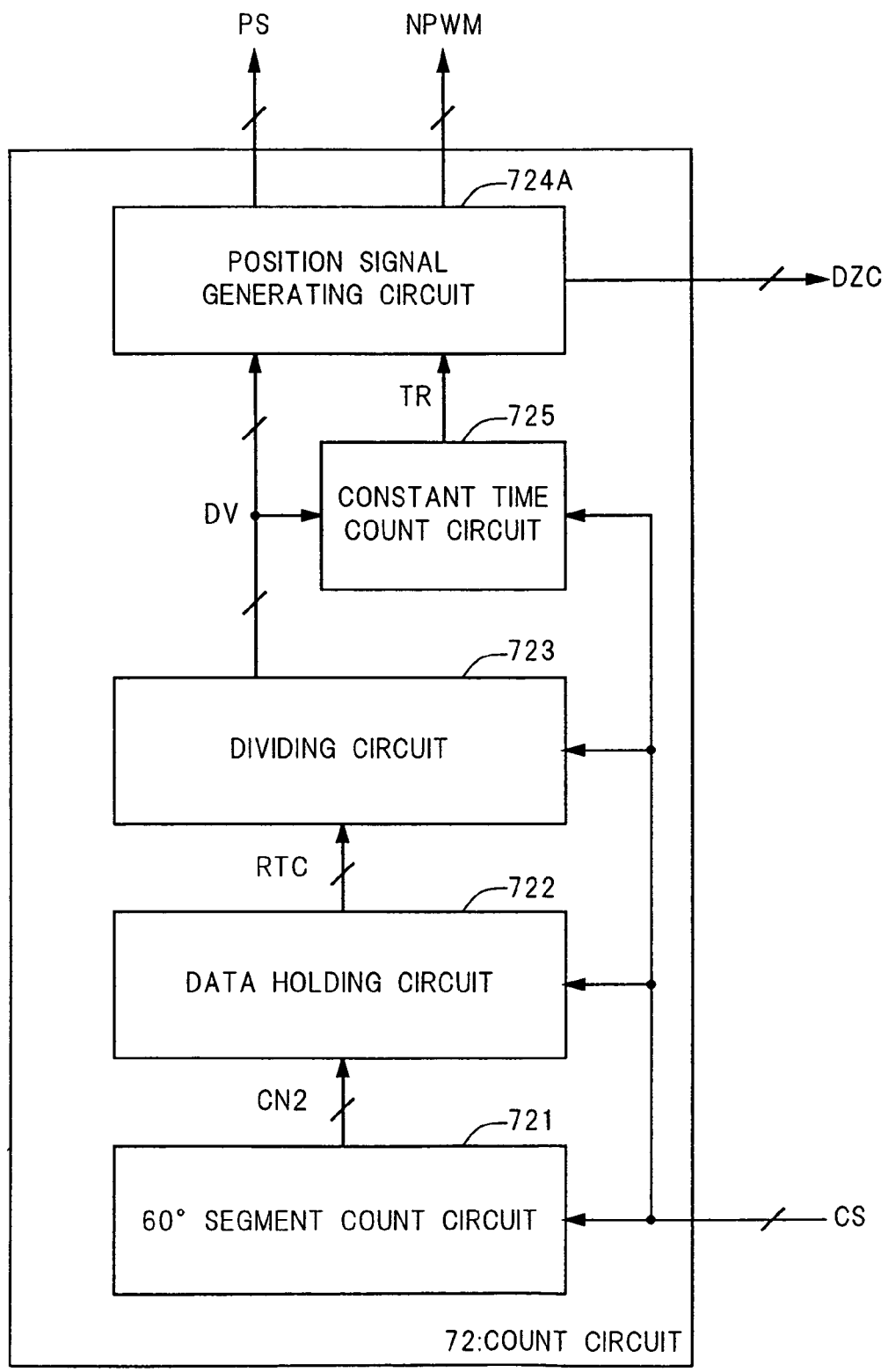
FIG. 19 is a block diagram showing the configuration inside a count circuit 72 in a sensorless motor driving device according to Embodiment 2 of the present invention.
Figure 20:
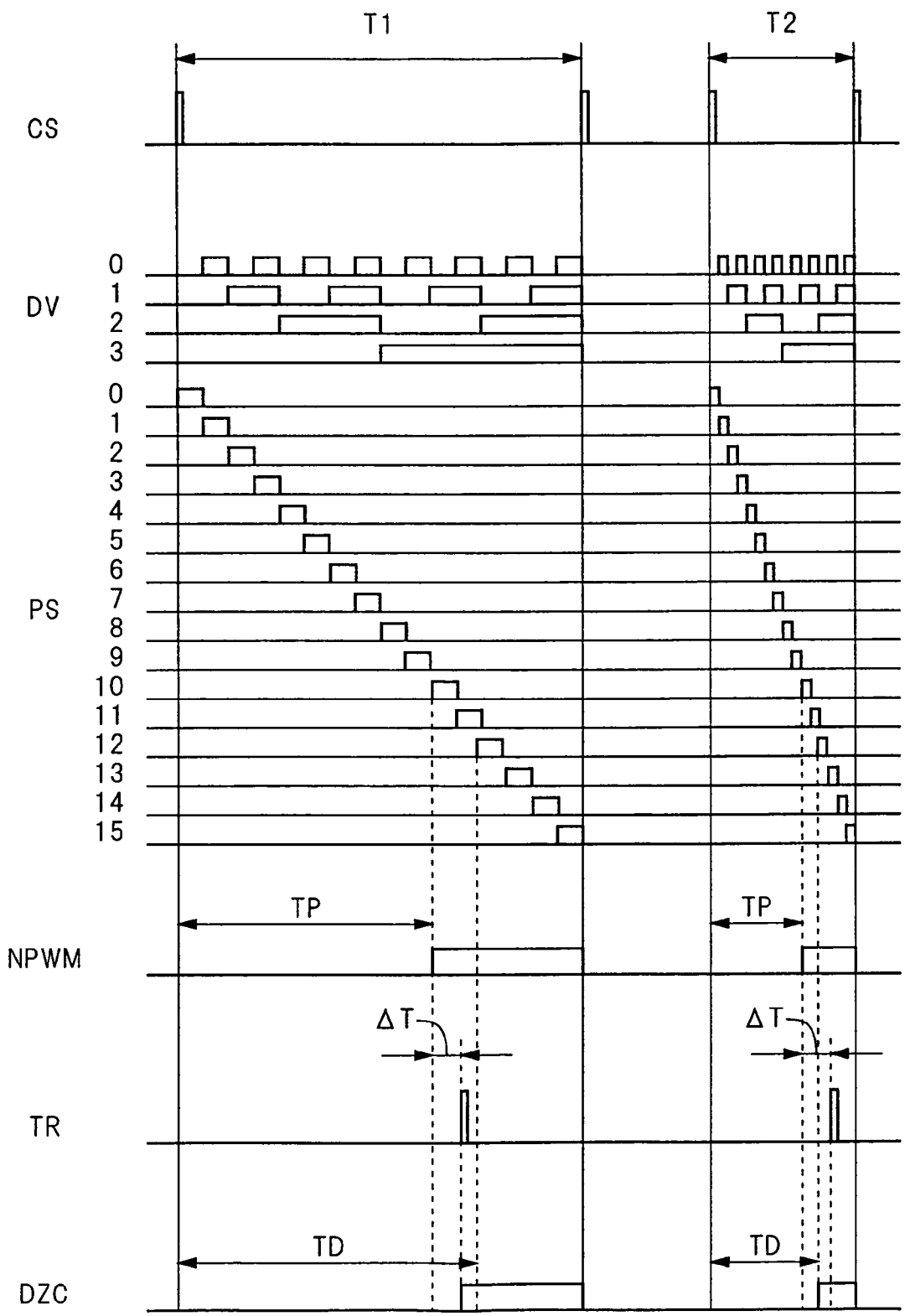
FIG. 20 is a timing chart of a commutation signal CS, a parallel signal DV of four bits, a position signal PS, a PWM disable signal NPWM, a trigger TR, and a BEMF detection signal DZC, for the sensorless motor driving device according to Embodiment 2 of the present invention.

The sensorless motor driving device according to Embodiment 2 of the present invention has a different configuration inside the count circuit 72 from that of the driving device according to the above-described Embodiment 1. FIG. 19 is the block diagram showing the configuration inside the count circuit 72 in the sensorless motor driving device according to Embodiment 2 of the present invention. FIG. 20 is the timing chart of a commutation signal CS, a parallel signal DV of 4 bits, a position signal PS, a PWM disable signal NPWM, a trigger TR, and a BEMF detection signal DZC. In FIGS. 19 and 20, the components similar to the components shown in FIGS. 13 and 14 are marked with the same reference symbols as the reference symbols shown in FIGS. 13 and 14, and, for the similar components, the descriptions for Embodiment 1 are cited.

The count circuit 72 includes a constant time count circuit 725, in addition to the 60°-segment count circuit 721, the data holding circuit 722, the dividing circuit 723, and the position signal generation circuit 724A. The constant time count circuit 725 reads the parallel signal DV of 4 bits from the dividing circuit 723, and measures a constant time ΔT elapsing from the rising of a pulse of the position signal PS with a constant number, for example, the pulse No. 10. The constant time count circuit 725 further sends the trigger TR to the position signal generation circuit 724A at the instant when the constant time ΔT has elapsed. Here, the constant time count circuit 725 may starts the measurement at the rising of the pulse of the position signal PS with a number different from 10. However, the start of the measurement is set at the rising of the PWM disable signal NPWM.

The position signal generation circuit 724A reads the 4 bits of the parallel signal DV from the dividing circuit 723, and activates one of the 16 pulses Nos. 0–15 of the position signal PS, which has the same number as the numerical value represented by the 4 bits of the parallel signal DV. See FIG. 20. In particular, the top pulse No. 0 is synchronized to the commutation signal CS, and accordingly, a series of the pulses Nos. 0–15 divide the pulse interval of the commutation signal CS into 16 segments. The segment per pulse of the position signal PS is equivalent to 3.75° in electrical angles since the pulse interval of the commutation signal CS determines the duration of one energization phase, that is, the duration of 60° in electrical angles. Thus, each of the pulses Nos. 0–15 indicates an estimated rotor position of the sensorless motor M at 3.75° intervals in electrical angles. See FIGS. 3 and 19.

The position signal generation circuit 724A further activates the PWM disable signal NPWM in synchronization with the rising edge of a pulse of the position signal PS, which has a constant number, for example, 10. See FIG. 20. Thereby, the duration TP from the generation of the commutation signal CS or the switching between the energization phases until the start of the PWM disable period is set at the duration of the constant electrical angles, for example, 37.50. Here, the duration TP may be a value different from 37.5°, for example, 30°. In addition, the duration TP may be set longer than the duration of changes in level of, in particular, the decreasing torque instruction TQ2. See FIG. 3.

The position signal generation circuit 724A activates the BEMF detection signal DZC in synchronization with the rising edge of either the pulse of the position signal PS with a constant number, for example, 12, or the trigger TR, whichever enters first. See FIG. 20. When the revolving speed of the rotor is small as shown in the left half of FIG. 20, for example, the pulse interval T1 of the commutation signal CS is long, and hence, the trigger TR is generated earlier than the pulse No. 12 of the position signal PS. At that time, the BEMF detection signal DZC rises in synchronization with the rising edge of the trigger TR. Accordingly, the duration from the switching between the energization phases until the start of the BEMF detection period is shorter than the period TD of 37.5° in electrical angles.

On the other hand, when the revolving speed of the rotor increases enough as shown in the right half of FIG. 20, for example, the pulse interval T2 of the commutation signal CS is short enough, and hence, the pulse No. 12 of the position signal PS is generated earlier than the trigger TR. At that time, the BEMF detection signal DZC rises in synchronization with the rising edge of the pulse No. 12 of the position signal PS. Accordingly, the duration from the switching between the energization phases until the start of the BEMF detection period agrees with the duration TD of 37.5° in electrical angles. Thus, the duration from the start of the PWM disable period to the start of the BEMF detection period is maintained small enough at the level that the false detection of the zero crossing due to, for example, fly-back voltages can be avoided, regardless of the revolving speed of the rotor. In other words, the BEMF detection period is promptly started. As a result, the zero crossing detection is maintained with high accuracy, regardless of the revolving speed of the rotor.

<<Embodiment 3>>

A sensorless motor driving device according to Embodiment 3 of the present invention is aimed at a sensorless motor with three phases (U, V, and W phases), for example, in a manner similar to that of the driving device according to the above-described Embodiment 1. The components of that sensorless motor driving device are similar to the components of the driving device according to the above-described Embodiment 1 except the forced commutation circuit 6. See FIG. 1. For the similar components, the descriptions and drawings referred to for the above-described Embodiment 1 are cited.

Figure 21:
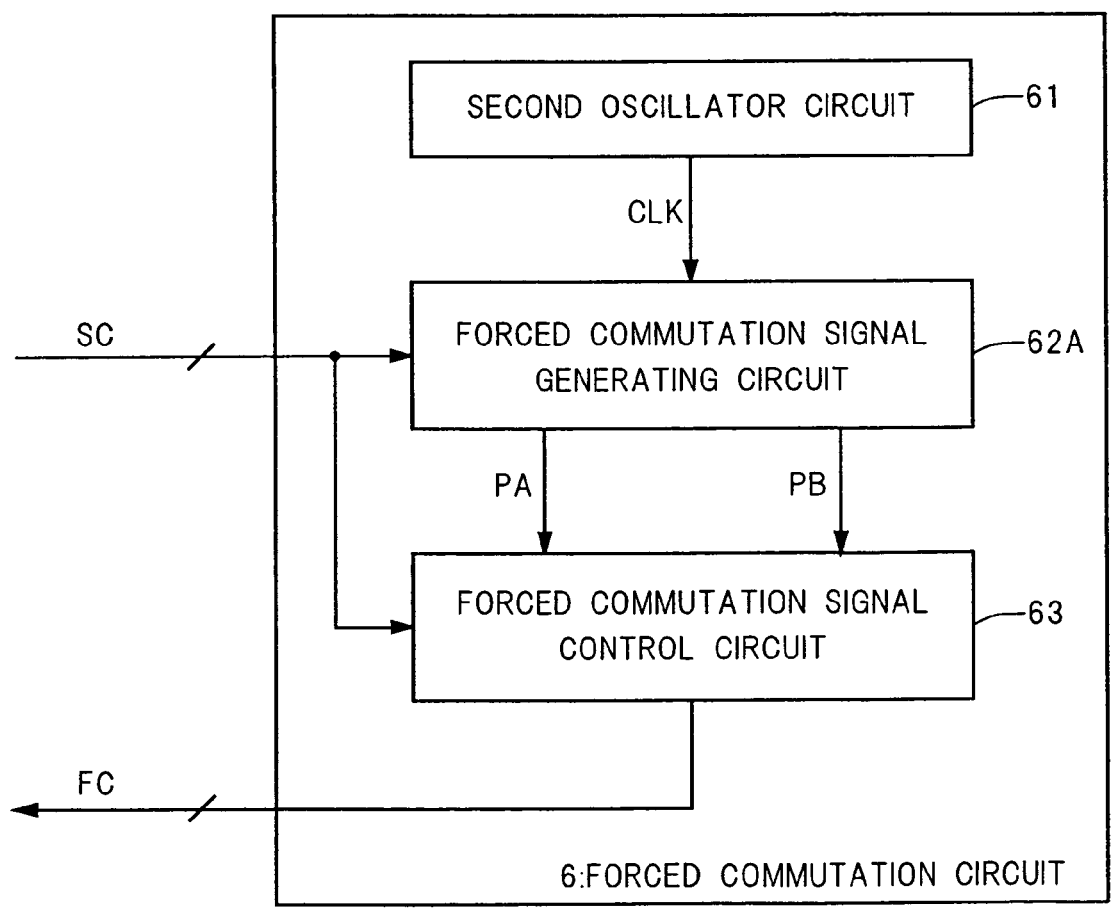
FIG. 21 is a block diagram showing the configuration inside a forced commutation circuit 6 in a sensorless motor driving device according to Embodiment 3 of the present invention.

The sensorless motor driving device according to Embodiment 3 of the present invention has a different configuration inside the forced commutation circuit 6 from that of the driving device according to the above-described Embodiment 1. FIG. 21 is the block diagram showing the configuration inside the forced commutation circuit 6 in the sensorless motor driving device according to Embodiment 3 of the present invention. In FIG. 21, the components similar to the components shown in FIG. 9 are marked with the same reference symbols as the reference symbols shown in FIG. 9, and, for the similar components, the descriptions for Embodiment 1 are cited.

Figure 22:
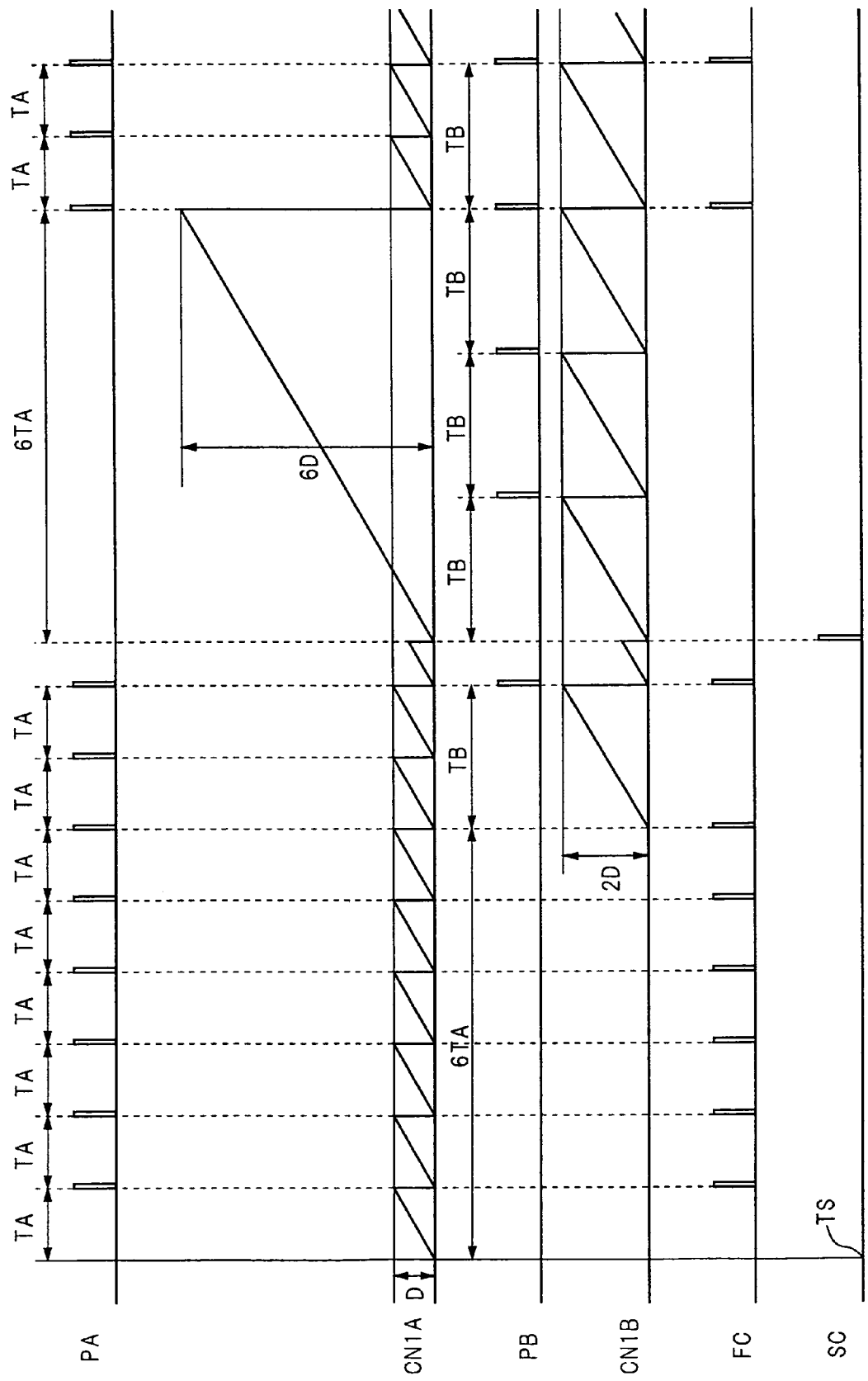
FIG. 22 is a timing chart showing two signals PA and PB generated by a forced commutation signal generating circuit 62A, a first count CN1A and a second count CN1B of the pulses of a clock signal CLK, a forced commutation signal FC, and a self-commutation signal SC, for the sensorless motor driving device according to Embodiment 3 of the present invention.
Figure 23:
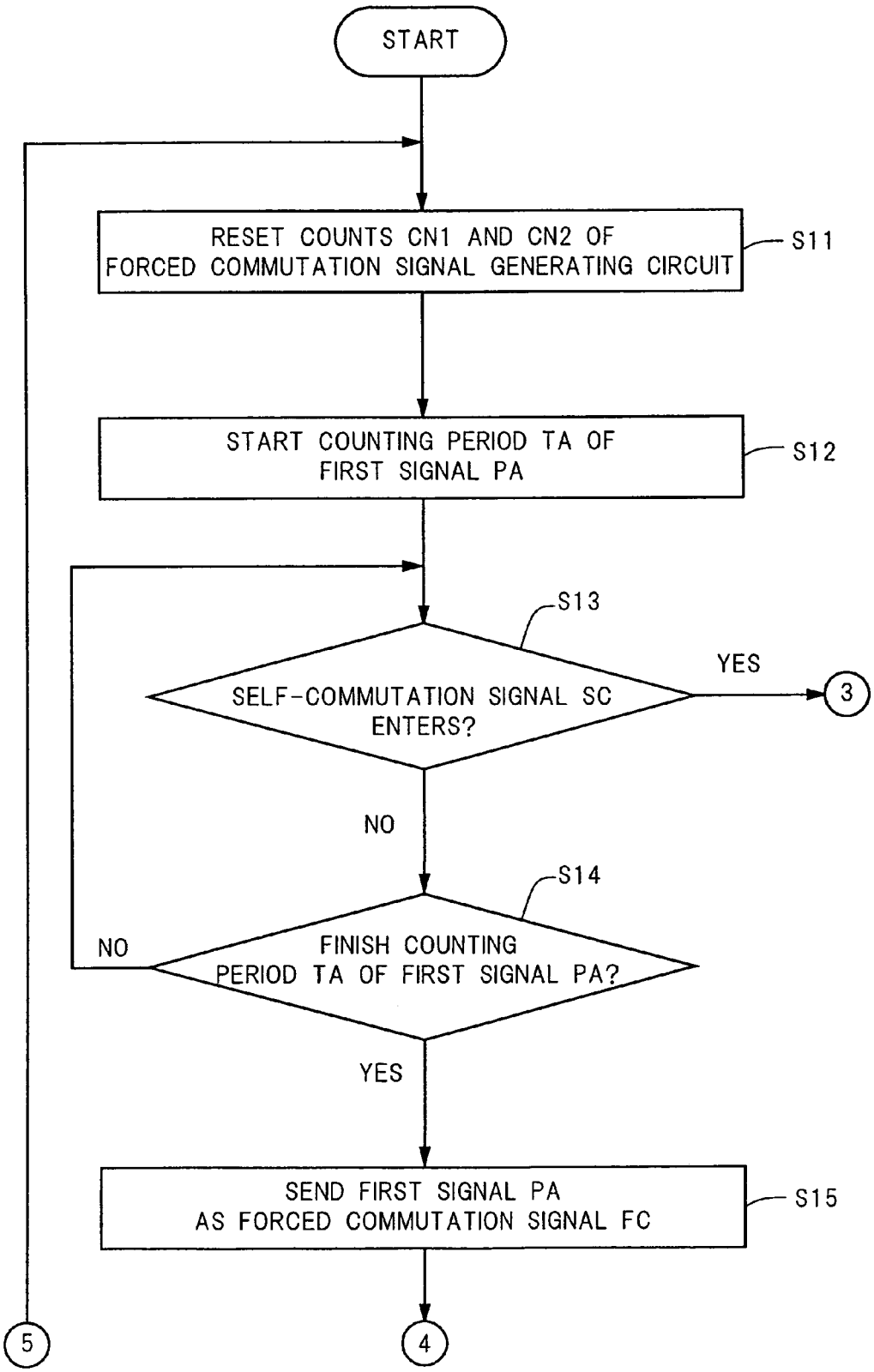
FIG. 23 is the first part of a flow chart showing the operations of the forced commutation signal generating circuit 62A and a forced commutation signal control circuit 63, which generate the forced commutation signal FC, for the sensorless motor driving device according to Embodiment 3 of the present invention.
Figure 24:
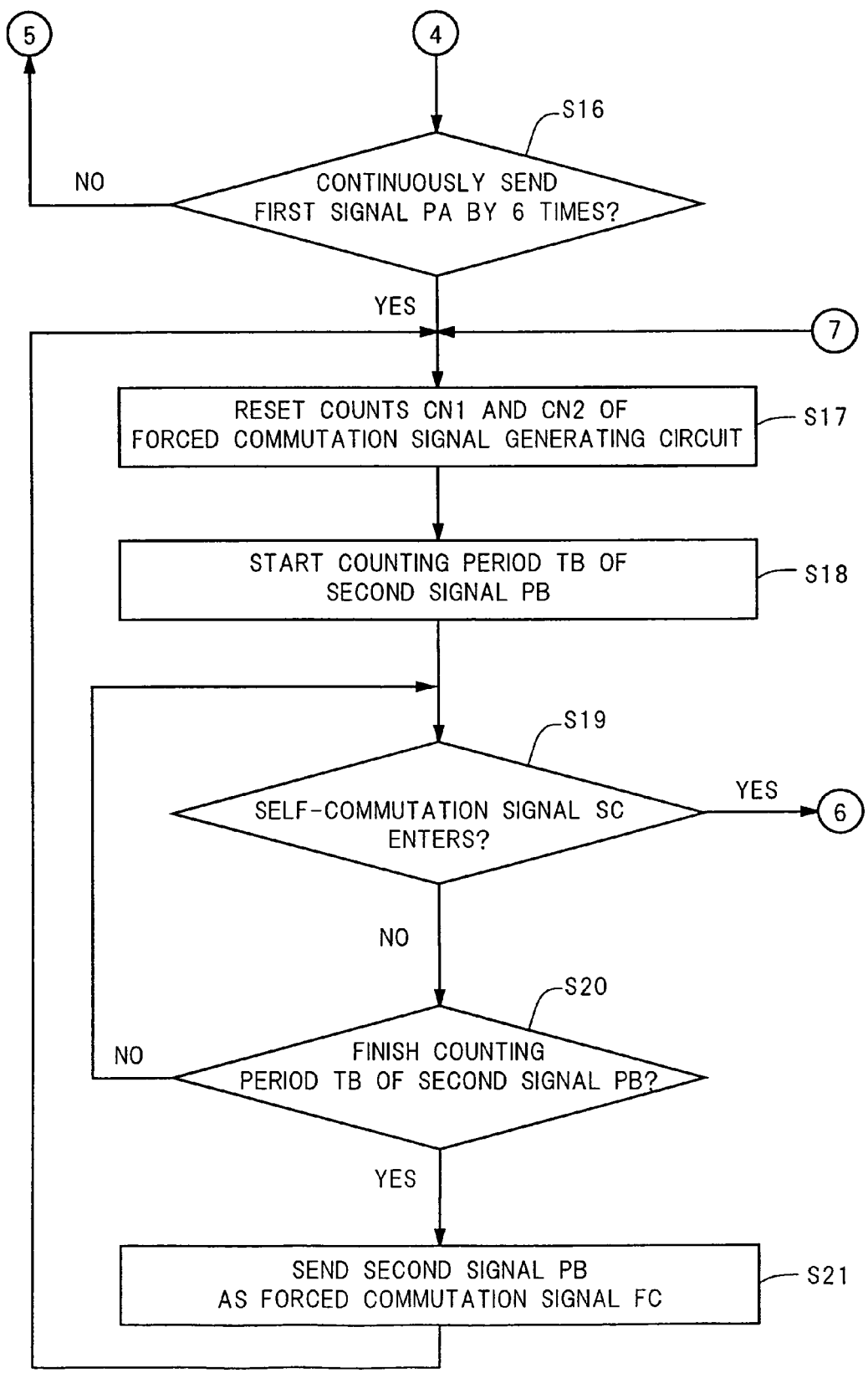
FIG. 24 is the second part of the flow chart showing the operations of the forced commutation signal generating circuit 62A and the forced commutation signal control circuit 63, which generate the forced commutation signal FC, for the sensorless motor driving device according to Embodiment 3 of the present invention.
Figure 25:
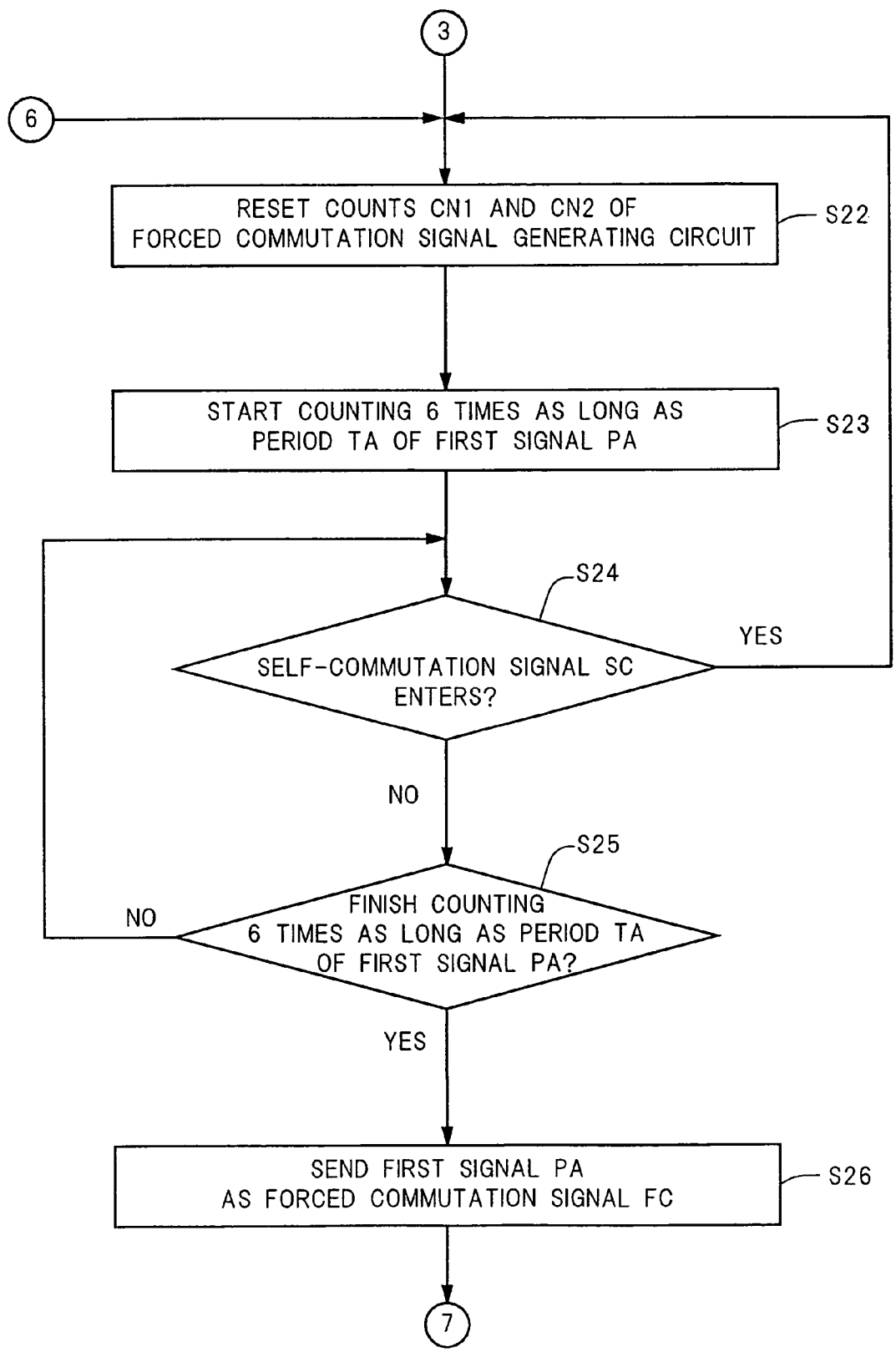
FIG. 25 is the third part of the flow chart showing the operations of the forced commutation signal generating circuit 62A and the forced commutation signal control circuit 63, which generate the forced commutation signal FC, for the sensorless motor driving device according to Embodiment 3 of the present invention.

The forced commutation circuit 6 includes a second oscillator circuit 61, a forced commutation signal generating circuit 62A, and a forced commutation signal control circuit 63. The forced commutation signal generating circuit 62A and the forced commutation signal control circuit 63 generate a forced commutation signal FC based on the clock signal CLK and the self-commutation signal SC as follows. FIG. 22 is the timing chart showing two signals PA and PB generated by the forced commutation signal generating circuit 62A, a first count CN1A and a second count CN1B about the pulses of the clock signal CLK, the forced commutation signal FC, and the self-commutation signal SC. FIGS. 23, 24, and 25 are the flow charts showing the operations generating the forced commutation signal FC by the forced commutation signal generating circuit 62A and the forced commutation signal control circuit 63.

The forced commutation signal generating circuit 62A has two counters inside. The forced commutation signal generating circuit 62A first resets both of the counters at the start of control, or the time TS shown in FIG. 22. See S11 shown in FIG. 23. The forced commutation signal generating circuit 62A then counts the pulses of the clock signal CLK with the first counter. See S12 shown in FIG. 23. The forced commutation signal generating circuit 62A generates the first signal PA when the count CN1A of the first counter reaches a first threshold value D before the self-commutation signal SC enters, as shown in FIG. 22. See S13 and S14 shown in FIG. 23. Furthermore, the forced commutation signal control circuit 63 sends the first signal PA as the forced commutation signal FC. See S15 shown in FIG. 23. Here, the first signal PA is a pulse of identical shape with the self-commutation signal SC.

The forced commutation signal generating circuit 62A and the forced commutation signal control circuit 63 count the pulses of the first signal PA during the period when no self-commutation signal SC enter. See S16 shown in FIG. 24. During the period when no self-commutation signal SC enter and the number of pulses of the first signal PA is smaller than a constant, for example 6, as shown in FIG. 22, resetting of the count CN1A of the first counter, generating of the first signal PA, and sending of the first signal PA as the forced commutation signal FC are repeated at every time when the count CN1A of the first counter reaches the first threshold value D. See S11–S16 shown in FIGS. 23 and 24. Here, the period or pulse interval of the first signal PA is equal to the time TA required for the generation of the same number of pulses of the clock signal CLK as the first threshold value D, during the period when no self-commutation signal SC enter.

When the number of pulses of the first signal PA reaches a constant, for example 6, before the self-commutation signal SC enters as shown in FIG. 22, the forced commutation signal generating circuit 62A resets both counters, and counts the pulses of the clock signal CLK with the second counter in addition to the first counter. See S17 and S18 shown in FIGS. 24. When no self-commutation signal SC enter as shown in FIG. 22, the forced commutation signal generating circuit 62A generates the second signal PB and resets the count CN1B of the second counter at every time when the count CN1B of the second counter reaches a second threshold value 2D. See S17, S18, S19, and S20 shown in FIG. 24. Furthermore, the forced commutation signal control circuit 63 sends the second signal PB instead of the first signal PA as the forced commutation signal FC, during the period from the start of the count by the second counter until the entry of the self-commutation signal SC. See S21 shown in FIG. 24.

Here, the second signal PB is the pulse of identical shape with the self-commutation signal SC, like the first signal PA. Furthermore, the period or pulse interval of the second signal PB is equal to the time TB required for the generation of the same number of pulses of the clock signal CLK as the second threshold value 2D. The second threshold value 2D is larger than the first threshold value D, and preferably, twice. At that time, the period TB of the second signal PB is longer than the period TA of the first signal PA:TB>TA, and preferably, twice as long as the period TA of the first signal PA.

At the entry of the self-commutation signal SC, the forced commutation signal generating circuit 62A resets both the two counts CN1A and CN1B of the pulses of the clock signal CLK even before reaching the respective threshold values D and 2D, as shown in FIG. 22. See S13 shown in FIG. 23, S19 shown in FIG. 24, and S22 shown in FIG. 25. The forced commutation signal generating circuit 62A then replaces the first threshold value D with a third threshold value in the first counter. Here, the third threshold value is larger than both of the first threshold value D and the second threshold value 2D, and preferably, six times as large as the first threshold value D. Alternatively, the third threshold value may be, for example, twenty times. The third threshold value is further preferably the integral multiple of the second threshold value 2D. Under the conditions, the forced commutation signal generating circuit 62A again counts the pulses of the clock signal CLK with both of the two counters. See FIG. 22 and S23 shown in FIG. 25. On the other hand, the forced commutation signal control circuit 63 selects the first signal PA as the forced commutation signal FC, instead of the second signal PB, during the period when the third threshold value 6D of is set in the first counter. In other words, no second signal PB is sent as the forced commutation signal FC as shown in FIG. 22.

When the next self-commutation signal SC enters before the count CN1A of the first counter reaches the third threshold value 6D, the forced commutation signal generating circuit 62A resets the counts CN1A and CN1B of the two counters, and counts the pulses of the clock signal CLK from 0 again. See S22, S23, and S24 shown in FIG. 25. At that time, the threshold of the count CN1A of the first counter is maintained at the third threshold value 6D. Furthermore, the forced commutation signal control circuit 63 maintains the first signal PA to be the selection target as the forced commutation signal FC. Thus, no forced commutation signal FC are generated when the generation of the self-commutation signal SC is repeated and its pulse interval is shorter than the time 6TA required for the generation of the same number of pulses of the clock signal CLK as the third threshold value 6D.

The forced commutation signal generating circuit 62A generates the first signal PA when the count CN1A of the first counter reaches the third threshold value 6D before the next self-commutation signal SC enters, as shown in FIG. 22. Furthermore, the forced commutation signal control circuit 63 sends the first signal PA as the forced commutation signal FC. See S25 and S26 shown in FIG. 25. The forced commutation signal generating circuit 62A then replaces the third threshold value 6D with the original first threshold value D in the first counter. Furthermore, the forced commutation signal control circuit 63 selects the second signal PB, instead of the first signal PA, as the forced commutation signal FC. Under the conditions, the loop S17–S21 shown in FIG. 24 is repeated until the self-commutation signal SC enters again. In particular, the period of the forced commutation signal FC is again set at the period TB of the second signal PB. See FIG. 22.

Figure 26:
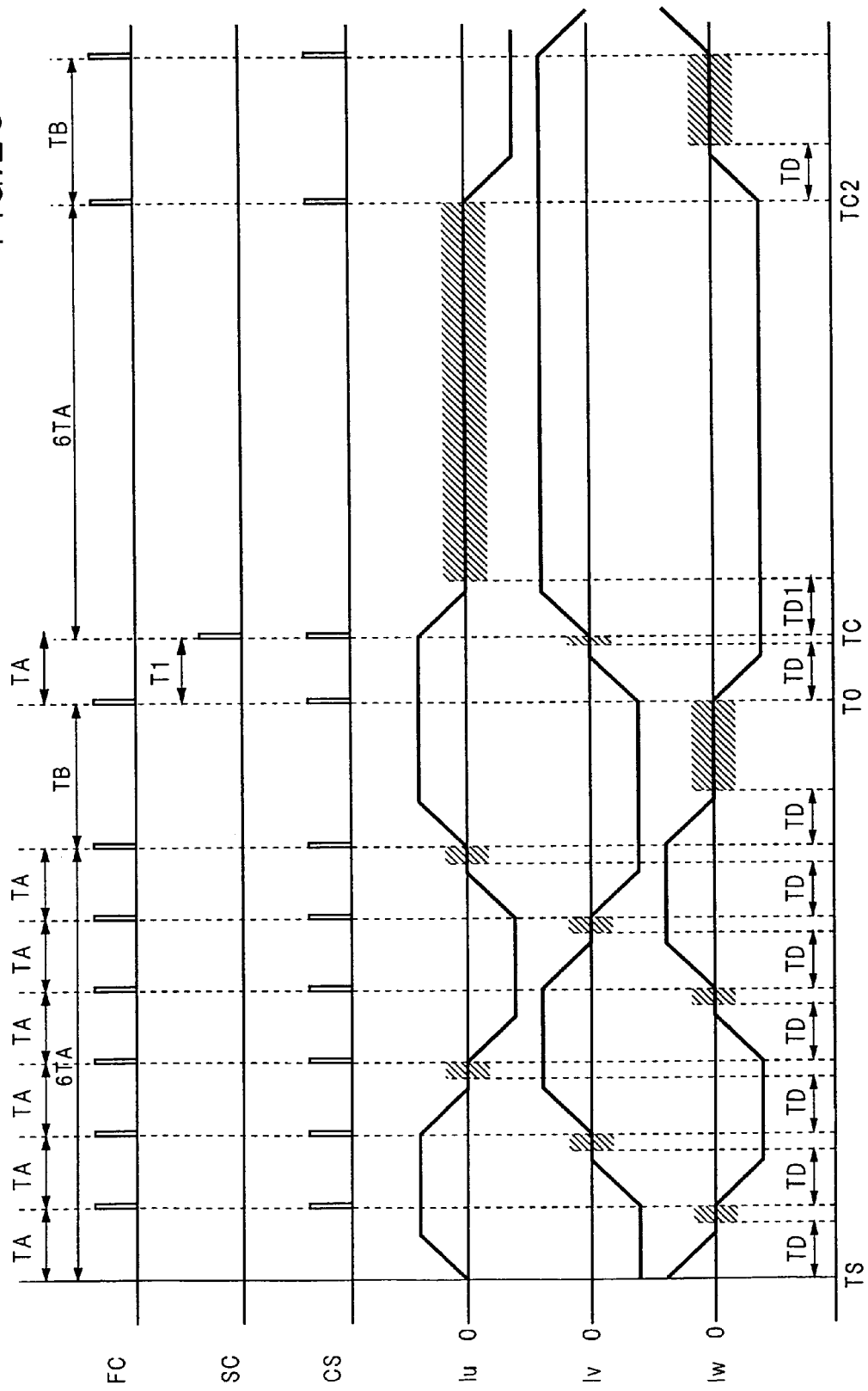
FIG. 26 is a timing chart showing the forced commutation signal FC, the self-commutation signal SC, the commutation signal CS, and the phase currents Iu, Iv, and Iw, at the start of the sensorless motor, for the sensorless motor driving device according to Embodiment 3 of the present invention.
Figure 27:
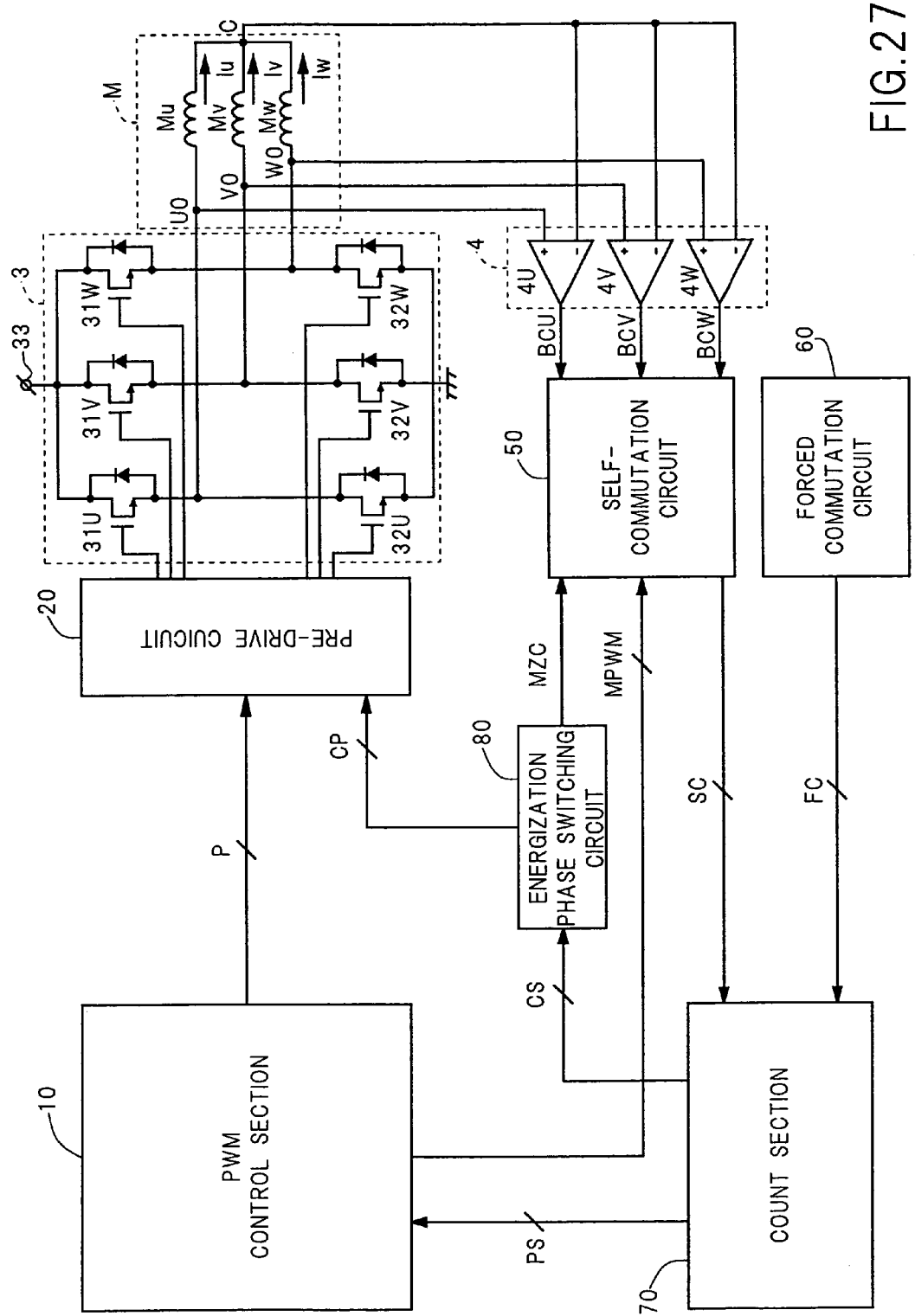
FIG. 27 is the block diagram showing the conventional sensorless motor driving device.

The sensorless motor driving device according to Embodiment 3 of the present invention starts the sensorless motor M under the following forced commutation control. In particular, using the above-described forced commutation circuit 6, the driving device realizes the prompt and reliable switching from the forced commutation control to the self-commutation control, regardless of the weight of load as follows. FIG. 26 is the timing chart showing, at the start of the sensorless motor M, the forced commutation signal FC, the self-commutation signal SC, the commutation signal CS, and the phase currents Iu, Iv, and Iw. In FIG. 26, the BEMF detection periods are shown as the hatched areas.

The selection circuit 71 first selects the forced commutation signal FC as the commutation signal CS from the start instant TS of the sensorless motor M until the first detection of the zero crossing, that is, the first generation of the self-commutation signal SC at the time TC shown in FIG. 26. In that period, the first signal PA is sent as the forced commutation signal FC, and accordingly, the period of the switching between the energization phases is equal to the period TA of the first signal PA, which is hereafter referred to as a short period TA of the forced commutation signal FC. Furthermore, the pulse width of the position signal PS is equal to $\frac{1}{16}$ of the short period TA of the forced commutation signal FC. See FIG. 14. Accordingly, the waveforms of the phase currents Iu, Iv, and Iw are set based on the short period TA of the forced commutation signal FC. For example, the period of the phase current is equal to 6 times of the short period TA of the forced commutation signal FC, and the duration of increase or decrease of the phase current is equal to $37.5°/60° \times TA$. In addition, the duration TD from the generation of the forced commutation signal FC until the start of the BEMF detection period (cf. the hatched area shown in FIG. 26) is determined, based on the short period TA of the forced commutation signal FC, at a constant, for example, TD=45°/60°×TA. The start of the PWM disable period is similarly determined.

When the self-commutation signal SC is generated before the forced commutation signal FC continuously repeats the generation six times from the start instant TS of the sensorless motor M, the energization phase is switched according to the self-commutation signal SC, instead of the forced commutation signal FC, like the above-described Embodiment 1. In particular, when the self-commutation signal SC is once generated, the period TA of the first signal PA is extended by six times. On the other hand, the second signal PB is not yet generated. Accordingly, the long BEMF detection period is secured like the above-described Embodiment 1. See FIG. 17. As a result, the zero crossing detection is maintained with high accuracy, and therefore, the forced commutation control is promptly and reliably changed into the self-commutation control. Thus, the smooth and precise start of the sensorless motor can be achieved.

When the forced commutation signal FC is continuously generated by six times before the self-commutation signal SC is generated from the start instant TS of the sensorless motor M, as shown in FIG. 26, the forced commutation circuit 6 sends the second signal PB as the forced commutation signal FC. Accordingly, the period of the forced commutation signal FC is extended to the period TB of the second signal PB, which is hereafter referred to as the long period TB of the forced commutation signal FC. On the other hand, the pulse width of the position signal PS is maintained to be equal to the value until then, that is, 1/16 of the short period TA of the forced commutation signal FC. Accordingly, the waveforms of the phase currents Iu, Iv, and Iw, and the duration TD from the switching between the energization phases until the start of the BEMF detection period are maintained to be equal to those until then. Likewise, the start of the PWM disable period.

At relatively light load on the sensorless motor M, the forced commutation control using the forced commutation signal FC with the short period TA promptly increases the revolving speed of the rotor. However, at relatively heavy load on the sensorless motor M, the forced commutation control using the forced commutation signal FC with the short period TA is difficult to increase the revolving speed of the rotor. Accordingly, the zero crossing detection is hardly maintained with high accuracy. The sensorless motor driving device according to Embodiment 3 of the present invention extends the short period TA of the forced commutation signal FC into the long period TB, as described above, when no zero crossing is detected for a constant period under the forced commutation control using the forced commutation signal FC with the short period TA. Thereby, the BEMF detection period is extended as shown in FIG. 26. Accordingly, the accuracy of the zero crossing detection is improved. Thus, the sensorless motor driving device according to Embodiment 3 of the present invention can realize the prompt and reliable start of the sensorless motor, regardless of the weight of the load. Then, the pulse width of the position signal PS does not exceed 1/16 of the short period TA of the forced commutation signal FC. Thereby, the rising rate of the phase currents is maintained more than a constant at the switching between the energization phases. Accordingly, the starting torque is high, and therefore, the starting time can be reduced, and the start control is resistant to changes of load.

In FIG. 26, the first self-commutation signal SC is generated at the time TC. At every generation of the self-commutation signal SC, the self-commutation signal SC is first received and surely selected as the commutation signal CS by the selection circuit 71, likewise the above-described Embodiment 1. Thereby, the energization phase is switched according to the self-commutation signal SC, instead of the forced commutation signal FC. Thus, the forced commutation control is promptly and reliably changed into the self-commutation control.

The forced commutation circuit 6 extends the period or pulse interval of the forced commutation signal FC into six times of the short period TA at the generation instant TC of the self-commutation signal SC. Furthermore, at the energization phase immediately after the instant TC, the pulse width of the position signal PS, the waveforms of the phase currents Iu, Iv, and Iw, and the duration TD1 from the instant TC until the start of the BEMF detection period are set, based on either the duration T1 of the previous energization phase or the short period TA of the forced commutation signal FC, whichever is shorter. Likewise, the start of the PWM disable period. Thereby, the BEMF detection period is extended as shown in FIG. 26. Accordingly, the accuracy of the zero crossing detection is improved. Then, the pulse width of the position signal PS does not exceed 1/16 of the short period TA of the forced commutation signal FC. Thereby, the rising rates of the phase currents are maintained more than a constant at the switching of the energization phases. Accordingly, the starting torque is high, and therefore, the starting time can be reduced and the start control is resistant to changes of load.

When the generation of the self-commutation signal SC is repeated after the time TC and the pulse intervals are shorter than six times of the short period TA of the forced commutation signal FC, the commutation signal CS is synchronized to the self-commutation signal SC, as the above-described Embodiment 1. See FIGS. 16 and 17. On the other hand, when no new self-commutation signal SC is generated from the time TC until six times of the short period TA of the forced commutation signal FC has elapsed, the forced commutation signal FC is selected as the next commutation signal CS as shown in FIG. 26. In other words, the next switching between the energization phases is performed by the generation of the forced commutation signal FC. See the time TC2 shown in FIG. 26. At the energization phase, the pulse width of the position signal PS is set to be equal to 1/16 of the short period TA of the forced commutation signal FC. Accordingly, the waveforms of the phase currents Iu, Iv, and Iw, and the duration TD from the instant TC2 of the switching between the energization phases until the start of the BEMF detection period is set, based on the short period TA of the forced commutation signal FC. Likewise, the start of the PWM disable period. In addition, the forced commutation circuit 6 sets the period of the forced commutation signal FC at the long period TB, after the time TC2. Thereby, the zero crossing detection is maintained with high accuracy since the BEMF detection period is maintained long. After that, the forced commutation control using the forced commutation signal FC with the long period TB is further continued until the self-commutation signal SC is generated again.

The sensorless motor driving device according to Embodiment 3 of the present invention promptly resumes the forced commutation control, in particular, using the forced commutation signal FC with the long period TB, when it fails the change from the forced commutation control into to the self-commutation control due to no repetition of the zero crossing detection, as shown in FIG. 26. In other words, the driving device is required to, for example, neither wait for a retry command from an external microprocessor, nor judge the revolving speed of the rotor, in contrast to the retry of conventional sensorless motor driving devices. Thus, the further smooth start of the sensorless motor can be achieved.

The sensorless motor driving device according to Embodiment 3 of the present invention may alternatively, for example, detect the revolving speed of the rotor and, based on the revolving speed, judge the period of the forced commutation signal FC under the forced commutation control resumed.

The above-described disclosure of the invention in terms of the presently preferred embodiments is not to be interpreted as intended for limiting. Various alterations and modifications will no doubt become apparent to those skilled in the art to which the invention pertains, after having read the disclosure. As a corollary to that, such alterations and modifications apparently fall within the true spirit and scope of the invention. Furthermore, it is to be understood that the appended claims be intended as covering the alterations and modifications.

What is claimed is:

1. A sensorless motor driving device comprising:
an output circuit energizing a motor coil of a sensorless motor;
a PWM control section generating a PWM control signal showing a timing of the energization of said motor coil, based on a position signal showing an estimated rotor position of said sensorless motor;
an energization phase switching circuit switching between energization phases in synchronization with a commutation signal;
a pre-drive circuit selecting said motor coil corresponding to said energization phase, changing the energization of the selected motor coil through said output circuit according to said PWM control signal, and, disabling the energization of the specific motor coil by said output circuit in a PWM disable period;
a BEMF comparing section detecting a BEMF (back electromotive force) induced in said motor coil and comparing said BEMF with a center tap voltage of said motor coil;
a self-commutation circuit detecting agreement between said BEMF and said center tap voltage, that is, a zero crossing during a BEMF detection period, and generating a self-commutation signal when detecting the zero crossing; and
a count section generating said commutation signal based on said self-commutation signal, measuring an interval of said commutation signal, generating said position signal based on the interval, establishing said PWM disable period and said BEMF detection period based on said position signal, and starting said PWM disable period earlier than the start of said BEMF detection period and finishing both of said PWM disable period and said BEMF detection period in synchronization with said commutation signal.

2. A sensorless motor driving device according to claim 1 wherein said PWM control section comprises:
an instruction circuit setting a desired current based on an original instruction and said position signal;
a current comparing section detecting a current of said motor coil and comparing the detected current with said desired current; and
a PWM control circuit generating said PWM control signal with reference to the difference between said detected current and said desired current.

3. A sensorless motor driving device according to claim 2 wherein said instruction circuit stepwise increases and decreases said desired current.

4. A sensorless motor driving device according to claim 1 wherein said count section starts said BEMF detection period at one of the instant when a constant time elapses from the start of said PWM disable period and the instant when said estimated rotor position changes by a constant amount from the value at the start of said PWM disable period, whichever comes first.

5. A sensorless motor driving device comprising:
an output circuit energizing a motor coil of a sensorless motor;
a PWM control section generating a PWM control signal showing a timing of the energization of said motor coil, based on a position signal showing an estimated rotor position of said sensorless motor;
an energization phase switching circuit switching between energization phases in synchronization with a commutation signal;
a pre-drive circuit selecting said motor coil corresponding to said energization phase and changing the energization of the selected motor coil through said output circuit according to said PWM control signal;
a BEMF comparing section detecting a BEMF induced in said motor coil and comparing said BEMF with a center tap voltage of said motor coil;
a self-commutation circuit detecting agreement between said BEMF and said center tap voltage, that is, a zero crossing during a BEMF detection period, and generating a self-commutation signal when detecting the zero crossing;
a forced commutation circuit generating a forced commutation signal in a predetermined period;
a selection circuit selecting, as said commutation signal, one of said self-commutation signal and said forced commutation signal, whichever enters first during said BEMF detection period; and
a count circuit measuring an interval of said commutation signal, generating said position signal based on the interval, establishing said BEMF detection period based on said position signal, and, finishing said BEMF detection period in synchronization with said commutation signal.

6. A sensorless motor driving device according to claim 5 wherein said PWM control section comprises:
an instruction circuit setting a desired current based on an original instruction and said position signal;
a current comparing section detecting a current of said motor coil and comparing the detected current with said desired current; and
a PWM control circuit generating said PWM control signal with reference to the difference between said detected current and said desired current.

7. A sensorless motor driving device according to claim 6 wherein said instruction circuit stepwise increases and decreases said desired current.

8. A sensorless motor driving device according to claim 5 wherein:
said count circuit establishes said PWM disable period based on said position signal, and, in particular, starts said PWM disable period earlier than said BEMF detection period and finishes said PWM disable period in synchronization with said commutation signal; and
said pre-drive circuit disables the energization of the specific motor coil by said output circuit in said PWM disable period.

9. A sensorless motor driving device according to claim 8 wherein said count circuit starts said BEMF detection period at one of the instant when a constant time elapses from the start of said PWM disable period and the instant when said estimated rotor position changes by a constant amount from the value at the start of said PWM disable period, whichever comes first.

10. A sensorless motor driving device according to claim 5 wherein said forced commutation circuit constantly generates said forced commutation signal.

11. A sensorless motor driving device according to claim 5 wherein said forced commutation circuit extends the period of said forced commutation signal at said BEMF detection period, when said self-commutation signal enters earlier than said forced commutation signal enters during the previous BEMF detection period.

12. A sensorless motor driving device according to claim 5 wherein said forced commutation circuit extends the period of said forced commutation signal at said BEMF detection period, when said forced commutation signal repeats to enter earlier than said self-commutation signal enters during the previous BEMF detection periods a predetermined number of times in succession.

13. A sensorless motor driving device according to claim 5 wherein said forced commutation circuit generates at least two types of pulse signal with various periods and selects one of said pulse signals as said forced commutation signal.

14. A sensorless motor driving device according to claim 13 wherein said pulse signals include a first signal having a fixed period and a second signal having double the period of said first signal.

15. A sensorless motor driving method comprising the steps of:
   generating a PWM control signal showing a timing of the energization of a motor coil of a sensorless motor, based on a position signal showing an estimated rotor position of said sensorless motor;
   selecting said motor coil corresponding to an energization phase, and energizing the selected motor coil according to said PWM control signal;
   starting a PWM disable period based on said position signal;
   disabling the energization of the specific motor coil during said PWM disable period;
   detecting a BEMF induced in said motor coil and comparing said BEMF with a center tap voltage of said motor coil;
   starting said BEMF detection period after the start of said PWM disable period;
   detecting agreement between said BEMF and said center tap voltage, that is, a zero crossing during a BEMF detection period, and generating a self-commutation signal when detecting the zero crossing;
   generating a commutation signal based on said self-commutation signal;
   finishing both of said PWM disable period and said BEMF detection period in synchronization with said commutation signal;
   switching between energization phases in synchronization with said commutation signal;
   measuring an interval of said commutation signal; and
   generating said position signal based on the interval.

16. A sensorless motor driving method according to claim 15 wherein the step of generating said PWM control signal includes the substeps of:
   setting a desired current based on an original instruction and said position signal;
   detecting a current of said motor coil and comparing the detected current with said desired current; and
   generating said PWM control signal with reference to the difference between said detected current and said desired current.

17. A sensorless motor driving method according to claim 16 wherein said desired current is stepwise increased and decreased in every substep of setting said desired current.

18. A sensorless motor driving method according to claim 15 wherein:
   said sensorless motor driving method comprises the step of measuring an elapsed time and an amount of change of said estimated rotor position from the start of said PWM disable period;
   the step of starting said BEMF detection period is performed at one of the instant when a constant time elapses from the start of said PWM disable period and the instant when said estimated rotor position changes by a constant amount from the value at the start of said PWM disable period, whichever comes first.

19. A sensorless motor driving method comprising the steps of:
   generating a PWM control signal showing a timing of the energization of a motor coil, based on a position signal showing an estimated rotor position of a sensorless motor;
   selecting said motor coil corresponding to an energization phase and energizing the selected motor coil according to said PWM control signal;
   detecting a BEMF induced in said motor coil and comparing said BEMF with a center tap voltage of said motor coil;
   starting a BEMF detection period based on said position signal;
   detecting agreement between said BEMF and said center tap voltage, that is, a zero crossing during said BEMF detection period, and generating a self-commutation signal when detecting the zero crossing;
   generating a forced commutation signal in a predetermined period;
   selecting, as a commutation signal, one of said self-commutation signal and said forced commutation signal, whichever enters first during said BEMF detection period;
   finishing said BEMF detection period in synchronization with said commutation signal;
   changing said energization phases in synchronization with said commutation signal;
   measuring an interval of said commutation signal; and
   generating said position signal based on the interval of said commutation signal.

20. A sensorless motor driving method according to claim 19 wherein the step of generating said PWM control signal includes the substeps of:
   setting a desired current based on an original instruction and said position signal;
   detecting a current of said motor coil and comparing the detected current with said desired current; and
   generating said PWM control signal with reference to the difference between said detected current and said desired current.

21. A sensorless motor driving method according to claim 20 wherein said desired current is stepwise increased and decreased in every substep of setting said desired current.

22. A sensorless motor driving method according to claim 19 comprising the steps of:
   starting a PWM disable period earlier than said BEMF detection period based on said position signal;

disabling the energization of the specific motor coil during said PWM disable period; and finishing said PWM disable period in synchronization with said commutation signal.

23. A sensorless motor driving method according to claim 22 wherein:

said sensorless motor driving method comprises the step of measuring an elapsed time and an amount of change of said estimated rotor position from the start of said PWM disable period;

the step of starting said BEMF detection period is performed at one of the instant when a constant time elapses from the start of said PWM disable period and the instant when said estimated rotor position changes by a constant amount from the value at the start of said PWM disable period, whichever comes first.

24. A sensorless motor driving method according to claim 19 wherein the step of generating said forced commutation signal is constantly performed.

25. A sensorless motor driving method according to claim 19 comprising the step of extending the period of said forced commutation signal at said BEMF detection period, when said self-commutation signal enters earlier than said forced commutation signal enters during the previous BEMF detection period.

26. A sensorless motor driving method according to claim 19 comprising the step of extending the period of said forced commutation signal at said BEMF detection period, when said forced commutation signal repeats to enter earlier than said self-commutation signal enters during the previous BEMF detection periods a predetermined number of times in succession.

27. A sensorless motor driving method according to claim 19 wherein the step of generating said forced commutation signal includes the substeps of generating at least two types of pulse signal with various periods and selecting one of said pulse signals as said forced commutation signal.

28. A sensorless motor driving method according to claim 27 wherein said pulse signals include a first signal having a fixed period and a second signal having double the period of said first signal.

* * * * *